(12) United States Patent
Sizelove

(10) Patent No.: US 9,108,733 B2
(45) Date of Patent: Aug. 18, 2015

(54) INTEGRATED USER INTERFACE SYSTEM AND METHOD

(75) Inventor: Steven Lee Sizelove, Woodinville, WA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 354 days.

(21) Appl. No.: 13/229,970

(22) Filed: Sep. 12, 2011

(65) Prior Publication Data

US 2012/0132746 A1    May 31, 2012

Related U.S. Application Data

(60) Provisional application No. 61/381,866, filed on Sep. 10, 2010.

(30) Foreign Application Priority Data

Sep. 10, 2010 (WO) ............... PCT/US2011/051136

(51) Int. Cl.
*B64D 11/06* (2006.01)
*B64D 11/00* (2006.01)

(52) U.S. Cl.
CPC ............ *B64D 11/0015* (2013.01); *B64D 11/06* (2013.01); *B64D 11/0624* (2014.12)

(58) Field of Classification Search
USPC ........................................... 244/118.5, 118.6
See application file for complete search history.

(56) References Cited

U.S. PATENT DOCUMENTS

| | | | |
|---|---|---|---|
| 3,037,812 A | 6/1962 | Monroe | |
| 3,717,809 A | 2/1973 | Laukien | |
| 3,980,954 A | 9/1976 | Whyte | |

(Continued)

FOREIGN PATENT DOCUMENTS

| | | | |
|---|---|---|---|
| CN | 1104160 A | 6/1995 | |
| CN | 1127852 C | 11/2003 | |

(Continued)

OTHER PUBLICATIONS

Office Action, Japanese Application No. 2010-525043, May 7, 2013.
(Continued)

*Primary Examiner* — Tien Dinh
*Assistant Examiner* — Justin Benedik
(74) *Attorney, Agent, or Firm* — Orrick, Herrington & Sutcliffe, LLP

(57) ABSTRACT

An integrated user interface system being disposed at a chair and methods for manufacturing and using same. The user interface system comprises one or more interface elements that are disposed at an armrest or other suitable chair location and that are obscured from view or otherwise de-emphasized when a user is distal from the user interface system. At least one selected interface element becomes emphasized when a user hand becomes proximate to the user interface system. The selected interface element can become emphasized, for example, by becoming visible and/or by forming a raised projection. Upon becoming emphasized, the selected interface element is activated for use and can be manipulated to interact with available system resources. The chair advantageously can appear to be an ordinary chair when the user interface system is not in use and can present the user interface system when the user wishes to access the system resources.

15 Claims, 56 Drawing Sheets

(56) References Cited

U.S. PATENT DOCUMENTS

| | | |
|---|---|---|
| 4,367,488 A | 1/1983 | Leventer et al. |
| 4,584,603 A | 4/1986 | Harrison |
| 4,742,544 A | 5/1988 | Kupnicki et al. |
| 4,774,514 A | 9/1988 | Hildebrandt et al. |
| 4,835,604 A | 5/1989 | Kondo et al. |
| 4,866,515 A | 9/1989 | Tagawa et al. |
| 4,866,704 A | 9/1989 | Bergman |
| 4,866,732 A | 9/1989 | Carey et al. |
| 4,887,152 A | 12/1989 | Matsuzaki et al. |
| 4,890,104 A | 12/1989 | Takanabe et al. |
| 4,896,209 A | 1/1990 | Matsuzaki et al. |
| 4,897,714 A | 1/1990 | Ichise et al. |
| 4,939,527 A | 7/1990 | Lamberty et al. |
| 4,958,381 A | 9/1990 | Toyoshima |
| 4,975,696 A | 12/1990 | Salter, Jr. et al. |
| 5,005,183 A | 4/1991 | Carey et al. |
| 5,009,384 A | 4/1991 | Gerke |
| 5,014,125 A | 5/1991 | Pocock et al. |
| 5,027,124 A | 6/1991 | Fitzsimmons et al. |
| 5,034,808 A | 7/1991 | Murray |
| 5,123,015 A | 6/1992 | Brady, Jr. et al. |
| 5,136,304 A | 8/1992 | Peters |
| 5,144,290 A | 9/1992 | Honda et al. |
| 5,151,896 A | 9/1992 | Bowman et al. |
| 5,177,616 A | 1/1993 | Riday |
| 5,189,671 A | 2/1993 | Cheng |
| 5,208,590 A | 5/1993 | Pitts |
| 5,237,659 A | 8/1993 | Takats |
| 5,243,652 A | 9/1993 | Teare et al. |
| 5,276,455 A | 1/1994 | Fitzsimmons et al. |
| 5,289,272 A | 2/1994 | Rabowsky et al. |
| 5,295,089 A | 3/1994 | Ambasz |
| 5,311,302 A | 5/1994 | Berry et al. |
| 5,311,515 A | 5/1994 | Henderson et al. |
| 5,325,131 A | 6/1994 | Penney |
| 5,383,178 A | 1/1995 | Unverrich |
| 5,390,326 A | 2/1995 | Shah |
| 5,410,754 A | 4/1995 | Klotzbach et al. |
| 5,444,762 A | 8/1995 | Frey et al. |
| 5,463,656 A | 10/1995 | Polivka et al. |
| 5,469,363 A | 11/1995 | Saliga |
| 5,481,478 A | 1/1996 | Palmieri et al. |
| 5,493,702 A | 2/1996 | Crowley et al. |
| 5,543,805 A | 8/1996 | Thaniyavarn |
| 5,555,466 A | 9/1996 | Scribner et al. |
| 5,555,491 A | 9/1996 | Tao |
| 5,557,342 A | 9/1996 | Eto et al. |
| 5,557,656 A | 9/1996 | Ray et al. |
| 5,568,484 A | 10/1996 | Margis |
| 5,579,315 A | 11/1996 | Lyu et al. |
| 5,596,647 A | 1/1997 | Wakai et al. |
| 5,610,822 A | 3/1997 | Murphy |
| 5,617,331 A | 4/1997 | Wakai et al. |
| 5,631,629 A | 5/1997 | Fooks et al. |
| 5,640,002 A | 6/1997 | Ruppert et al. |
| 5,666,291 A | 9/1997 | Scott et al. |
| 5,701,582 A | 12/1997 | DeBey |
| 5,706,353 A | 1/1998 | Arai et al. |
| 5,709,448 A | 1/1998 | Jennings et al. |
| 5,711,014 A | 1/1998 | Crowley et al. |
| 5,745,159 A | 4/1998 | Wax et al. |
| 5,751,248 A | 5/1998 | Thaniyavarn |
| 5,760,819 A | 6/1998 | Sklar et al. |
| 5,790,175 A | 8/1998 | Sklar et al. |
| 5,790,423 A | 8/1998 | Lau et al. |
| 5,790,787 A | 8/1998 | Scott et al. |
| 5,801,751 A | 9/1998 | Sklar et al. |
| 5,808,660 A | 9/1998 | Sekine et al. |
| 5,812,751 A | 9/1998 | Ekrot et al. |
| 5,831,664 A | 11/1998 | Wharton et al. |
| 5,832,380 A | 11/1998 | Ray et al. |
| 5,835,127 A | 11/1998 | Booth et al. |
| 5,857,869 A | 1/1999 | Parcel et al. |
| 5,878,345 A | 3/1999 | Ray et al. |
| 5,878,346 A | 3/1999 | Ray et al. |
| 5,884,166 A | 3/1999 | Ray et al. |
| 5,889,268 A | 3/1999 | Swartz |
| 5,889,775 A | 3/1999 | Sawicz et al. |
| 5,929,895 A | 7/1999 | Berry et al. |
| 5,944,803 A | 8/1999 | Whitehouse |
| 5,953,429 A | 9/1999 | Wakai et al. |
| 5,959,596 A | 9/1999 | McCarten et al. |
| 5,960,343 A | 9/1999 | Ray et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,014,381 A | 1/2000 | Troxel et al. |
| 6,020,848 A | 2/2000 | Wallace et al. |
| 6,058,288 A | 5/2000 | Reed et al. |
| 6,078,297 A | 6/2000 | Kormanyos |
| 6,078,348 A | 6/2000 | Klosterman et al. |
| 6,108,539 A | 8/2000 | Ray et al. |
| 6,129,274 A | 10/2000 | Suzuki |
| 6,135,549 A | 10/2000 | Demick et al. |
| 6,137,377 A | 10/2000 | Wallace et al. |
| 6,151,497 A | 11/2000 | Yee et al. |
| 6,154,186 A | 11/2000 | Smith et al. |
| 6,177,887 B1 | 1/2001 | Jerome |
| 6,201,797 B1 | 3/2001 | Leuca et al. |
| 6,208,307 B1 | 3/2001 | Frisco et al. |
| 6,216,065 B1 | 4/2001 | Hall et al. |
| 6,249,913 B1 | 6/2001 | Galipeau et al. |
| 6,266,664 B1 | 7/2001 | Russell-Falla et al. |
| 6,271,728 B1 | 8/2001 | Wallace et al. |
| 6,278,936 B1 | 8/2001 | Jones |
| 6,286,139 B1 | 9/2001 | Decinque |
| 6,321,084 B1 | 11/2001 | Horrer |
| 6,338,045 B1 | 1/2002 | Pappas |
| 6,345,720 B1 | 2/2002 | Redden et al. |
| 6,351,247 B1 | 2/2002 | Linstrom et al. |
| 6,356,239 B1 | 3/2002 | Carson |
| 6,370,656 B1 | 4/2002 | Olarig et al. |
| 6,377,802 B1 | 4/2002 | McKenna et al. |
| 6,390,920 B1 | 5/2002 | Infiesto et al. |
| 6,400,315 B1 | 6/2002 | Adler et al. |
| 6,408,180 B1 | 6/2002 | McKenna et al. |
| 6,414,644 B1 | 7/2002 | Desargant et al. |
| 6,417,803 B1 | 7/2002 | de La Chapelle et al. |
| 6,424,313 B1 | 7/2002 | Navarro et al. |
| 6,483,458 B1 | 11/2002 | Carson |
| 6,484,011 B1 | 11/2002 | Thompson et al. |
| 6,487,540 B1 | 11/2002 | Smith et al. |
| 6,496,980 B1 | 12/2002 | Tillman et al. |
| 6,499,027 B1 | 12/2002 | Weinberger |
| 6,507,279 B2 | 1/2003 | Loof |
| 6,507,952 B1 | 1/2003 | Miller et al. |
| 6,519,693 B1 | 2/2003 | Debey |
| 6,529,706 B1 | 3/2003 | Mitchell |
| 6,538,656 B1 | 3/2003 | Cheung et al. |
| 6,549,754 B1 | 4/2003 | Miller et al. |
| 6,559,812 B1 | 5/2003 | McCarten et al. |
| 6,574,338 B1 | 6/2003 | Sachdev |
| 6,580,402 B2 | 6/2003 | Navarro et al. |
| 6,594,471 B1 | 7/2003 | Crowley et al. |
| 6,598,227 B1 | 7/2003 | Berry et al. |
| 6,600,418 B2 | 7/2003 | Sainati et al. |
| 6,606,056 B2 | 8/2003 | Brogden |
| 6,609,103 B1 | 8/2003 | Kolls |
| 6,622,124 B1 | 9/2003 | Kolls |
| 6,628,235 B2 | 9/2003 | Wight |
| 6,637,484 B1 | 10/2003 | Kraft |
| 6,643,510 B2 | 11/2003 | Taylor |
| 6,650,898 B2 | 11/2003 | Jochim et al. |
| 6,658,595 B1 | 12/2003 | Thamattoor |
| 6,661,353 B1 | 12/2003 | Gopen |
| 6,674,339 B2 | 1/2004 | Kormanyos |
| 6,674,398 B2 | 1/2004 | Murphy |
| 6,684,240 B1 | 1/2004 | Goddard |
| 6,693,236 B1 | 2/2004 | Gould et al. |
| 6,698,020 B1 | 2/2004 | Zigmond et al. |
| 6,702,604 B1 | 3/2004 | Moscovitch |
| 6,703,974 B2 | 3/2004 | White et al. |
| 6,707,346 B2 | 3/2004 | Tillotson et al. |

(56) References Cited

U.S. PATENT DOCUMENTS

| | | |
|---|---|---|
| 6,708,019 B2 | 3/2004 | McLain et al. |
| 6,714,163 B2 | 3/2004 | Navarro et al. |
| 6,725,035 B2 | 4/2004 | Jochim et al. |
| 6,728,535 B2 | 4/2004 | Parkman |
| 6,731,909 B2 | 5/2004 | McLain et al. |
| 6,736,315 B2 | 5/2004 | Swartz |
| 6,741,141 B2 | 5/2004 | Kormanyos |
| 6,741,841 B1 | 5/2004 | Mitchell |
| 6,747,960 B2 | 6/2004 | Tillotson |
| 6,748,597 B1 | 6/2004 | Frisco et al. |
| 6,757,712 B1 | 6/2004 | Bastian et al. |
| 6,771,608 B2 | 8/2004 | Tillotson |
| 6,778,825 B2 | 8/2004 | Parkman |
| 6,782,392 B1 | 8/2004 | Weinberger et al. |
| 6,785,526 B2 | 8/2004 | McLain et al. |
| 6,788,935 B1 | 9/2004 | McKenna et al. |
| 6,796,495 B2 | 9/2004 | Stahl et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,813,777 B1 | 11/2004 | Weinberger et al. |
| 6,820,221 B2 | 11/2004 | Fleming |
| 6,844,855 B2 | 1/2005 | Carson |
| 6,847,801 B2 | 1/2005 | de La Chapelle et al. |
| 6,876,905 B2 | 4/2005 | Farley et al. |
| 6,885,845 B1 | 4/2005 | Crowley et al. |
| 6,885,863 B2 | 4/2005 | Parkman et al. |
| 6,885,864 B2 | 4/2005 | McKenna et al. |
| 6,889,042 B2 | 5/2005 | Rousseau et al. |
| 6,892,052 B2 | 5/2005 | Kotola et al. |
| 6,899,390 B2 | 5/2005 | Sanfrod et al. |
| 6,920,611 B1 | 7/2005 | Spaeth et al. |
| 6,929,218 B1 | 8/2005 | Sanford et al. |
| 6,937,164 B2 | 8/2005 | Thomson et al. |
| 6,938,190 B2 | 8/2005 | Okuda |
| 6,938,258 B1 | 8/2005 | Weinberger et al. |
| 6,940,978 B2 | 9/2005 | Parkman |
| 6,941,111 B2 | 9/2005 | McLain et al. |
| 6,946,990 B2 | 9/2005 | Monk |
| 6,947,726 B2 | 9/2005 | Rockwell |
| 6,947,733 B2 | 9/2005 | Tillotson |
| 6,959,168 B2 | 10/2005 | Parkman |
| 6,963,304 B2 | 11/2005 | Murphy |
| 6,965,851 B2 | 11/2005 | Tillotson |
| 6,971,608 B2 | 12/2005 | Harrington et al. |
| 6,973,479 B2 | 12/2005 | Brady, Jr. et al. |
| 6,974,076 B1 | 12/2005 | Siegel |
| 6,975,587 B1 | 12/2005 | Adamski et al. |
| 6,975,616 B2 | 12/2005 | Stephenson et al. |
| 6,983,312 B1 | 1/2006 | O'Neil |
| 6,985,588 B1 | 1/2006 | Glick et al. |
| 6,985,942 B2 | 1/2006 | D'Annunzio et al. |
| 6,990,338 B2 | 1/2006 | Miller et al. |
| 6,993,288 B2 | 1/2006 | de La Chapelle et al. |
| 7,003,293 B2 | 2/2006 | D'Annunzio |
| 7,023,996 B2 | 4/2006 | Stephenson et al. |
| 7,036,889 B2 | 5/2006 | Sanfrod et al. |
| 7,039,827 B2 | 5/2006 | Meyer et al. |
| 7,040,698 B2 | 5/2006 | Park et al. |
| 7,054,593 B2 | 5/2006 | de La Chapelle et al. |
| 7,062,268 B2 | 6/2006 | McKenna |
| 7,068,615 B2 | 6/2006 | Niesen |
| 7,072,634 B2 | 7/2006 | Tillotson |
| 7,085,563 B2 | 8/2006 | Parkman |
| 7,086,081 B2 | 8/2006 | Martinez et al. |
| 7,099,665 B2 | 8/2006 | Taylor |
| 7,100,187 B2 | 8/2006 | Pierzga et al. |
| 7,107,062 B2 | 9/2006 | Cruz et al. |
| 7,113,780 B2 | 9/2006 | McKenna et al. |
| 7,120,389 B2 | 10/2006 | de La Chapelle et al. |
| 7,123,199 B2 | 10/2006 | Rotta |
| 7,124,426 B1 | 10/2006 | Tsuria et al. |
| 7,136,621 B2 | 11/2006 | de La Chapelle et al. |
| 7,139,258 B2 | 11/2006 | Tillotson |
| 7,155,168 B2 | 12/2006 | McLain et al. |
| 7,162,235 B1 | 1/2007 | Gilbert |
| 7,171,197 B2 | 1/2007 | Miller et al. |
| 7,177,638 B2 | 2/2007 | Funderburk et al. |
| 7,187,690 B2 | 3/2007 | Taylor |
| 7,187,927 B1 | 3/2007 | Mitchell |
| 7,233,958 B2 | 6/2007 | Weng et al. |
| 7,250,915 B2 | 7/2007 | Nelson |
| 7,269,761 B2 | 9/2007 | Yi |
| 7,274,336 B2 | 9/2007 | Carson |
| 7,280,825 B2 | 10/2007 | Keen et al. |
| 7,286,503 B1 | 10/2007 | Clarke et al. |
| 7,299,013 B2 | 11/2007 | Rotta et al. |
| 7,302,226 B2 | 11/2007 | Stephenson |
| 7,321,383 B2 | 1/2008 | Monagahn et al. |
| 7,328,012 B2 | 2/2008 | Ziarno et al. |
| 7,330,151 B1 | 2/2008 | Monk et al. |
| 7,343,157 B1 | 3/2008 | Mitchell |
| 7,359,700 B2 | 4/2008 | Swensen et al. |
| 7,360,833 B2 | 4/2008 | Vitito |
| 7,362,262 B2 | 4/2008 | Murphy |
| 7,382,327 B2 | 6/2008 | Nelson |
| 7,394,451 B1 * | 7/2008 | Patten et al. ............. 361/679.41 |
| 7,400,858 B2 | 7/2008 | Crowley et al. |
| 7,406,309 B2 | 7/2008 | Usher et al. |
| 7,414,573 B2 | 8/2008 | Murphy |
| 7,437,125 B2 | 10/2008 | McLain et al. |
| 7,448,679 B2 | 11/2008 | Chang |
| 7,450,901 B2 | 11/2008 | Parkman |
| 7,454,202 B2 | 11/2008 | de La Chapelle |
| 7,454,203 B2 | 11/2008 | Levitan |
| 7,460,866 B2 | 12/2008 | Salkini et al. |
| 7,464,094 B2 | 12/2008 | Sullivan et al. |
| 7,483,696 B1 | 1/2009 | Mitchell |
| 7,486,927 B2 | 2/2009 | Kallio et al. |
| 7,496,361 B1 | 2/2009 | Mitchell et al. |
| 7,508,342 B2 | 3/2009 | Nelson |
| 7,591,508 B2 | 9/2009 | Chang |
| 7,636,930 B2 | 12/2009 | Chang |
| 7,690,012 B2 | 3/2010 | Luehrs |
| 7,812,784 B2 | 10/2010 | Chang |
| 7,904,244 B2 | 3/2011 | Sugla |
| 7,945,934 B2 | 5/2011 | Margis et al. |
| 2001/0025377 A1 | 9/2001 | Hinderks |
| 2002/0013150 A1 | 1/2002 | McKenna et al. |
| 2002/0026442 A1 | 2/2002 | Lipscomb et al. |
| 2002/0045444 A1 | 4/2002 | Usher et al. |
| 2002/0045484 A1 | 4/2002 | Eck et al. |
| 2002/0046406 A1 | 4/2002 | Chelehmal et al. |
| 2002/0058478 A1 | 5/2002 | de La Chapelle et al. |
| 2002/0059363 A1 | 5/2002 | Katz et al. |
| 2002/0059614 A1 | 5/2002 | Lipsanen et al. |
| 2002/0069293 A1 | 6/2002 | Natalio |
| 2002/0087992 A1 | 7/2002 | Bengeult et al. |
| 2002/0093564 A1 | 7/2002 | Israel |
| 2002/0094829 A1 | 7/2002 | Ritter |
| 2002/0095574 A1 | 7/2002 | Kori |
| 2002/0095680 A1 | 7/2002 | Davidson |
| 2002/0152432 A1 | 10/2002 | Fleming |
| 2002/0152446 A1 | 10/2002 | Fleming |
| 2002/0152470 A1 | 10/2002 | Hammond |
| 2002/0156646 A1 | 10/2002 | Kaiwa et al. |
| 2002/0162113 A1 | 10/2002 | Hunter |
| 2002/0170060 A1 | 11/2002 | Lyman |
| 2002/0178451 A1 | 11/2002 | Ficco |
| 2002/0184555 A1 | 12/2002 | Wong et al. |
| 2002/0197990 A1 | 12/2002 | Jochim et al. |
| 2003/0003899 A1 | 1/2003 | Tashiro et al. |
| 2003/0008652 A1 | 1/2003 | Jochim et al. |
| 2003/0020991 A1 | 1/2003 | Chang |
| 2003/0023979 A1 | 1/2003 | Emoto et al. |
| 2003/0043760 A1 | 3/2003 | Taylor |
| 2003/0055975 A1 | 3/2003 | Nelson et al. |
| 2003/0060190 A1 | 3/2003 | Mallart |
| 2003/0067542 A1 | 4/2003 | Monroe |
| 2003/0069015 A1 | 4/2003 | Brinkley et al. |
| 2003/0069990 A1 | 4/2003 | D'Annunzio et al. |
| 2003/0077308 A1 | 4/2003 | Rosen |
| 2003/0084130 A1 | 5/2003 | D'Annunzio |
| 2003/0084451 A1 | 5/2003 | Pierzga et al. |

(56) References Cited

U.S. PATENT DOCUMENTS

| | | |
|---|---|---|
| 2003/0085818 A1 | 5/2003 | Renton et al. |
| 2003/0087672 A1 | 5/2003 | Kattukaran et al. |
| 2003/0093798 A1 | 5/2003 | Rogerson |
| 2003/0107248 A1 | 6/2003 | Sanford et al. |
| 2003/0126614 A1 | 7/2003 | Staiger |
| 2003/0140345 A1 | 7/2003 | Fisk et al. |
| 2003/0148736 A1 | 8/2003 | Wright et al. |
| 2003/0158958 A1 | 8/2003 | Chiu |
| 2003/0160710 A1 | 8/2003 | Baumgartner et al. |
| 2003/0161411 A1 | 8/2003 | McCorkle et al. |
| 2003/0169563 A1 | 9/2003 | Adams et al. |
| 2003/0184449 A1 | 10/2003 | Baumgartner et al. |
| 2003/0200482 A1 | 10/2003 | Sullivan |
| 2003/0200546 A1 | 10/2003 | Keen et al. |
| 2003/0217363 A1 | 11/2003 | Brady, Jr. et al. |
| 2003/0233469 A1 | 12/2003 | Knowlson et al. |
| 2003/0233658 A1 | 12/2003 | Keen et al. |
| 2003/0237016 A1 | 12/2003 | Johnson et al. |
| 2004/0034816 A1 | 2/2004 | Richard |
| 2004/0049797 A1 | 3/2004 | Salmonsen |
| 2004/0054923 A1 | 3/2004 | Seago et al. |
| 2004/0077308 A1 | 4/2004 | Sanford et al. |
| 2004/0078821 A1 | 4/2004 | Frisco et al. |
| 2004/0088412 A1 | 5/2004 | John et al. |
| 2004/0098475 A1 | 5/2004 | Zeitler et al. |
| 2004/0108963 A1 | 6/2004 | Clymer et al. |
| 2004/0111523 A1 | 6/2004 | Hall et al. |
| 2004/0123322 A1 | 6/2004 | Erkocevic et al. |
| 2004/0128688 A1 | 7/2004 | Seo |
| 2004/0133634 A1 | 7/2004 | Luke et al. |
| 2004/0139467 A1 | 7/2004 | Rogerson et al. |
| 2004/0142658 A1 | 7/2004 | McKenna et al. |
| 2004/0147243 A1 | 7/2004 | McKenna |
| 2004/0158863 A1 | 8/2004 | McLain |
| 2004/0162928 A1 | 8/2004 | Benson |
| 2004/0167967 A1 | 8/2004 | Bastian et al. |
| 2004/0183346 A1 | 9/2004 | Sanford et al. |
| 2004/0189591 A1* | 9/2004 | Breuil ............ 345/156 |
| 2004/0192339 A1 | 9/2004 | Wilson et al. |
| 2004/0198346 A1 | 10/2004 | Swensen et al. |
| 2004/0235469 A1 | 11/2004 | Krug |
| 2004/0237111 A1 | 11/2004 | Iraclianos et al. |
| 2004/0252965 A1 | 12/2004 | Moreno et al. |
| 2004/0252966 A1 | 12/2004 | Holloway et al. |
| 2004/0253951 A1 | 12/2004 | Chang et al. |
| 2005/0026608 A1 | 2/2005 | Kallio et al. |
| 2005/0027787 A1 | 2/2005 | Kuhn et al. |
| 2005/0039208 A1 | 2/2005 | Veeck et al. |
| 2005/0044564 A1 | 2/2005 | Stopniewicz et al. |
| 2005/0047081 A1 | 3/2005 | LaPorte et al. |
| 2005/0055725 A1 | 3/2005 | Stewart |
| 2005/0067530 A1 | 3/2005 | Schafer, Jr. et al. |
| 2005/0102322 A1 | 5/2005 | Bagley et al. |
| 2005/0111182 A1 | 5/2005 | Lin et al. |
| 2005/0114894 A1 | 5/2005 | Hoerl |
| 2005/0132407 A1 | 6/2005 | Boyer et al. |
| 2005/0136917 A1 | 6/2005 | Taylor |
| 2005/0138654 A1 | 6/2005 | Minne |
| 2005/0149684 A1 | 7/2005 | Sankaran et al. |
| 2005/0171653 A1 | 8/2005 | Taylor |
| 2005/0176368 A1 | 8/2005 | Young et al. |
| 2005/0177763 A1 | 8/2005 | Stoler |
| 2005/0181723 A1 | 8/2005 | Miller et al. |
| 2005/0193257 A1 | 9/2005 | Stoler |
| 2005/0202785 A1 | 9/2005 | Meyer |
| 2005/0215249 A1 | 9/2005 | Little et al. |
| 2005/0216938 A1 | 9/2005 | Brady et al. |
| 2005/0223406 A1 | 10/2005 | Vitito |
| 2005/0235326 A1 | 10/2005 | Vitito |
| 2005/0235327 A1 | 10/2005 | Vitito |
| 2005/0239261 A1 | 10/2005 | Tai et al. |
| 2005/0239434 A1 | 10/2005 | Marlowe |
| 2005/0242636 A1 | 11/2005 | Vitito |
| 2005/0242637 A1 | 11/2005 | Vitito |
| 2005/0242638 A1 | 11/2005 | Vitito |
| 2005/0251798 A1 | 11/2005 | Fraley |
| 2005/0256616 A1 | 11/2005 | Rhoads |
| 2005/0268319 A1 | 12/2005 | Brady, Jr. |
| 2005/0268320 A1 | 12/2005 | Smith |
| 2005/0270373 A1 | 12/2005 | Trela |
| 2005/0273823 A1 | 12/2005 | Brady, Jr. et al. |
| 2005/0278753 A1 | 12/2005 | Brady, Jr. et al. |
| 2005/0278754 A1 | 12/2005 | Bleacher et al. |
| 2005/0281223 A1 | 12/2005 | D'Annunzio |
| 2006/0006287 A1 | 1/2006 | Ferguson et al. |
| 2006/0008256 A1 | 1/2006 | Khedouri et al. |
| 2006/0010438 A1 | 1/2006 | Brady, Jr. et al. |
| 2006/0030311 A1 | 2/2006 | Cruz et al. |
| 2006/0032979 A1 | 2/2006 | Mitchell et al. |
| 2006/0040612 A1 | 2/2006 | Min |
| 2006/0040660 A1 | 2/2006 | Cruz et al. |
| 2006/0047426 A1 | 3/2006 | Vitito |
| 2006/0048196 A1 | 3/2006 | Yau |
| 2006/0070102 A1 | 3/2006 | Vitito |
| 2006/0070103 A1 | 3/2006 | Vitito |
| 2006/0075934 A1 | 4/2006 | Ram |
| 2006/0088001 A1 | 4/2006 | Reitmann et al. |
| 2006/0107295 A1* | 5/2006 | Margis et al. .......... 725/81 |
| 2006/0119151 A1 | 6/2006 | Vitito |
| 2006/0128303 A1 | 6/2006 | Schedivy |
| 2006/0143662 A1 | 6/2006 | Easterling et al. |
| 2006/0154601 A1 | 7/2006 | Tewalt et al. |
| 2006/0174285 A1 | 8/2006 | Brady, Jr. et al. |
| 2006/0183450 A1 | 8/2006 | Cameron |
| 2006/0187959 A1 | 8/2006 | Kawaguchi et al. |
| 2006/0197750 A1* | 9/2006 | Kerr et al. ............ 345/173 |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0264173 A1 | 11/2006 | Gilbert |
| 2006/0270373 A1 | 11/2006 | So |
| 2006/0270470 A1 | 11/2006 | de La Chapelle et al. |
| 2006/0271967 A1 | 11/2006 | So |
| 2006/0271970 A1 | 11/2006 | Mitchell et al. |
| 2006/0276127 A1 | 12/2006 | Cruz et al. |
| 2006/0277589 A1 | 12/2006 | Margis et al. |
| 2006/0288376 A1 | 12/2006 | Vitito |
| 2006/0288378 A1 | 12/2006 | Vitito |
| 2006/0288379 A1 | 12/2006 | Vitito |
| 2006/0288380 A1 | 12/2006 | Vitito |
| 2006/0288383 A1 | 12/2006 | Vitito |
| 2006/0291803 A1 | 12/2006 | Watson et al. |
| 2006/0293190 A1 | 12/2006 | Watson et al. |
| 2007/0021117 A1 | 1/2007 | McKenna et al. |
| 2007/0022018 A1 | 1/2007 | Suryanarayana et al. |
| 2007/0026795 A1 | 2/2007 | de La Chapelle |
| 2007/0042772 A1 | 2/2007 | Salkini et al. |
| 2007/0044126 A1 | 2/2007 | Mitchell |
| 2007/0060133 A1 | 3/2007 | Spitzer et al. |
| 2007/0130599 A1 | 6/2007 | Monroe |
| 2007/0155381 A1 | 7/2007 | Alberth et al. |
| 2007/0155421 A1 | 7/2007 | Alberth et al. |
| 2007/0185977 A1 | 8/2007 | Sato et al. |
| 2007/0202802 A1 | 8/2007 | Kallio et al. |
| 2007/0213009 A1 | 9/2007 | Higashida et al. |
| 2007/0258417 A1 | 11/2007 | Harvey et al. |
| 2007/0298741 A1 | 12/2007 | Harpist et al. |
| 2008/0004016 A1 | 1/2008 | Smee et al. |
| 2008/0023600 A1 | 1/2008 | Perlman |
| 2008/0024463 A1 | 1/2008 | Pryor |
| 2008/0040756 A1 | 2/2008 | Perlman |
| 2008/0084882 A1 | 4/2008 | Eruchimovitch |
| 2008/0085691 A1 | 4/2008 | Harvey et al. |
| 2008/0090567 A1 | 4/2008 | Gilbert |
| 2008/0124054 A1 | 5/2008 | Bonar |
| 2008/0125112 A1 | 5/2008 | Clarke et al. |
| 2008/0127278 A1 | 5/2008 | Bonar |
| 2008/0130539 A1 | 6/2008 | Lauer et al. |
| 2008/0132212 A1 | 6/2008 | Lemond et al. |
| 2008/0133705 A1 | 6/2008 | Lemond et al. |
| 2008/0141314 A1 | 6/2008 | Lemond et al. |
| 2008/0157997 A1* | 7/2008 | Bleacher et al. ...... 340/825.24 |
| 2008/0181169 A1 | 7/2008 | Lauer et al. |
| 2008/0182573 A1 | 7/2008 | Lauer et al. |

(56) References Cited

U.S. PATENT DOCUMENTS

| | | | |
|---|---|---|---|
| 2008/0274734 | A1 | 11/2008 | Kostanic et al. |
| 2008/0299965 | A1 | 12/2008 | Lagerman |
| 2008/0305762 | A1 | 12/2008 | Malosh |
| 2008/0311765 | A1 | 12/2008 | Chatterjee et al. |
| 2009/0007193 | A1 | 1/2009 | Correa et al. |
| 2009/0010200 | A1 | 1/2009 | Lauer et al. |
| 2009/0042651 | A1 | 2/2009 | Prabhu et al. |
| 2009/0077595 | A1 | 3/2009 | Sizelove et al. |
| 2009/0083805 | A1 | 3/2009 | Sizelove et al. |
| 2009/0119721 | A1 | 5/2009 | Perlman et al. |
| 2010/0060739 | A1* | 3/2010 | Salazar ............. 348/148 |

FOREIGN PATENT DOCUMENTS

| | | |
|---|---|---|
| CN | 1462552 A | 12/2003 |
| CN | ZL200520103236.4 | 12/2006 |
| CN | 101022562 A | 8/2007 |
| DE | 196 05 427 A1 | 8/1997 |
| DE | 196 05 427 B4 | 8/1997 |
| DE | 19605427 A1 | 8/1997 |
| DE | 101 18 496 A1 | 10/2002 |
| DE | 10 2008 018071 A1 | 10/2009 |
| EP | 0 277 014 A2 | 8/1988 |
| EP | 0 577 054 A1 | 1/1994 |
| EP | 0 767 594 A2 | 4/1997 |
| EP | 0 890907 A1 | 1/1999 |
| EP | 0 930 513 A2 | 7/1999 |
| EP | 1078852 A2 | 2/2001 |
| EP | 11134658 A3 | 9/2001 |
| EP | 1217833 A2 | 6/2002 |
| EP | 1217833 A3 | 4/2004 |
| EP | 1458590 B1 | 6/2005 |
| EP | 1 818 685 A1 | 8/2007 |
| EP | 2 106 141 A2 | 9/2009 |
| JP | 58-46485 | 3/1983 |
| JP | 62-238693 | 10/1987 |
| JP | H09-512401 A | 11/1995 |
| JP | 2003-534959 A | 4/2000 |
| JP | 2002-26837 A | 1/2002 |
| JP | 2002-77084 A | 3/2002 |
| JP | 2002-77174 A | 3/2002 |
| JP | 2004-80447 A | 3/2004 |
| JP | 2004-194059 A | 7/2004 |
| JP | 2004-343744 A | 12/2004 |
| JP | 2005-018230 A | 1/2005 |
| JP | 2005-508098 A | 3/2005 |
| JP | 2005-528030 A | 9/2005 |
| JP | 2006-527540 A | 11/2006 |
| JP | 2007-195830 A | 8/2007 |
| WO | WO 99/14655 A1 | 3/1999 |
| WO | WO 99/31821 A1 | 6/1999 |
| WO | WO 02/015582 A1 | 2/2002 |
| WO | WO 02/15582 A1 | 2/2002 |
| WO | WO 02/084971 A2 | 10/2002 |
| WO | WO 03/024110 A1 | 3/2003 |
| WO | WO 03/032503 A2 | 4/2003 |
| WO | WO 03/032503 A3 | 4/2003 |
| WO | WO 03/050000 A1 | 6/2003 |
| WO | WO 03/024085 A2 | 8/2003 |
| WO | WO 2004/003696 A2 | 1/2004 |
| WO | WO 2004/003696 A3 | 1/2004 |
| WO | WO 2004/008277 A2 | 1/2004 |
| WO | WO 2004/008277 A3 | 1/2004 |
| WO | WO 2005/029855 A1 | 3/2005 |
| WO | WO 2005/086865 A2 | 9/2005 |
| WO | WO 2005/125207 A2 | 12/2005 |
| WO | WO 2006/062641 A2 | 6/2006 |
| WO | WO 2006/062641 A3 | 6/2006 |
| WO | WO 2006/065381 A2 | 6/2006 |
| WO | WO 2006/065381 A3 | 6/2006 |
| WO | WO 2006/077686 A1 | 7/2006 |
| WO | WO 2007/035739 A2 | 3/2007 |
| WO | WO 2009/036362 A1 | 3/2009 |
| WO | WO 2006/052941 A1 | 5/2012 |

OTHER PUBLICATIONS

Office Action, Chinese Application No. 200880107132.7, Jun. 7, 2013.
Office Action, Japanese Application No. 2009-523977, Jul. 17, 2012.
Office Action, JP Appln No. 2010-528188, Mar. 26, 2013.
JP Office Action, JP Appln No. 2010-527121, Apr. 2, 2013.
CN Office Action, CN Appln No. 200780029616.X, Apr. 17, 2013.
US, Notice of Allowance and Fees due, U.S. Appl. No. 09/811,317, Jul. 14, 2003.
US, Office Action, U.S. Appl. No. 09/811,317, Feb. 28, 2002.
US, Office Action, U.S. Appl. No. 09/811,317, Aug. 13, 2002.
US, Office Action, U.S. Appl. No. 09/811,317, Dec. 30, 2002.
AU, First Report, App No. 2004251677, Sep. 26, 2008.
CN, Office Action, Appl. No. 200780029616.X, Aug. 6, 2010.
CN, Office Action, Appl. No. 200880107132.7, Jul. 22, 2011.
CN, Second Office Action, 200680022000.5, Jun. 21, 2011.
EP, Communication, App. No. 04754296.4-1241, Apr. 4, 2007.
EP, Communication, App. No. 05 749 692.9-1525, Jun. 15, 2007.
EP, Communication, App. No. 05 749 692.9-1525, Oct. 22, 2008.
EP, Communication, App. No. 05 762 201.1-2202, May 18, 2007.
EP, Communication, App. No. 05 762 201.1-2202, Jul. 18, 2008.
EP, Communication, App. No. 06 740 274.3-2416, Jan. 31, 2008.
EP, Communication, App. No. 06 740 274.3-2416, Sep. 17, 2008.
EP, Communication, App. No. 07 813 357.6-1523, Sep. 29, 2009.
EP, Notice of Intention to Grant, App. No. 06 740 274.3-2416, Mar. 20, 2009.
EP, Office Action, Appl. No. 08 830 787.1, Dec. 9, 2011.
JP, Office Action, 2004-199893, Jul. 5, 2005.
JP, Office Action, 2006-000840, Feb. 28, 2007.
KR, Office Action, Appl. No. 10-2006-7026708, Sep. 16, 2011.
PCT, International Preliminary Report, PCT/US2005/016513, Nov. 16, 2006.
PCT, International Preliminary Report, PCT/US2005/021518, Jan. 4, 2007.
PCT, International Preliminary Report, PCT/US2005/040380, May 18, 2007.
PCT, International Prelminary Report, PCT/US2006/012067, Oct. 11, 2007.
PCT, International Preliminary Report, PCT/US2006/014852, Nov. 1, 2007.
PCT, International Preliminary Report, PCT/US2007/074367, Feb. 5, 2009.
PCT, International Search Report, PCT/US2004/017666, Feb. 4, 2005.
PCT, International Search Report, PCT/US2005/016513, Aug. 9, 2005.
PCT, International Search Resort, PCT/US2005/021518, Jan. 3, 2006.
PCT, International Search Resort, PCT/US2005/040380, Mar. 15, 2006.
PCT, International Search Report, PCT/US2006/012067, Aug. 9, 2006.
PCT, International Search Report, PCT/US2006/014852, Dec. 4, 2006.
PCT, International Search Resort, PCT/US2007/074367, Dec. 17, 2007.
PCT, International Search Report, PCT/US2007/075448, Jul. 4, 2008.
PCT, International Search Resort, PCT/US2008/076281, Jan. 13, 2009.
PCT, International Search Resort, PCT/US2008/076285, Dec. 30, 2008.
PCT, International Search Report, PCT/US2008/076290, Jan. 30, 2009.
PCT, International Search Report, PCT/US2008/076294, Dec. 29, 2008.
PCT, International Search Resort, PCT/US2008/077562, Jun. 12, 2009.
PCT, International Search Report, PCT/US2008/078838, Jan. 16, 2009.
PCT, International Search Report, PCT/US2010/051360, Mar. 8, 2011.

(56) References Cited

OTHER PUBLICATIONS

PCT, International Search Report, PCT/US2011/051136, Feb. 2, 2012.
US, Notice of Allowance and Fees due, U.S. Appl. No. 08/071,218, Aug. 7, 1995.
US, Notice of Allowance and Fees due, U.S. Appl. No. 08/363,228, Apr. 9, 1996.
US, Notice of Allowance and Fees due, U.S. Appl. No. 08/480,666, Sep. 5, 1996.
US, Notice of Allowance and Fees due, U.S. Appl. No. 08/863,448, Feb. 17, 1999.
US, Notice of Allowance and Fees due, U.S. Appl. No. 10/772,565, Feb. 14, 2012.
US, Notice of Allowance and Fees due, U.S. Appl. No. 11/154,749, Feb. 17, 2011.
US, Office Action, U.S. Appl. No. 08/071,218, Dec. 7, 1994.
US, Office Action, U.S. Appl. No. 08/071,218, Apr. 20, 1995.
US, Office Action, U.S. Appl. No. 08/363,228, Oct. 3, 1995.
US, Office Action, U.S. Appl. No. 08/363,228, Mar. 27, 1996.
US, Office Action, U.S. Appl. No. 08/479,654, Aug. 21, 1995.
US, Office Action, U.S. Appl. No. 08/479,654, Mar. 1, 1996.
US, Office Action, U.S. Appl. No. 08/479,654, Jan. 24, 1997.
US, Office Action, U.S. Appl. No. 08/479,654, Aug. 5, 1997.
US, Office Action, U.S. Appl. No. 08/480,666, Feb. 9, 1996.
US, Office Action, U.S. Appl. No. 08/480,666, Oct. 16, 1996.
US, Office Action, U.S. Appl. No. 08/480,666, Nov. 22, 1996.
US, Office Action, U.S Appl. No. 08/863,448, Sep. 24, 1997.
US, Office Action, U.S. Appl. No. 08/863,448, Apr. 27, 1998.
US, Office Action, U.S. Appl. No. 09/952,629, Mar. 14, 2006.
US, Office Action, U.S. Appl. No. 09/952,629, Dec. 1, 2006.
US, Office Action, U.S. Appl. No. 09/952,629, Mar. 18, 2008.
US, Office Action, U.S. Appl. No. 09/952,629, Oct. 27, 2008.
US, Office Action, U.S. Appl. No. 09/952,629, Jun. 2, 2009.
US, Office Action, U.S. Appl. No. 09/952,629, Jun. 27, 2007.
US, Office Action, U.S. Appl. No. 10/772,565, Mar. 4, 2009.
US, Office Action, U.S. Appl. No. 10/772,565, Nov. 24, 2009.
US, Office Action, U.S. Appl. No. 10/772,565, Jul. 7, 2010.
US, Office Action, U.S. Appl. No. 10/772,565, Jan. 4, 2011.
US, Office Action, U.S. Appl. No. 10/773,523, Oct. 5, 2006.
US, Office Action, U.S. Appl. No. 11/123,327, Dec. 11, 2008.
US, Office Action, U.S. Appl. No. 11/123,327, Oct. 14, 2009.
US, Office Action, U.S. Appl. No. 11/154,749, Aug. 18, 2008.
US, Office Action, U.S. Appl. No. 11/154,749, Jan. 23, 2009.
US, Office Action, U.S. Appl. No. 11/154,749, Oct. 26, 2009.
US, Office Action, U.S. Appl. No. 11/154,749, Jun. 7, 2010.
US, Office Action, U.S. Appl. No. 11/269,378, Aug. 20, 2008.
US, Office Action, U.S. Appl. No. 11/269,378, Apr. 28, 2009.
US, Office Action, U.S. Appl. No. 11/277,896, Apr. 14, 2009.
US, Office Action, U.S. Appl. No. 11/379,360, Apr. 30, 2009.
Anonymous: "ARC-3901 Aspect Ratio Converter Modules—Installation and Operation Manual" Internet Article,[Online], pp. 1-162 (Mar. 18, 2003), XP02406139, retrieved from the Internet: URL:http://www.leitch.com/custserv/doclib.nsf/disweb?OpenForm &query =ARC-3901> [retrieved on Nov. 7, 2006].
Chen, Y.F. et al., "Personalized Multimedia Services Using a Mobile Service Platform", Wireless Communications and Networking Conference, 2002 WCNC2003. *IEEE*, 'Online!, vol. 2, pp. 918-925 (Mar. 17, 2002).
Farries, Mark et al: "Optical Branching Devices for Avionic Passive Optical Network" Avionics, Fiber-Optics and Photonics Technology Conference, *IEEE*, pp. 76-77 (Oct. 1, 2007).
Gratschew, S. et al., "A Multimedia Messaging Platform for Content Delivering", 11TE, pp. 431-435 (2003).
Ibenthal, A. et al.,"Multimedia im Fahrzeug: Dienste und Technik", Fernseh und Kino-Technik 54, Jahrgang Nr., pp. 100-105 (Mar. 2000).
Kartalopoulos, S V: "Consumer Communications in the Next Generation Access Network" Consumer Communications and Networking Conference, 2004. CCNC 2004. First *IEEE* Las Vegas, NV, USA Jan. 5-8, 2004, Piscataway, NJ, pp. 273-278 (Jan. 5, 2004).
CN, 200880117151.8 Office Action with English translation, Aug. 24, 2012.
JP, 2010-527121 Office Action with English translation, Jul. 12, 2012.
CN, Office Action, CN Appln. No. 200880115267.8, Jul. 8, 2013.
Examination Report, EP 11 770 586.3, Jan. 2, 2014.
CN, Office Action, Chinese Application No. 201080054409.1, Jan. 30, 2014.
Japanese Final Office Action, Application No. 2012-532141, May 20, 2014.
Australian Patent Examination Report No. 1, Application No. 2011298966, Jun. 25, 2014.
Office Action, Japanese Application No. 2013-240916, Oct. 28, 2014.
First Office Action, Chinese Application No. 201180043521.X, Nov. 26, 2014.

\* cited by examiner

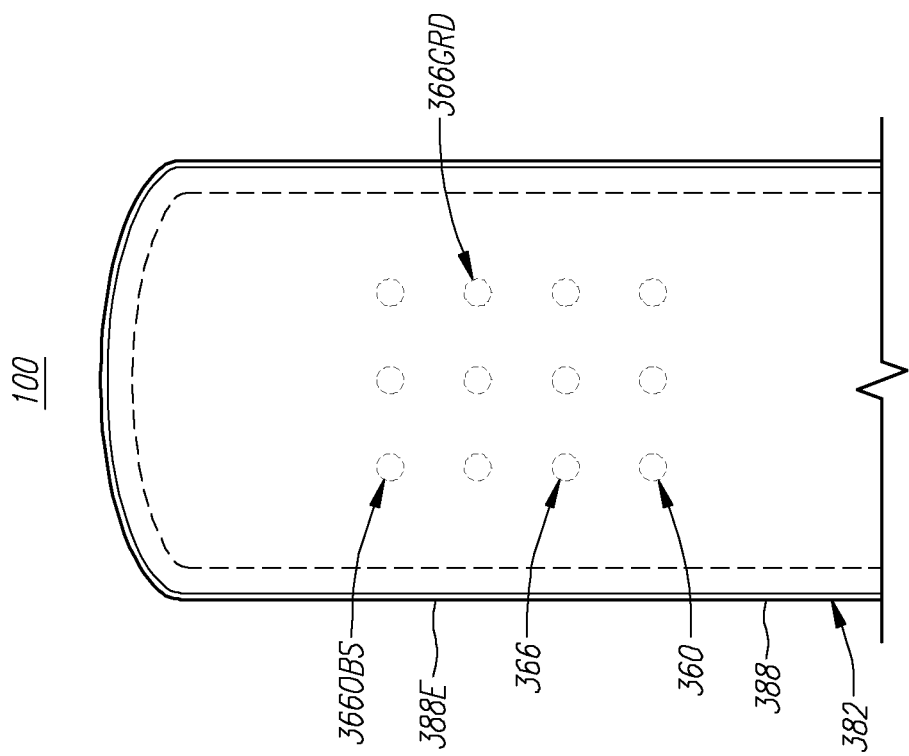

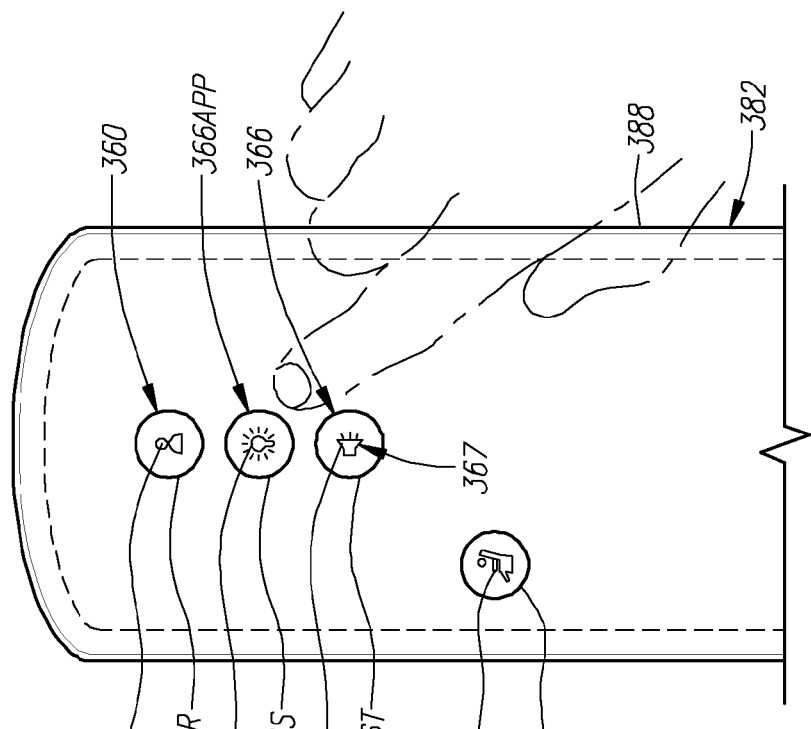
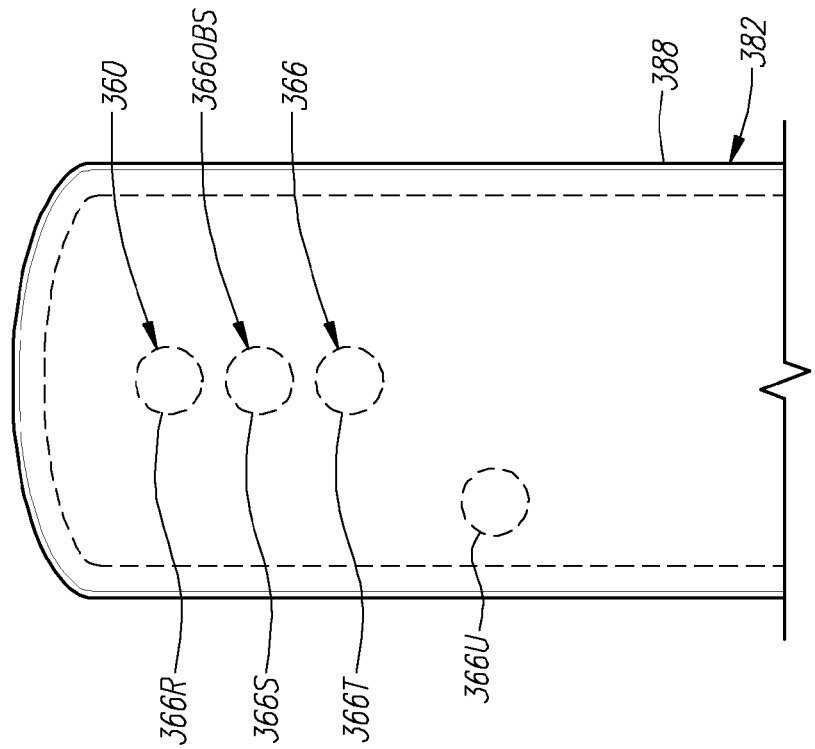
FIG. 18B
FIG. 18A

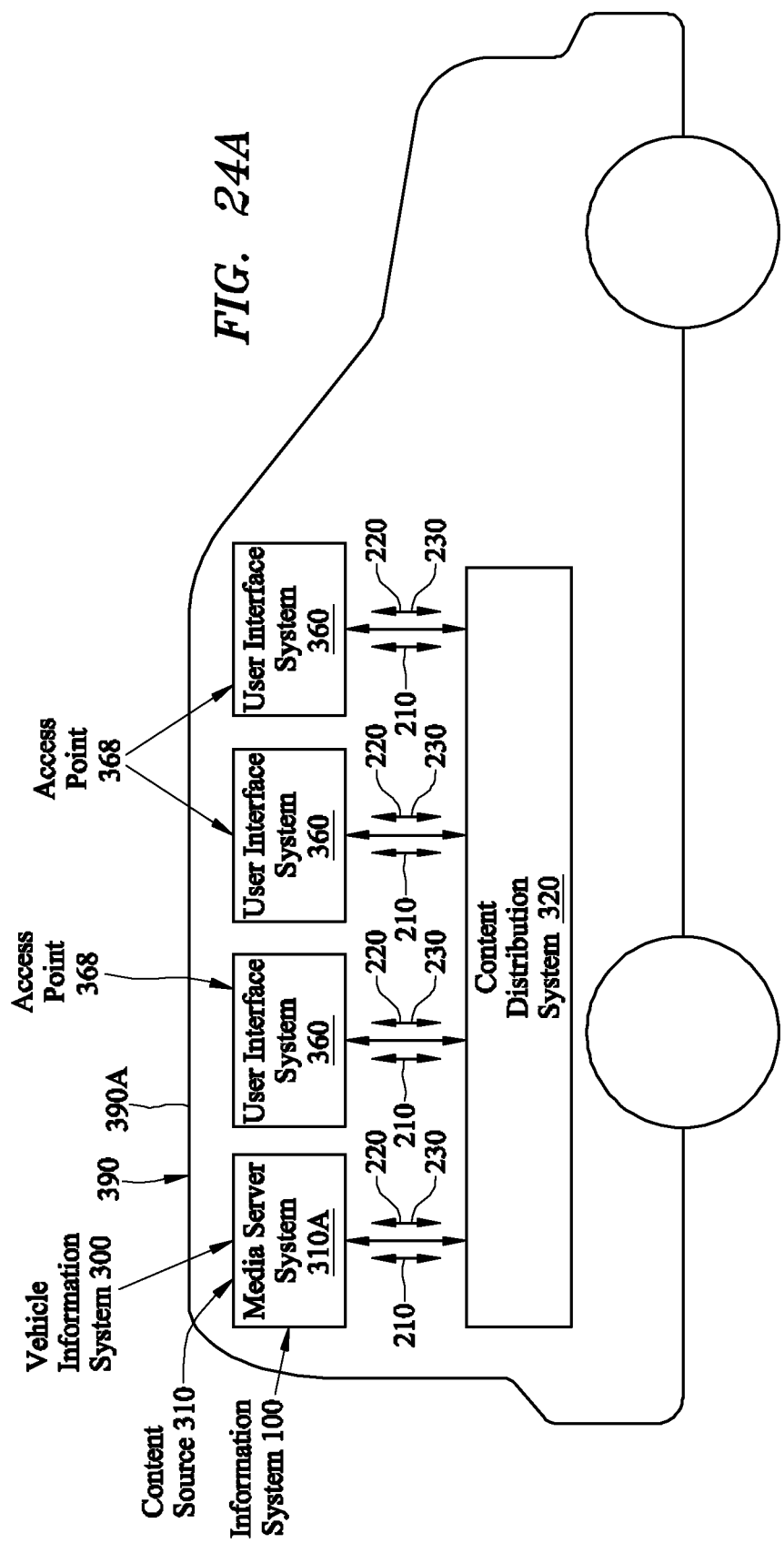

INTEGRATED USER INTERFACE SYSTEM AND METHOD

CROSS-REFERENCE TO RELATED APPLICATIONS

This application claims priority to U.S. provisional patent application Ser. No. 61/381,866, filed Sep. 10, 2010. Priority to the provisional patent application is expressly claimed, and the disclosure of the provisional application is hereby incorporated herein by reference in its entirety and for all purposes.

FIELD

The present disclosure relates generally to integrated electronic systems and more particularly, but not exclusively, to integrated user interface systems for disposal at chairs.

BACKGROUND

Computer-based systems typically provide user interfaces for enabling users to interact with the systems. Passenger vehicles, for example, often include vehicle information (or entertainment) systems for satisfying passenger demand for access to viewing content, such as entertainment content or other information, during travel.

Conventional vehicle information systems typically include overhead cabin video systems or chair-based video systems with individual controls such that viewing content is selectable at passenger chairs. The viewing content can include audio and video content that is derived from a variety of content sources. Prerecorded viewing content, such as motion pictures and music, can be provided by internal content sources, such as audio and video players, that are installed aboard the vehicle. The conventional vehicle information systems likewise can include an antenna system for receiving viewing content, such as live television programming and/or Internet content, transmitted from one or more content providers (or sources) that are external to, and/or remote from, the passenger vehicle.

Such conventional vehicle information systems, however, suffer from numerous disadvantages. Some passengers find the vehicle information systems to be complicated to operate and the viewing content difficult to enjoy. For example, current methods of passenger interaction with vehicle information systems require use of controls disposed on a facing chair back or a dedicated handheld controller at each passenger chair. Use of the handheld controllers, for example, can prove difficult because the handheld controllers are tethered with the passenger chairs via a wired communication connection and are otherwise difficult to operate. Such system shortcomings are a frequent source of passenger complaints during travel.

In view of the foregoing, a need exists for an improved manner for supporting passenger interaction with a vehicle information system in an effort to overcome the aforementioned obstacles and deficiencies of conventional vehicle information systems.

BRIEF DESCRIPTION OF THE DRAWINGS

FIG. 7A is an exemplary detail drawing illustrating an alternative embodiment of the user interface system of FIGS. 5A-C, wherein the selected interface elements are disposed in an alternative grid arrangement.

FIGS. 18A-B are exemplary detail drawings illustrating another alternative embodiment of the user chair of FIG. 1, wherein the user interface system can provide a user interface for controlling one or more chair features of the user chair.

FIG. 24A is an exemplary top-level drawing illustrating the information system of FIG. 1, wherein the information system is installed aboard an automobile.

Figure 1:
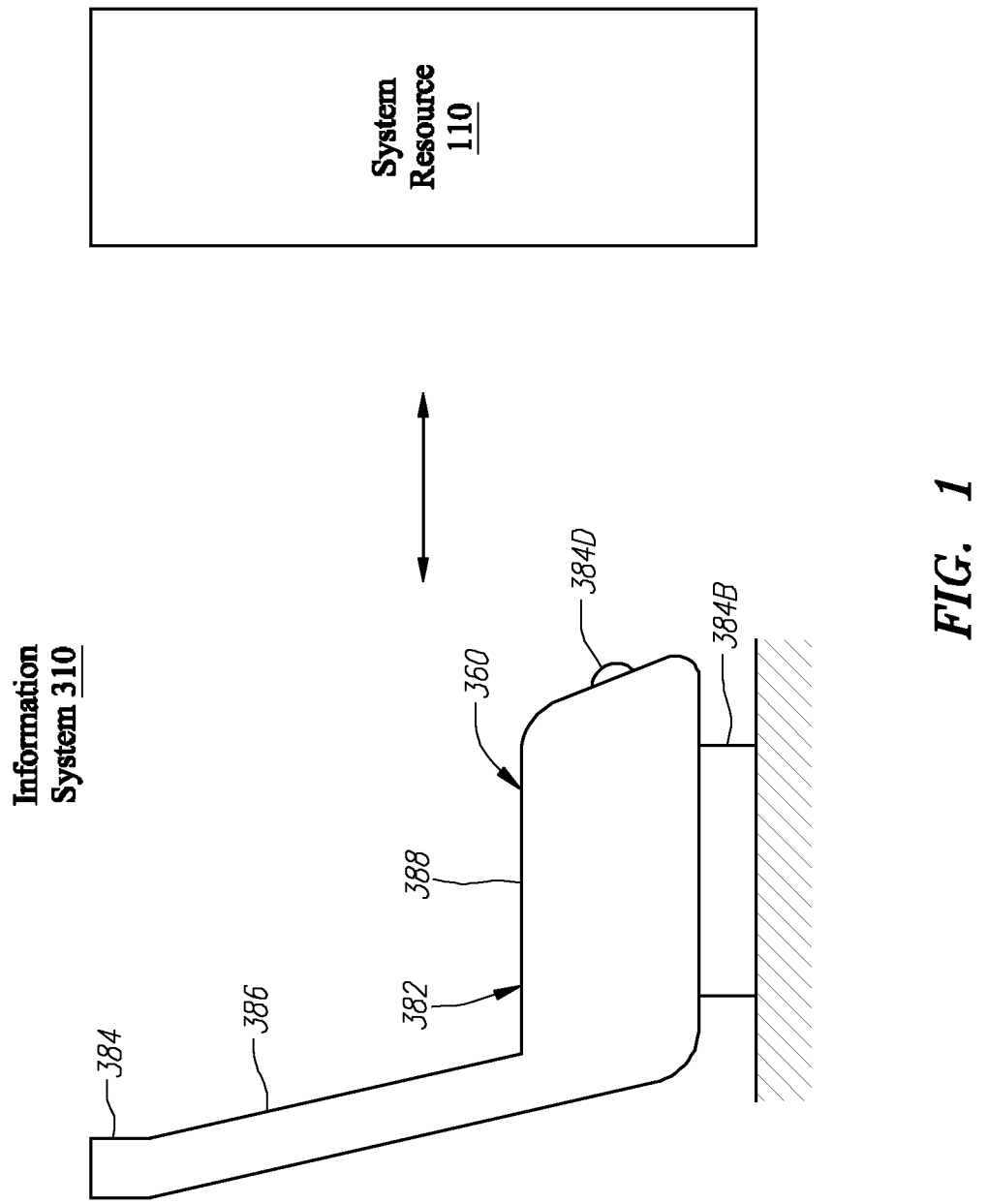
FIG. 1 is an exemplary top-level drawing illustrating an embodiment of a user chair with an integrated user interface system for interacting with selected system resources (or the associated resource functions) available via the information system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available vehicle information systems require the passenger chair to include chair-mounted or tethered controllers that are difficult to operate, an information system that eliminates the need for such controllers, while enhancing a user's level of interaction, can prove desirable and provide a basis for a wide range of system applications, such as vehicle information systems for use aboard automobiles, aircraft, and other types of vehicles during travel. This result can be achieved, according to one embodiment disclosed herein, by providing an integrated user (or passenger) interface system 360 at a user (or passenger) chair 382 as illustrated in FIG. 1.

Turning to FIG. 1, the user chair 382 is illustrated as including a plurality of conventional chair elements, such as a chair seat 384D and a chair back 386, wherein the chair elements are coupled via a chair frame (not shown) and supported by a chair base 384B. The user chair 382 can be provided in any conventional manner and with any suitable materials. The chair seat 384D, for example, can be disposed between a pair of armrests 388, and the chair back 386 can be provided with a headrest 384. As desired, the user chair 382 likewise can include one or more additional conventional chair features. Exemplary chair features can include a footrest, lumbar support, (manual and/or powered) chair position adjustments, in-chair massage, in-chair temperature control, and/or other conventional chair features without limitation. Typical chair position adjustments can include an adjustable headrest, armrest, footrest, lumbar support, chair back angle, forward/backward/lateral chair position, upward/downward chair elevation, and/or chair swivel.

If the user chair 382 is configured for use within an operating environment with an information system 100 as shown in FIG. 1, the integrated user interface system 360 advantageously can enable interaction with one or more selected system resources 110 (and/or at least one associated resource function (and/or application) of the selected system resources 110) available by way of the information system 100. The user interface system 360 can be disposed at one or more suitable locations (or regions) of the user chair 382. Exemplary suitable locations of the user chair 382 suitable for the user interface system 360 can include a left armrest 388L (shown in FIG. 3), a right armrest 388R (shown in FIG. 3), both armrests 388, a chair back 386, and/or a tray table of the user chair 382, without limitation. The tray table can be associated with any suitable chair region, such as a chair back 386 and/or an armrest 388, of the user chair 382.

At least a portion of the user interface system 360 optionally can be provided separately from the user chair 382, such as at one or more suitable locations (or regions) of a wall, a floor, a ceiling, an adjacent user chair, and/or any other suitable location within the operating environment. In one embodiment, a chair back 386 and/or armrest 388 of the adjacent user chair can provide the portion of the user interface system 360. The chair back 386 and/or armrest 388 of the adjacent user chair, for example, can provide a tray table, a video interface system 362 (shown in FIGS. 26A-B), an audio interface system 364 (shown in FIGS. 26A-B) that can be associated with the user interface system 360 of the user chair 382. The user interface system 360 thereby can eliminate a need for a separate, handheld control device at the user chair 382 while enhancing a level of interaction with the information system 100 in a new and exciting, but very natural, manner.

Advantageously, the user interface system 360 can be obscured from view (or otherwise de-emphasized) when a user is distal from the user interface system 360 and become apparent (or otherwise emphasized) when the user (and/or a hand of the user) approaches, and becomes proximate to, the user interface system 360. In one embodiment, the user interface system 360 can remain emphasized while the user indicates a desire to utilize the user interface system 360. The user interface system 360 optionally can become obscured from view or otherwise de-emphasized when utilization of the user interface system 360 is not desired. The user interface system 360, for example, can become obscured upon sensing that the user hand is withdrawing from (and/or has been withdrawn from) the user interface system 360. Alternatively, and/or additionally, the user interface system 360 can obscure the user interface system 360 after a predetermined time period has elapsed after the user hand has been withdrawn. The predetermined time period can be within any predetermined range of time periods, such as any ten-second range between ten seconds and sixty seconds (or more).

In one embodiment, the user interface system 360 can be at least partially disposed within the user chair 382. The user interface system 360 thereby can be obscured from view by a chair covering when a user is distal from the user interface system 360 and can become apparent when the user approaches, and becomes proximate to, the user interface system 360. The user interface system 360 optionally can be obscured from view when the user withdraws from the user interface system 360 and/or when the user interface system 360 enters an idle mode (and/or in a powered-down mode). In other words, the user chair 382 can appear to be an ordinary chair when the user interface system 360 is not in use; whereas, the user chair 382 can present the user interface system 360 when the user wishes to utilize the user interface system 360. The user chair 382 can permit the user to indicate a desire to utilize the user interface system 360 in any suitable manner, such as by placing a hand (or a finger) near a location of the user chair 382 at which the user interface system 360 is disposed.

Figure 2A:
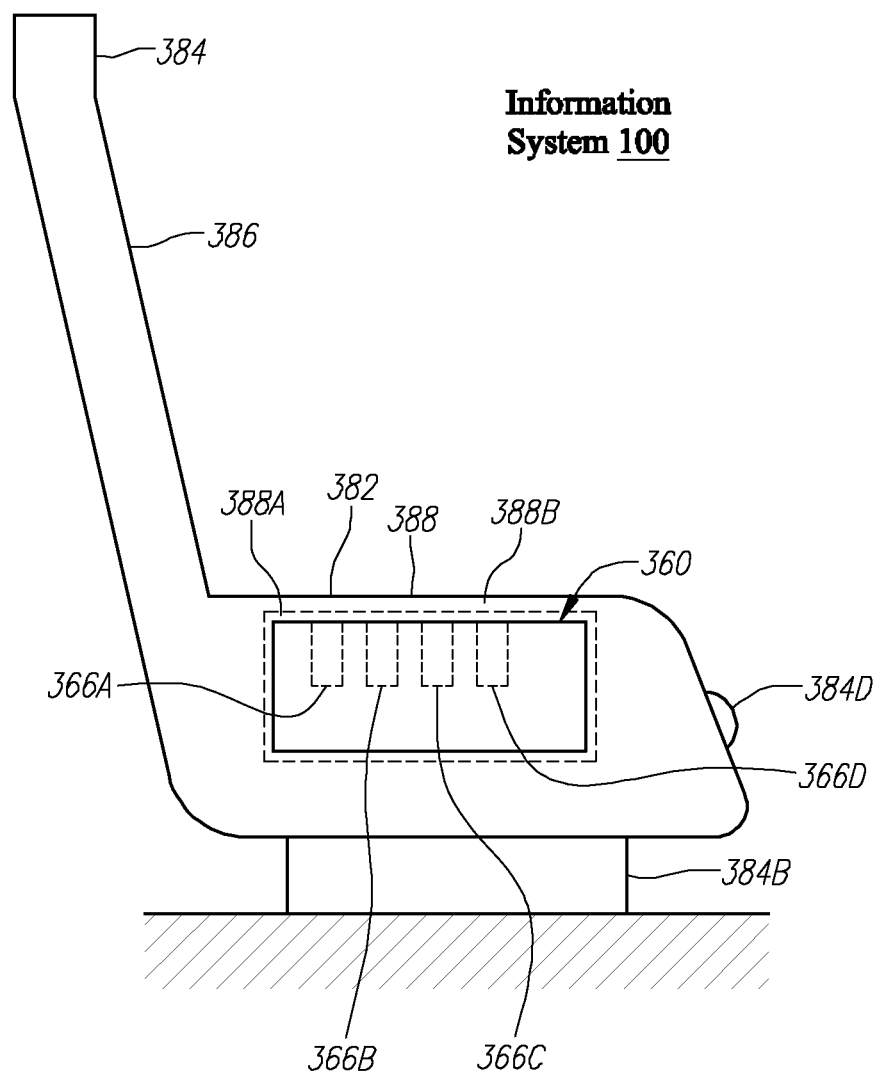
FIG. 2A is an exemplary top-level drawing illustrating an alternative embodiment of the user chair of FIG. 1, wherein the user interface system is disposed within an armrest of the user chair and is obscured by an armrest covering when a user is distal from the user interface system.
Figure 2B:
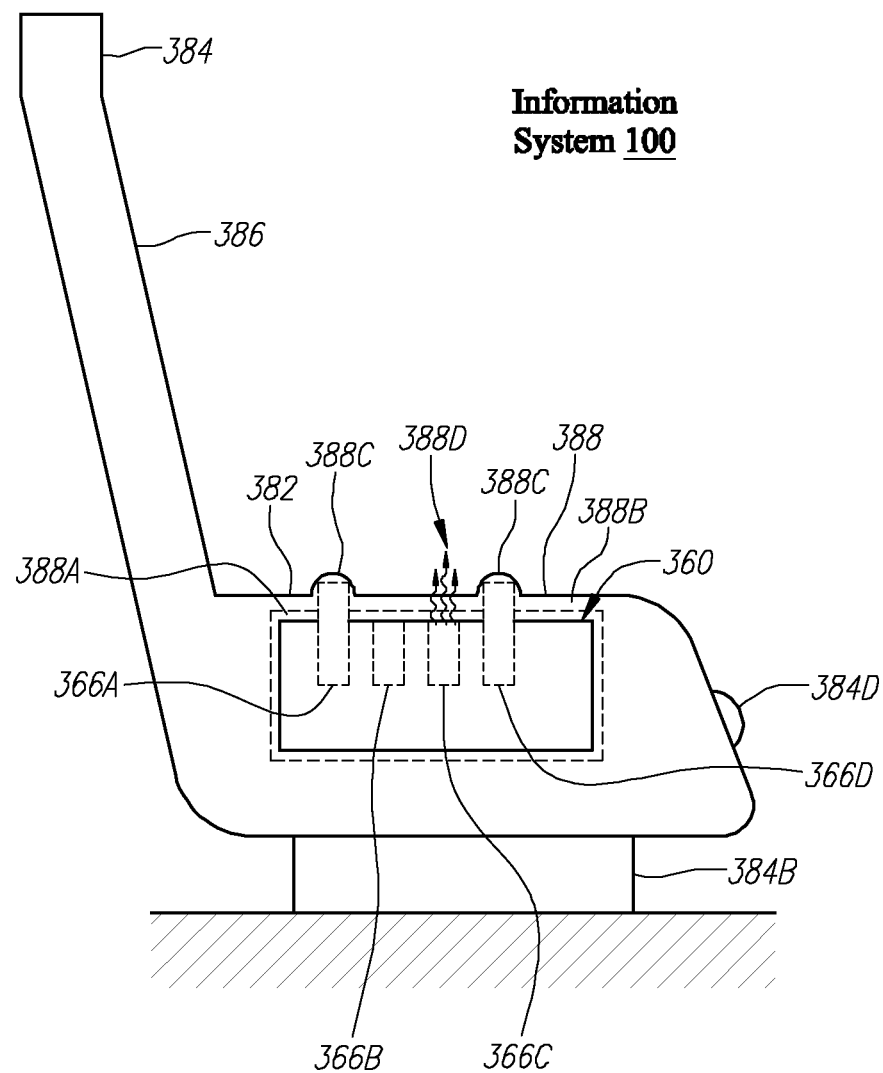
FIG. 2B is an exemplary top-level drawing illustrating an alternative embodiment of the user chair of FIG. 2A, wherein the user interface system becomes apparent when the user is proximate to the user interface system.

FIGS. 2A-B illustrate an exemplary embodiment of the user chair 382, wherein at least a portion of the user interface system 360 is disposed within a selected armrest 388 of the user chair 382. The user chair 382 preferably provides a chair compartment 388A with suitable size and/or dimension for receiving the user interface system 360. As illustrated in FIG. 2A, the chair compartment 388A is disposed adjacent to the selected armrest 388 and is partially defined by an armrest covering 388B of the user chair 382. The armrest covering 388B comprises a region (and/or surface) of the armrest 388 upon which the user can rest an arm when seated in the user chair 382. When the user interface system 360 is disposed within the chair compartment 388A, the armrest covering 388B can cover the user interface system 360 such that the user interface system 360 is enclosed within the chair compartment 388A.

The user interface system 360 can comprise one or more interface elements 366 and is shown in FIG. 2A as including a selected arrangement of four interface elements 366A-D for purposes of illustration only, not for purposes of limitation. The interface elements 366 preferably are positioned adjacent to (and/or flushly disposed against) the armrest covering 388B and can be selectively presented by the user chair 382 via the armrest covering 388B. In the manner discussed above, the interface elements 366A-D can be obscured from view by the armrest covering 388B as shown in FIG. 2A when the user is distal from the interface elements 366. The interface elements 366A-D, when obscured, preferably are disabled and/or are unable to be manipulated. The interface elements 366A-D thereby can be inhibited from interacting with the system resource(s) 110 (and/or the associated resource function(s)) available by way of the information system 100 (shown in FIG. 1).

When the user hand approaches, and becomes proximate to, the user interface system 360, however, one or more selected interface elements 366A-D can become apparent (and/or emphasized) via the armrest covering 388B as illustrated in FIG. 2B. The selected interface elements 366A-D, upon becoming apparent, are activated for use and thereby can be manipulated to interact with the system resource(s) 110 (and/or the associated resource function(s)) available by way of the information system 100. Stated somewhat differently, one or more selected interface elements 366A-D, when activated, can be associated with a preselected control function. The selected interface elements 366A-D can be manipulated to initiate the preselected control function, and one or more system resources 110 can receive the preselected control function from the user interface system 360 and perform the preselected control function. For example, if the interface element 366A and the interface element 366D are activated for use and respectively associated with audio volume increase and decrease control functions, a user can manipulate the interface element 366A to increase an audio volume of viewing content 210 (shown in FIGS. 22A-B) presented at the user chair 382 and can manipulate the interface element 366D to decrease the audio volume.

Additionally, and/or alternatively, a selected interface element 366A-D, when activated, can be associated with one or more preselected control functions for interacting with the system resources 110. The selected interface element 366A-D can be manipulated to initiate at least one of the preselected control functions, and the system resources 110 can receive the initiated preselected control function from the user interface system 360 and perform the initiated preselected control function. The interface element 366A, for example, can be activated for use and associated with audio volume control function. A user thereby can alternately manipulate the interface element 366A to increase and/or decrease the audio volume of the viewing content 210 presented at the user chair 382.

For instance, the interface element 366A can be manipulated in a first manner to increase the audio volume and manipulated in a second manner to decrease the audio volume. The second manner for manipulating the interface element 366A can be the same as, and/or different from, the first manner. In one embodiment, the interface element 366A can be pushed (or turned) in a first direction to increase the audio volume and can be pushed (or turned) in a second (or opposite) direction to decrease the audio volume. Alternatively, the interface element 366A can be pushed once to increase the audio volume and pushed twice in succession (and/or pushed a second time) to decrease the audio volume.

The selected interface elements 366A-D can become apparent via the armrest covering 388B in any conventional manner. FIG. 2B, for example, shows that the interface elements 366A, 366D, upon becoming apparent, can extend from the user interface system 360 and engage the armrest covering 388B. By extending from the user interface system 360 and engaging the armrest covering 388B, each of the apparent interface elements 366A, 366D can form a raised projection (or bump) 388C at an associated region of the armrest covering 388B. Each projection 388C of the armrest covering 388B can be provided with any suitable size, shape, and/or dimension and can extend from the armrest covering 388B (and/or the user interface system 360) by any predetermined distance. The predetermined distance can be within any preselected range of distances, such as any half-millimeter range between one-half millimeter and three millimeters (or more).

The predetermined distances by which the projections 388C extend from the armrest covering 388B can be the same, and/or different, among the apparent interface elements 366A, 366D. For example, one or more boundary interface elements 366BND (shown in FIGS. 17A-B) can form projections 388C that define a boundary that at least partially surrounds one or more other projections 388C formed by one or more emphasized interface elements 366APP (shown in FIGS. 17A-B). In other words, the emphasized interface elements 366APP can include one or more boundary interface elements 366BND. The boundary interface elements 366BND alternatively can comprise interface elements 366 other than the emphasized interface elements 366APP.

Although emphasized in the manner set forth above with reference to the emphasized interface elements 366APP, the emphasis applied to the boundary interface elements 366BND preferably differs from the emphasis applied to the emphasized interface elements 366APP such that the boundary interface elements 366BND and the emphasized interface elements 366APP are visually distinguishable. The first projections 388C formed by the boundary interface elements 366BND can extend from the armrest covering 388B by first predetermined distances; whereas, the second projections 388C formed by the emphasized interface elements 366APP can extend from the armrest covering 388B by second predetermined distances. Although the first predetermined distance and the second predetermined distance can comprise uniform distances, the first predetermined distances preferably are different from the second predetermined distances to enable the boundary interface elements 366BND to be readily distinguished from the emphasized interface elements 366APP.

The second projections 388C formed by the emphasized interface elements 366APP can be manipulated to initiate the preselected control functions in the manner set forth above. In one embodiment, at least one of the boundary interface elements 366BND can comprise emphasized interface elements 366APP. The boundary interface elements 366BND, upon becoming apparent, can form first projections 388C that can be manipulated to initiate the preselected control functions like the emphasized interface elements 366APP. In an alternative embodiment, one or more of the boundary interface elements 366BND can be inert and cannot be manipulated to initiate preselected control functions.

Additionally, and/or alternatively, the boundary can be formed with the other types of observable emphasis, such as illumination and/or presentation of control indicia, for the boundary interface elements 366BND. The boundary interface elements 366BND, for example, can be illuminated with a different color than the emphasized interface elements 366APP. The boundary interface elements 366BND optionally can present control indicia for identifying the emphasized interface elements 366APP as being activated for manipulation to initiate the preselected control functions. The control indicia, for example, can provide textual and/or graphic indicia for identifying the preselected control function(s) associated with the emphasized interface elements 366APP in the manner discussed in more detail below.

The projections 388C enable the user chair 382 to present the apparent interface elements 366A, 366D with a tactile feel for facilitating manipulation of the apparent interface elements 366A, 366D. In other words, the apparent interface elements 366A, 366D can be actuated by manipulating the respective projections 388C formed on the armrest covering 388B. The armrest covering 388B optionally can be provided as a pliable armrest covering that enables formation and/or manipulation of the projections 388C. Stated somewhat differently, the armrest covering 388B preferably is formed from a supple material such as leather or suede. The material forming the armrest covering 388B can be the same as, or different from, material covering other chair components of the user chair 382.

One or more of the selected interface elements 366A-D alternatively, and/or additionally, can become apparent by becoming visible at the armrest covering 388B. For example, the interface element 366C, upon becoming apparent, can become visible 388D at an associated region of the armrest covering 388B as illustrated in FIG. 2B and can be actuated by manipulating the associated region of the armrest covering 388B in the manner set forth above. The selected interface elements 366A-D can become visible at the armrest covering 388B in any conventional manner, including by becoming illuminated, by presenting control indicia, and/or by otherwise becoming observably emphasized. Exemplary control indicia can include function icons 367 (shown in FIG. 6B) that represent the preselected control functions associated with the selected interface elements 366 when the selected interface elements 366 are activated.

The function icons 367 can provide textual and/or graphic indicia for identifying the preselected control function(s) associated with the selected interface elements 366 and can be presented in any conventional manner. If the preselected control functionality of the selected interface elements 366 is fully programmable, for instance, the selected interface elements 366 can be programmed to provide the function icons 367. In a preferred embodiment, the armrest covering 388B is formed from a translucent material that enables observable emphasis provided by the apparent interface element 366C to pass through the armrest covering 388B and/or manipulation of the apparent interface element 366C via the armrest covering 388B. In other words, the apparent interface element 366C and/or any control indicia associated with the control the apparent interface element 366C can be backlit and thereby can become visible through the armrest covering 388B.

When the user hand approaches, and becomes proximate to, the user interface system 360, one or more of the interface elements 366 may remain obscured by the armrest covering 388B; while, other interface elements 366 become apparent. Selection of which interface elements 366 remain obscured and which interface elements 366 become apparent can depend upon any selected criteria, including a predetermined application of the user interface system 360. In other words, the number and/or arrangement of activated interface elements 366 can be based at least in part upon a type of user interface that is suitable for interacting with the relevant system resource(s) 110 (shown in FIG. 1) (and/or the associated resource function(s)) available by way of the information system 100 (shown in FIG. 1). If the predetermined application is a game, for example, the user interface system 360 can present an appropriate arrangement of one or more activated interface elements 366 to provide a gaming interface system 360GAME (shown in FIGS. 8A-B, 9A-B, 10A-B, and 11A-B) for playing one or more user games available by way of the information system 100.

Any of the interface elements 366 that remain obscured by the armrest covering 388B are inactive and cannot be utilized to interact with the system resource(s) 110 (and/or the associated resource function(s)) available by way of the information system 100. As illustrated in FIGS. 2A-B, for example, the interface elements 366A, 366C, 366D can become apparent in the manner discussed in more detail above when the user hand approaches, and becomes proximate to, the user interface system 360; however, the interface element 366B can remain recessed within the chair compartment 388A or otherwise obscured by the armrest covering 388B. Although shown and described as comprising a particular arrangement of four interface elements 366A-D disposed at the selected armrest 388 for purposes of illustration only, each user interface system 360 can comprise any preselected number and/or arrangement of interface elements 366 and can be disposed at any suitable location of the user chair 382 as desired.

The user interface system 360 can be provided with any physical characteristics, such as size (and/or dimension) and/or shape (and/or geometry), as desired. The interface elements 366 likewise can be provided with any suitable physical characteristics. Exemplary physical characteristics of the interface elements 366 include a quantity, size, shape, spacing, and/or arrangement of the interface elements 366. The physical characteristics of the user interface system 360 and/or the interface elements 366 preferably are based upon at least the location of the user chair 382 at which the user interface system 360 is disposed, a size and/or shape of the location, and/or the type(s) of control interfaces suitable for interacting with the system resource(s) 110 (and/or the associated resource function(s)) available by way of the information system 100.

In one embodiment, the user interface system 360 is fully programmable (or reprogrammable). Stated somewhat differently, the interface elements 366 of the user interface system 360 can be automatically configured (or reconfigured) to remain obscured and/or to become apparent for performing any suitable preselected control function(s) when the user interface system 360 is activated to interact with a selected system resource(s) 110 (and/or the associated resource function(s)). In one embodiment, each system resource 110 is associated with one or more selected interface elements 366, and the selected interface elements 366 can be programmed to be selectively activated to provide the preselected control function(s) appropriate for the selected system resource 110. The predetermined interface elements 366 thereby are fully interchangeable and can be programmed to provide a first preselected control function if installed in a second user chair 382 and to provide a first preselected control function if installed in a second user chair 382. Selection and arrangement of the relevant interface elements 366, for example, can be configured to automatically accommodate predetermined user preferences, such as those of right-handed and left-handed users.

Advantageously, the observable emphasis of the selected interface elements 366 likewise can be programmable or configurable. The user interface system 360 can support multi-color illumination of the selected interface elements 366 in one embodiment. The illumination and/or control indicia of the selected interface elements 366 can be based, for example, upon the system resource(s) 110 (and/or the associated resource function(s)) that is selected. Thereby, a selected interface element 366 can present a first color (or first control indicia) when a first system resource 110 is selected and a second color (or second control indicia) when a second system resource 110 is selected. The observable emphasis preferably provides guidance for using the user interface system 360 to provide the preselected control functions to the relevant system resource(s) 110.

If the user chair 382 is configured for use with an information system 100 that includes first and second system resources 110, for example, the user interface system 360 of FIGS. 2A-B can be automatically configured to interact with the system resources 110. The user interface system 360 can be obscured from view when a user is distal from the user interface system 360 in the manner set forth above. When a hand of the user becomes proximate to the user interface system 360 and indicates a desire to interact with the first system resource 110, the interface elements 366A, 366D can be activated for providing preselected control function(s) to the first system resource 110; while, the interface elements 366B, 366C remain obscured. Activation of the interface elements 366A, 366D can include enabling the interface elements 366A, 366D to present suitable control indicia for utilizing the user interface system 360 to provide the preselected control function(s) to the first system resource 110. A subsequent indication of a desire to interact with the second system resource 110 can activate the interface elements 366C, 366D for providing preselected control function(s) to the second system resource 110 and for presenting suitable control indicia for utilizing the user interface system 360 to provide the preselected control function(s) to the second system resource 110. The interface element 366C becomes obscured, and the interface element 366B remains obscured.

The control over the user interface system 360 can be implemented in any conventional manner, such as via one or more hardware components and/or software components associated with the user chair 382 and/or the information system 100. In one embodiment, the control over the user interface system 360 can comprise a computer program product for controlling the user interface system 360 provided at the user chair 382, wherein the computer program product is encoded on more or more machine-readable storage media. The hardware components and/or software components can, for example, provide a plurality of instructions for controlling the user interface system 360 provided at the user chair 382. Exemplary control instructions can include instruction for visually obscuring the interface elements 366 when a user is distal from the user interface system 360, instruction for activating and/or emphasizing selected interface elements 366 when a hand of the user becomes proximate to the user interface system 360 and/or indicates a desire to interact with a selected system resource 110, instruction for maintaining the visual obscurity of any interface elements 366 that are not utilized to interact with the selected system resource 110, and/or instruction for visually obscuring the interface elements 366 of the user interface system 360 when the user interface system 360 is in an idle mode and/or in a powered-down mode.

To avoid inadvertent activation, the user may be required to execute a distinctive act, such as perform a predetermined hand gesture adjacent to the user interface system 360, for indicating a desire to utilize the user interface system 360. The distinctive act can simply activate (and/or deactivate) the user interface system 360 in one embodiment. Alternatively, and/or additionally, each predetermined application of the user interface system 360 can be associated with a different distinctive act. In other words, selection of which interface elements 366 remain obscured and which interface elements 366 become apparent can depend upon the distinctive act performed. The user interface system 360 likewise can be deactivated by performance of a distinctive act for deactivating the user interface system 360. Once a selected distinctive act is performed, the user interface system 360 can present a preselected number and/or arrangement of interface elements 366 suitable for utilizing the associated application of the user interface system 360.

If the user interface system 360 comprises a plurality of user interface portions disposed at respective locations of the user chair 382, a selected distinctive act can activate an individual user interface portion, two or more predetermined user interface portions as an interface portion group, and/or all user interface portions. Selection of the user interface portions to be activated can be based upon any selected criteria, including a predetermined application of the user interface system 360. In other words, the activation of the user interface portions can be based upon the nature of the interaction with the system resource(s) 110 (and/or the associated resource function(s)) available by way of the information system 100. The selected distinctive act can be performed adjacent to any interface portion of the user interface system 360 in one embodiment. In an alternative embodiment, the selected distinctive act is performed adjacent to a predetermined interface portion located, for example, at a right armrest 388R (shown in FIG. 3) of the user chair 382. The user interface system 360 thereby can be activated for facilitating interaction with the system resource(s) 110 (and/or the associated resource function(s)) available by way of the information system 100 in the manner set forth above.

Figure 3:
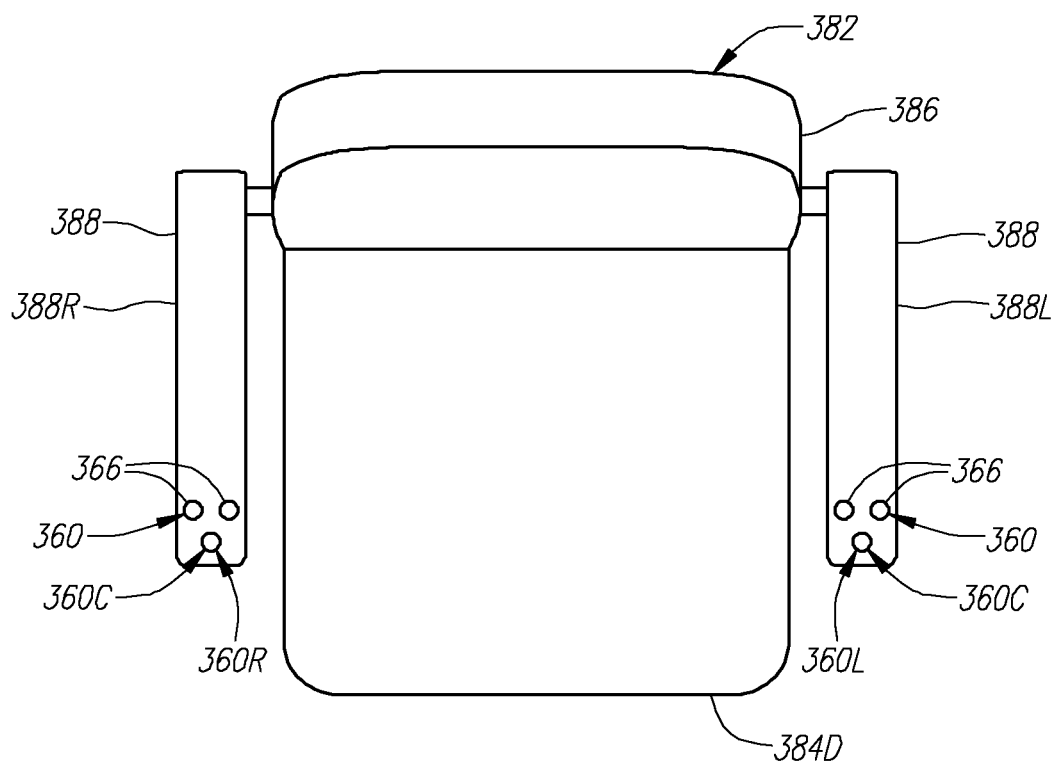
FIG. 3 is an exemplary top-level drawing illustrating another alternative embodiment of the user chair of FIG. 1, wherein the user interface system is partially disposed at each armrest of the user chair.

Turning to FIG. 3, another exemplary embodiment of the user chair 382 is shown, wherein the user interface system 360 includes left and right user interface systems 360L, 360R that are respectively disposed at left and right armrests 388L, 388R of the user chair 382. Although the left and right user interface systems 360L, 360R can comprise independent user interface systems 360 for supporting separate interaction with the system resource(s) 110 (shown in FIG. 1) (and/or the associated resource function(s)) available by way of the information system 100, the left and right user interface systems 360L, 360R preferably form a composite user interface system 360C for interacting with the system resources 110. The left and right user interface systems 360L, 360R each can comprise one or more interface elements 366 in the manner discussed in more detail above with reference the user interface system 360 of FIGS. 2A-B. Advantageously, the left user interface system 360L can be the same as, or different from, the right user interface system 360R.

In the manner discussed above, the interface elements 366 can be obscured from view when a user is distal from the user interface system 360C, and one or more selected interface elements 366 can become apparent when the hand of the user approaches, and becomes proximate to, the user interface system 360L and/or the user interface system 360R. The interface elements 366 of the user interface systems 360L, 360R can include a plurality of conventional control elements of any kind, including mechanical, electrical, and/or virtual control elements, that can be selectably activated for enabling interaction with the information system 100 without limitation. Exemplary control elements can comprise one or more switches, such as a pushbutton, a keyboard, or a keypad, a pointing device, such as a mouse or trackball, a touch pad (or touch point) 366TCH (shown in FIGS. 20A-B), a touch screen display system, and/or any other conventional types of control elements without limitation. The interface elements 366 can be provided in any manner, including physically disposing the interface elements 366 at the user chair 382 and/or virtually disposing the interface elements 366 at the user chair 382, such as by projecting the interface elements 366 onto one or more selected locations (or regions) of the user chair 382.

In one embodiment, the user interface system 360 can include a touch film interface system (or layer), such as a capacitive sensor system. Exemplary touch film interface systems are set forth in the co-pending U.S. patent application, entitled "SYSTEM AND METHOD FOR INTERACTING WITH INFORMATION SYSTEMS," Ser. No. 12/897,589, filed on Oct. 4, 2010, which is assigned to the assignee of the present application and the disclosure of which is hereby incorporated herein by reference in its entirety and for all purposes. One or more of the interface elements 366 can incorporate the touch film interface system to form touch pads (or touch points) 366TCH (shown in FIGS. 20A-B). The touch points can be provided in any conventional manner, such as via one or more conventional pushbuttons. More preferably, at least one of the touch points can comprise a capacitive button for detecting an approach of a hand (or finger) of a user prior to actual contact with the touch point. The touch points can be associated with a selected armrest 388 of the user chair 382. Additionally, and/or alternatively, the user interface system 360 can include a proximity sensor (not shown) for detecting the user hand. Use of the proximity sensor system and/or capacitive buttons can enable the user interface system 360 to be actuated prior to actual contact with a touch point. As desired, the proximity sensor system can be adapted to detect a user hand adjacent to any relevant portion of the user interface system 360.

The proximity sensor system and/or the touch points preferably are fully programmable in the manner set forth above. In other words, each touch point can include a dedicated processing system, such as a microprocessors (μPs), central processing units (CPUs), application-specific integrated circuits (ASICs), field programmable gate arrays (FPGAs), and/or digital signal processors (DSPs) of any kind. For example, a touch sensitivity of the capacitive buttons can be adjusted to any suitable sensitivity. The touch sensitivity can be set with a higher sensitivity such that the touch point can sense a user hand positioned above the user interface system 360 by about an inch or more and/or with a lower sensitivity such that physical contact between the user hand and the touch point is required. The higher touch sensitivities, for instance, can be used to sense distinctive acts, such a predetermined hand gestures, for indicating a desire to utilize the user interface system 360 in the manner discussed in more detail above.

In the manner discussed above, the touch points of the user interface system 360 can be obscured from view (or otherwise de-emphasized) when a user is distal from the user interface system 360 and can become apparent (or otherwise emphasized) when the user (and/or a hand of the user) approaches, and becomes proximate to, the user interface system 360. In one embodiment, the touch points can be illuminated or otherwise observably emphasized as desired, such as when the user indicates a desire to utilize the user interface system 360, and/or can be obscured from view or otherwise de-emphasized when utilization of the user interface system 360 is not desired. The touch point, for example, can become obscured immediately upon sensing that the user hand is withdrawing from (and/or has been withdrawn from) the user interface system 360 and/or can obscure the user interface system 360 after a predetermined time period has elapsed after the user hand has been withdrawn. The predetermined time period can be within any predetermined range of time periods, such as any ten-second range between ten seconds and sixty seconds (or more).

Figure 4A:
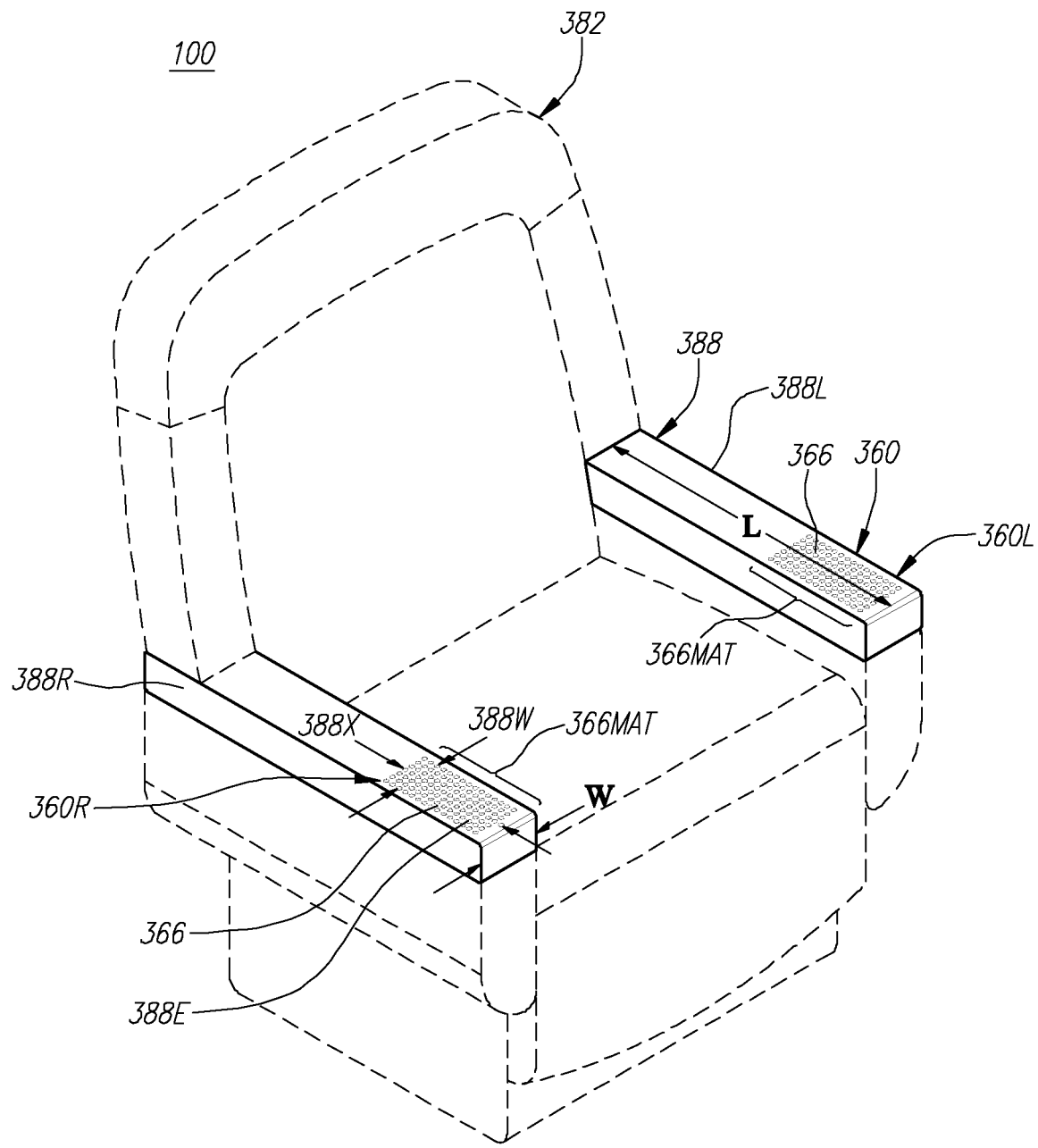
FIG. 4A is an exemplary drawing illustrating an alternative embodiment of the user chair of FIG. 3, wherein the user interface system is provided as an array (or matrix) of interface elements.
Figure 4B:
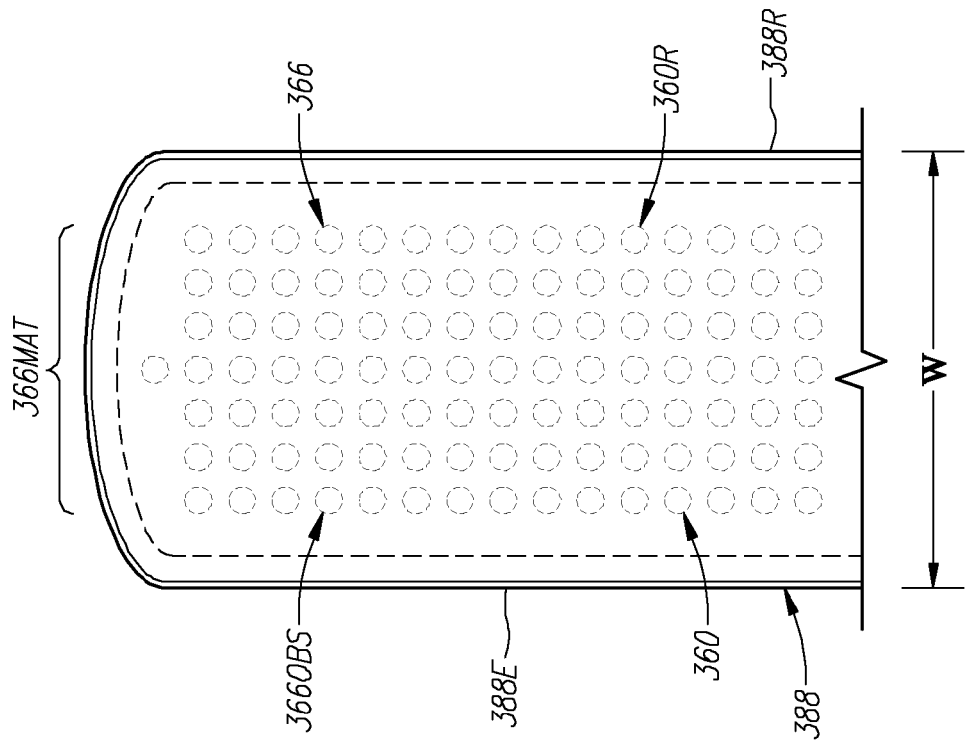
FIG. 4B is an exemplary detail drawing illustrating the user interface system of FIG. 4A, wherein the interface elements are de-emphasized.
Figure 4B:
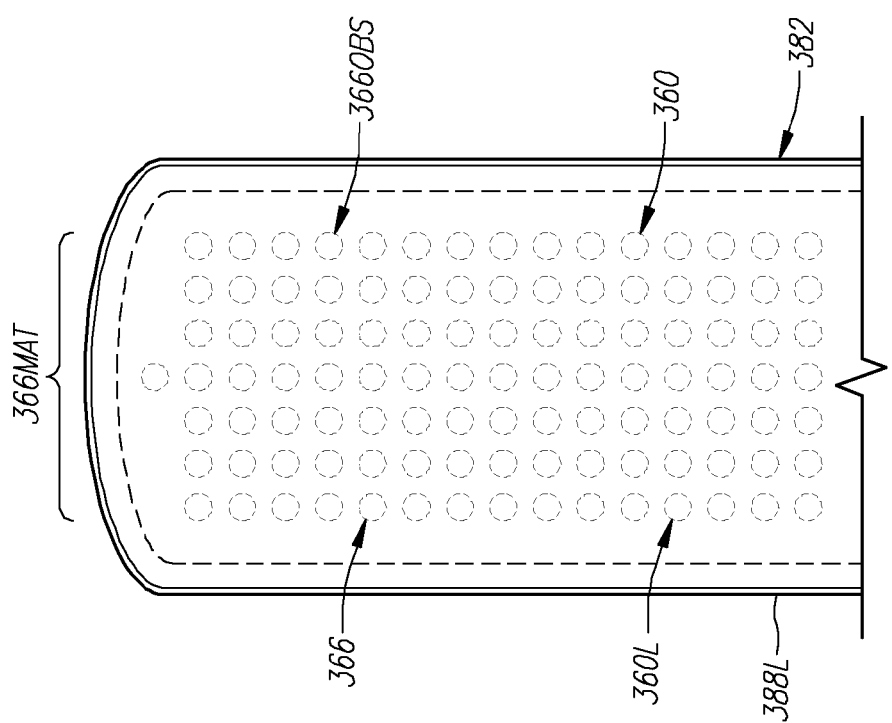

An alternative embodiment of the user chair 382 of FIG. 3 is shown in FIGS. 4A-D. Turning to FIGS. 4A-B, the user chair 382 includes a user interface system 360 that is disposed at the left armrest 388L and/or the right armrest 388R of the user chair 382 and that is provided in the manner discussed in more detail above with reference to the user interface system 360 of FIG. 3. The user interface system 360 is illustrated as comprising a plurality of interface elements 366 that are disposed in an array (or matrix) arrangement 366MAT. Each matrix 366MAT can be provided with any suitable dimension and can include any predetermined number of interface elements 366 with any preselected spacing between adjacent interface elements 366. The matrix 366MAT is illustrated in FIGS. 4A-B are comprising rows and columns of interface elements 366, wherein the columns are parallel with a longitudinal axis of the selected armrest 388 for purposes of illustration, not of limitation. The rows and/or columns of interface elements 366 can be oriented at any preselected angle relative to the longitudinal axis of the selected armrest 388. The preselected angle can be within any predetermined range of angles, such as any five-degree range between zero degrees and forty-five degrees (or more).

The number, spacing, and/or arrangement of the interface elements 366 can be the same, and/or different, among the matrices 366MAT. Preferably disposed adjacent to a distal end region 388E of the relevant armrest 388 upon which a user hand normally would rest, each matrix 366MAT can span a predetermined width 388W and/or a predetermined length 388X of the relevant armrest 388. The predetermined length 388X can be within any preselected range of lengths, such as any one-inch range between one inch and twelve inches (or longer). In other words, the width 388W of a selected matrix 366MAT can comprise a preselected percentage of a width W of the relevant armrest 388; whereas, the length 388X of the selected matrix 366MAT can comprise a preselected percentage of a length L of the relevant armrest 388.

The width 388W can be within any preselected range of percentages of the width W, such as any five-percent range between ten percent and ninety percent (or more). The length 388X can be within any preselected range of percentages of the length L, such as any five-percent range between ten percent and fifty percent (or more). In one embodiment, the matrix 366MAT can comprise a rectangular grid 366GRD (shown in FIG. 5A) of interface elements 366 with a predetermined number of rows and a predetermined number of columns. Preferably comprising a subset of the interface elements 366 forming the matrix 366MAT, the interface elements 366 associated with the rectangular grid 366GRD can be oriented at any preselected angle relative to the longitudinal axis of the selected armrest 388 in the manner discussed above with reference to the matrix 366MAT.

Figure 4C:
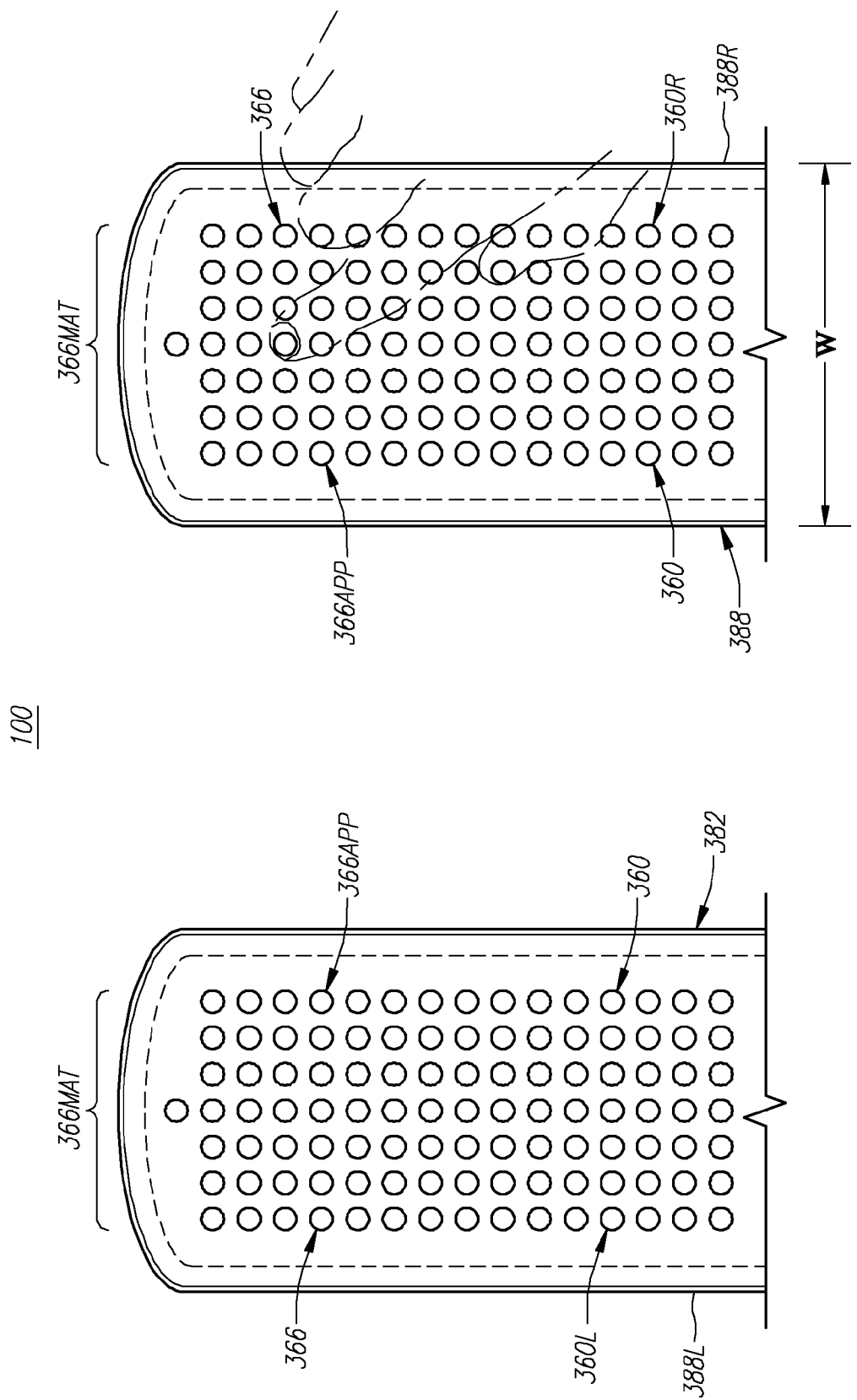
FIG. 4C is an exemplary detail drawing illustrating the user interface system of FIG. 4A, wherein the interface elements are emphasized when a hand of a user approaches, and becomes proximate to, the user interface system.
Figure 4D:
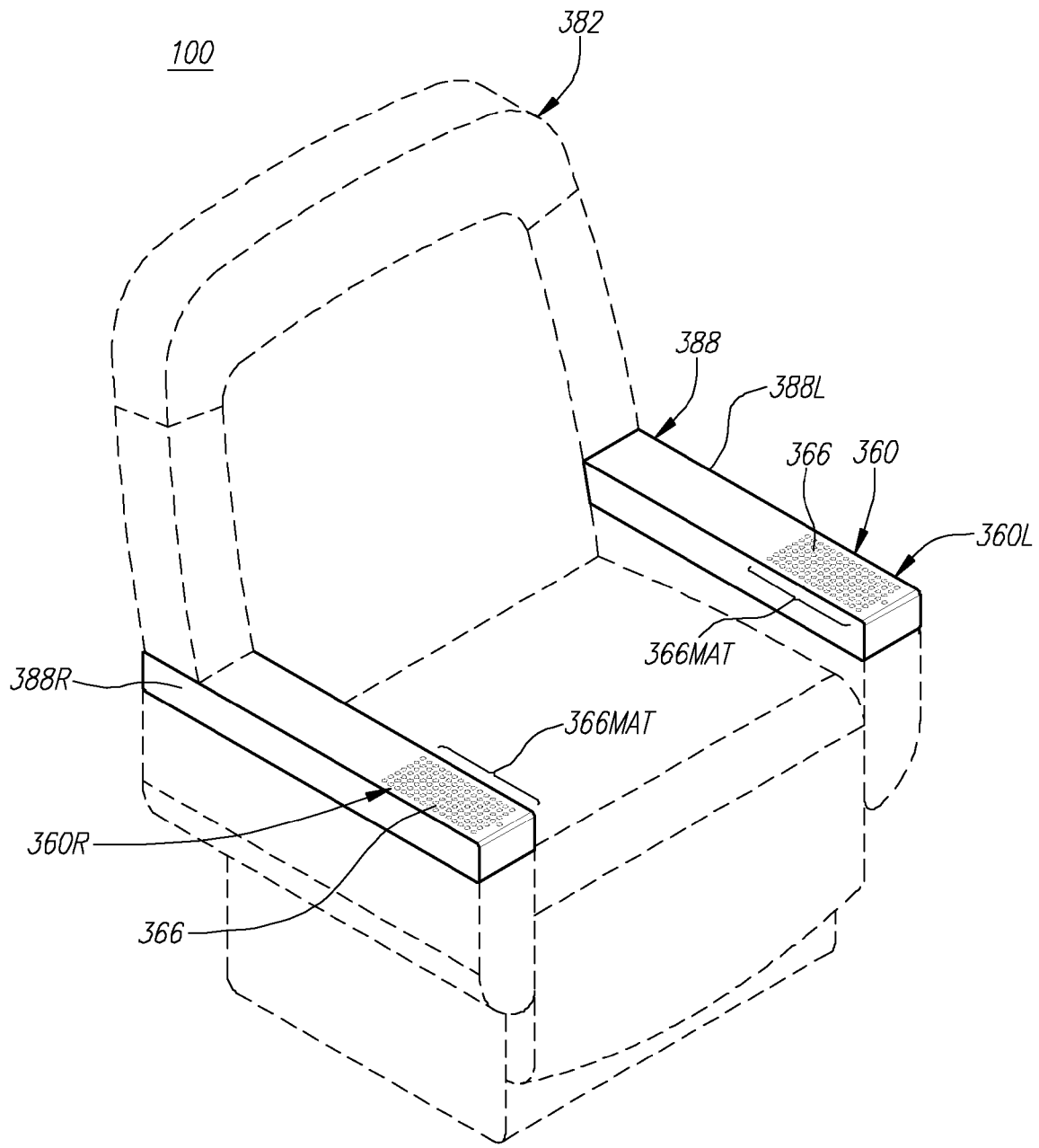
FIG. 4D is an exemplary drawing illustrating the user chair of FIG. 4A with the user interface system of FIG. 4C.

As illustrated in FIGS. 4A-B, the interface elements 366 forming at least one of the matrices 366MAT can be provided as de-emphasized interface elements 366OBS when the user is distal from the matrices 366MAT. When the user hand approaches, and becomes proximate to, the matrices 366MAT, one or more selected interface elements 366 can become emphasized interface elements 366APP as shown in FIGS. 4C-D. The interface elements 366 forming the matrices 366MAT preferably can be de-emphasized and/or emphasized in the manner discussed above with reference to FIGS. 1-3. FIGS. 4C-D illustrate an embodiment of the user interface system 360, wherein each interface element 366 of both matrices 366MAT comprise emphasized interface elements 366APP and are activated for interacting with the system resource(s) 110 (shown in FIG. 1) (and/or the associated resource function(s)) available by way of the information system 100.

Figure 4E:
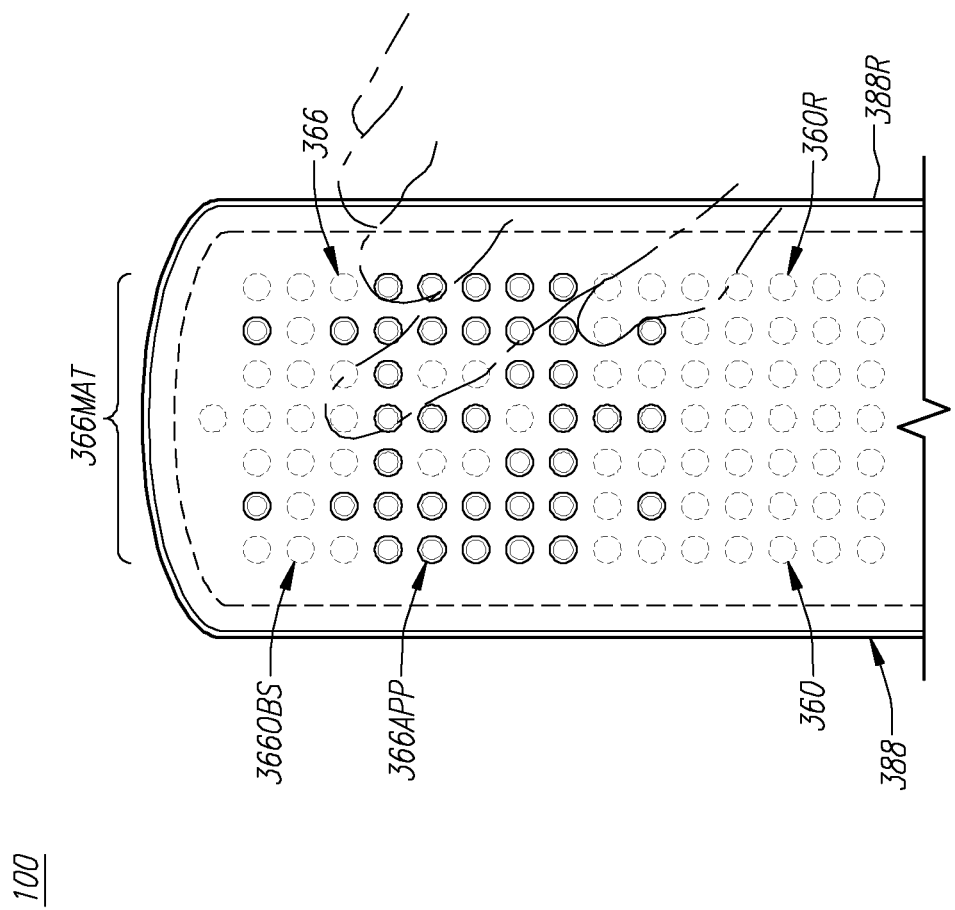
FIG. 4E is an exemplary detail drawing illustrating the user interface system of FIG. 4A, wherein selected interface elements are emphasized when the hand of the user approaches, and becomes proximate to, the user interface system.
Figure 4E:
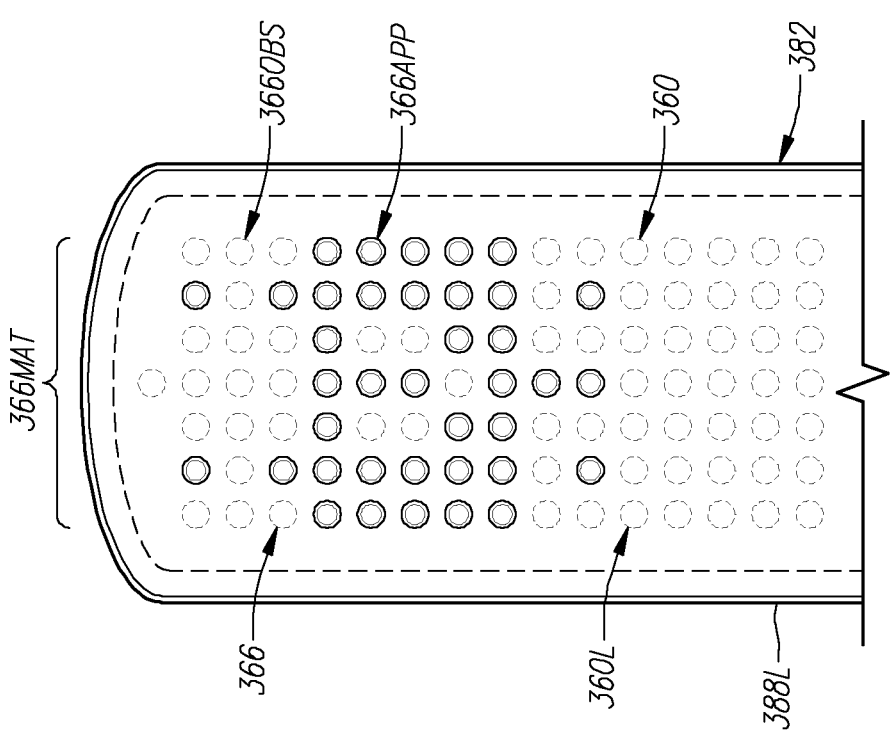
Figure 4F:
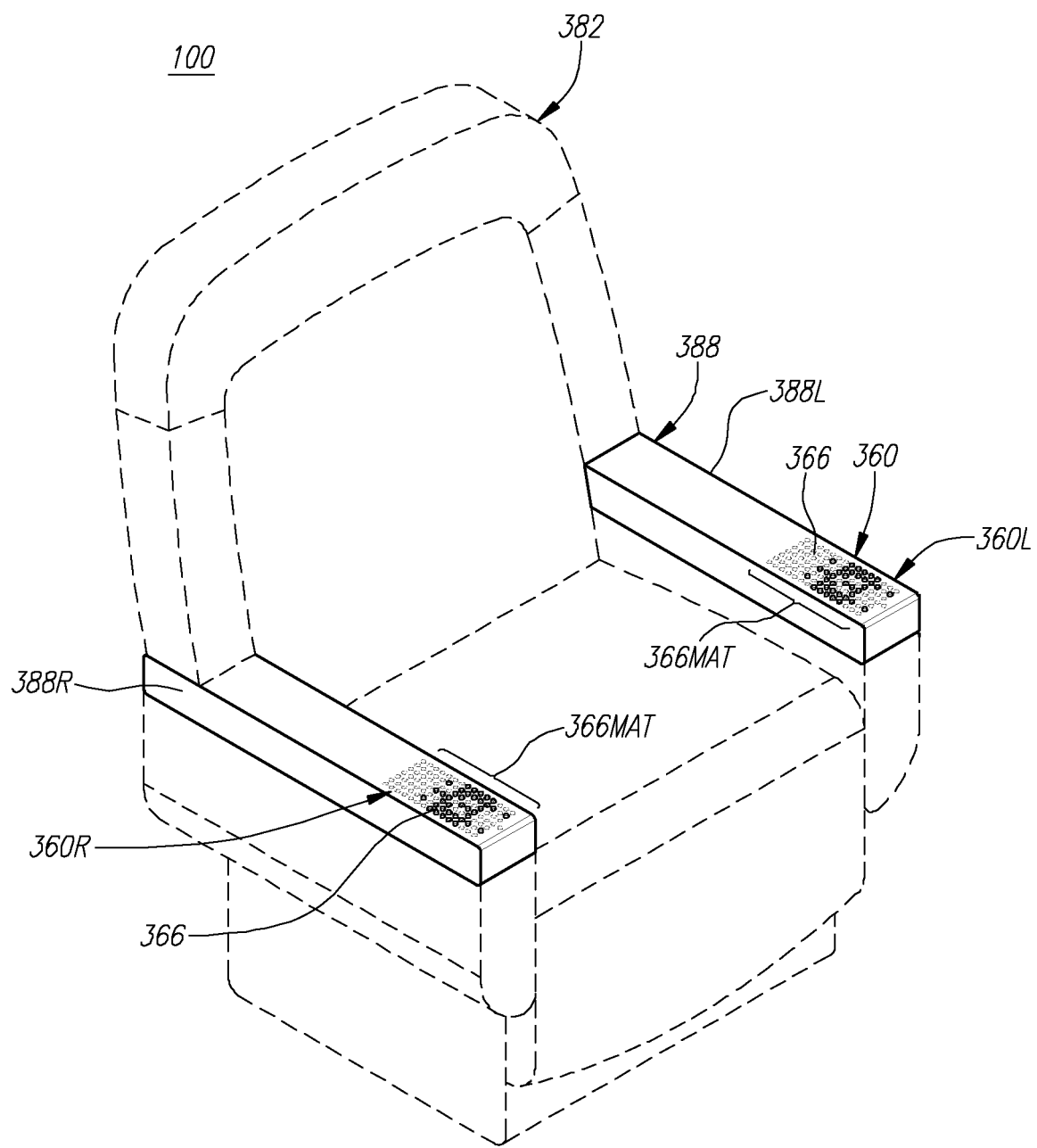
FIG. 4F is an exemplary drawing illustrating the user chair of FIG. 4A with the user interface system of FIG. 4E.

Turning to FIGS. 4E-F, the user interface system 360 of FIGS. 4A-B is shown as including matrices 366MAT, wherein a portion of the interface element 366 become emphasized interface elements 366APP when the user hand approaches, and becomes proximate to, the matrices 366MAT. The emphasized interface elements 366APP can be the same, and/or different, among the matrices 366MAT and optionally forms a pattern for facilitating use of the user interface system 360. The pattern, for example, can include predetermined emphasized interface elements 366APP of a selected matrix 366MAT that define a boundary for other emphasized interface elements 366APP of the selected matrix 366MAT in the manner discussed above with reference to FIGS. 2A-B. In the manner set forth above, one or more of the matrices 366MAT advantageously can be programmable or configurable, enabling the user interface system 360 to be customized for selecting interface elements 366 suitable for interacting with the system resource(s) 110 (shown in FIG. 1) (and/or the associated resource function(s)) available by way of the information system 100.

Figure 5A:
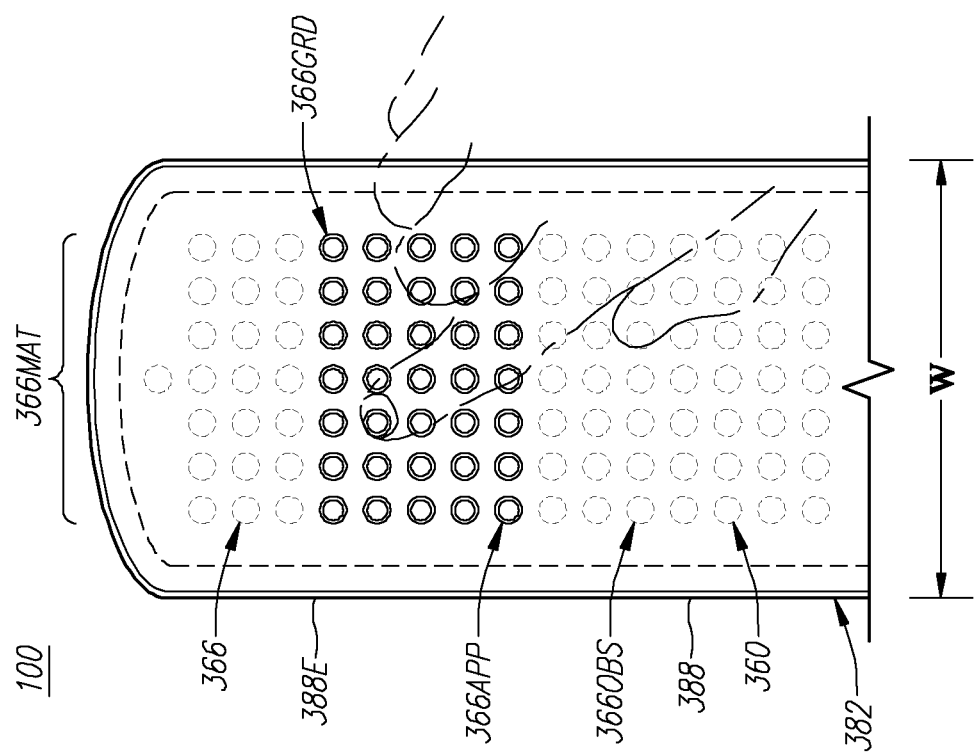
FIG. 5A is an exemplary detail drawing illustrating the user interface system of FIGS. 4A-F, wherein the selected interface elements are disposed in a grid arrangement.

FIG. 5A illustrates an alternative embodiment of the matrix 366MAT (shown in FIGS. 4A-F). The matrix 366MAT comprises de-emphasized interface elements 366OBS when the user is distal from the user interface system 360 as set forth above. As illustrated in FIG. 5A, when the user hand approaches, and becomes proximate to, the user interface system 360, a plurality of the interface elements 366 become emphasized interface elements 366APP that form a rectangular grid 366GRD. The rectangular grid 366GRD has a predetermined number of rows of the emphasized interface elements 366APP and a predetermined number of columns of the emphasized interface elements 366APP. The emphasized interface elements 366APP within the rectangular grid 366GRD of the user interface system 360 thereby can cooperate to form a track pad (or panel) for interacting with the system resource(s) 110 (shown in FIG. 1) (and/or the associated resource function(s)) available by way of the information system 100.

In one embodiment, one or more other interface element 366 of the matrix 366MAT can become apparent as additional emphasized interface elements 366APP when the user hand approaches, and becomes proximate to, the user interface system 360. The additional emphasized interface elements 366APP, upon becoming apparent, can form at least one other control (in addition to the rectangular grid 366GRD) for the user interface system 360 at the selected armrest 388. In other words, the rectangular grid 366GRD can be provided as part of a more extensive user interface system 360 disposed at the armrest 388. The rectangular grid 366GRD likewise can be utilized in conjunction with one or more other user interface systems 360 disposed at the other armrest 388 and/or other locations of the user chair 382 to form a composite user interface system 360C (shown in FIG. 3).

Figure 5B:
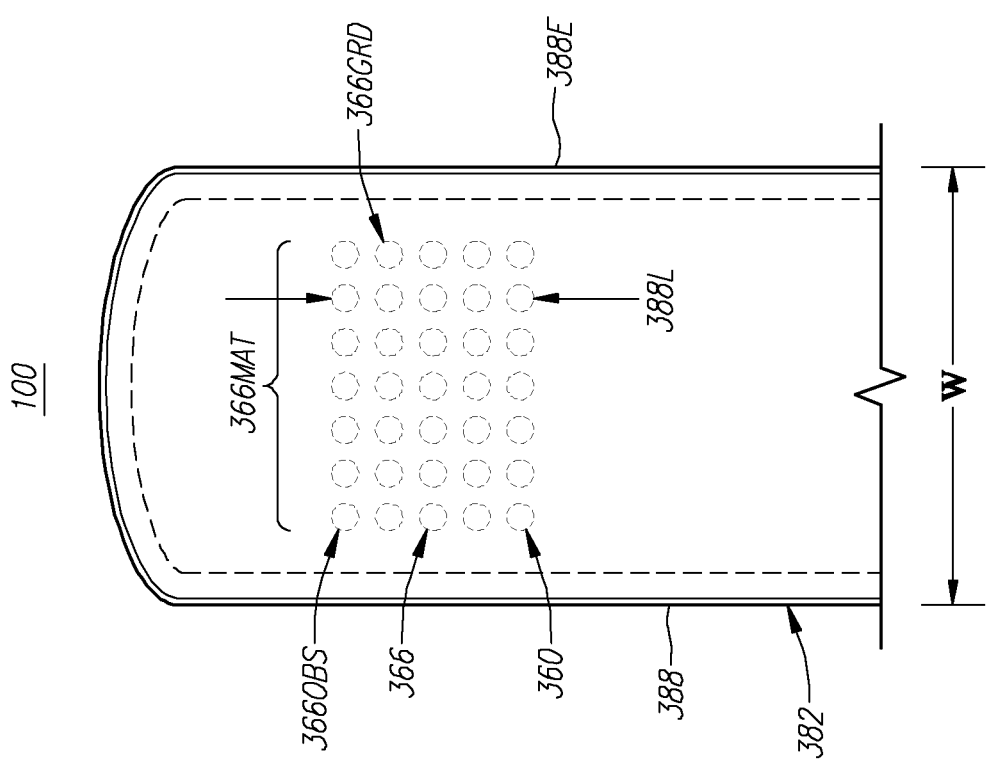
FIG. 5B is an exemplary detail drawing illustrating an alternative embodiment of the user interface system of FIG. 5A.
Figure 5C:
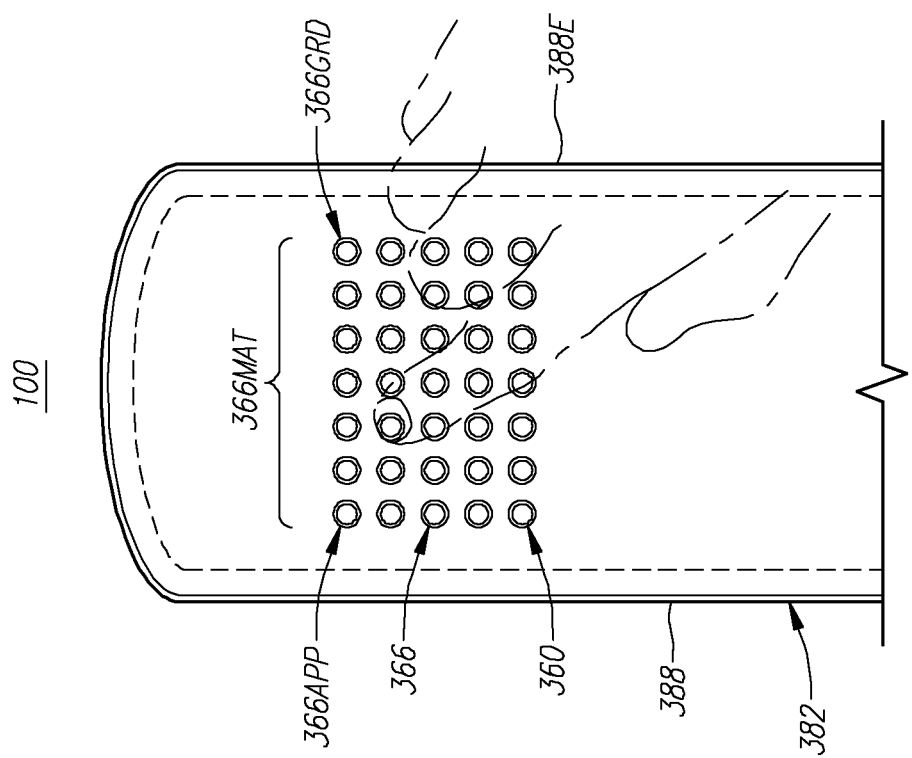
FIG. 5C is an exemplary detail drawing illustrating the user interface system of FIG. 5B, wherein the user interface system is emphasized when the hand of the user approaches, and becomes proximate to, the user interface system.

Another alternative embodiment of the matrix 366MAT is illustrated in FIGS. 5B-C. Turning to FIG. 5B, the matrix 366MAT is shown as comprising a rectangular grid 366GRD. The rectangular grid 366GRD has a predetermined number of rows of interface elements 366 and a predetermined number of columns of interface elements 366. The rows and columns can have any predetermined number of interface elements 366 and can be within any preselected range, such as any range between one interface element 366 and sixteen (or more) interface elements 366. As desired, the rows can have a predetermined number of interface elements 366 that is the same as, or different from, the predetermined number of interface elements 366 in the columns. Preferably disposed adjacent to a distal end region 388E of the relevant armrest 388 upon which a user hand normally would rest, the rectangular grid 366GRD can span a width 388W and/or a predetermined length 388X of the relevant armrest 388.

In the manner discussed above with reference to the matrix 366MAT (shown in FIGS. 4A-F), the rectangular grid 366GRD comprises de-emphasized interface elements 366OBS when the user is distal from the rectangular grid 366GRD as set forth above. As illustrated in FIG. 5A, when the user hand approaches, and becomes proximate to, the user interface system 360, each interface element 366 within the rectangular grid 366GRD becomes an emphasized interface element 366APP. The emphasized interface elements 366APP within the rectangular grid 366GRD, upon becoming apparent, can cooperate to form a track pad (or panel) for interacting with the system resource(s) 110 (shown in FIG. 1) (and/or the associated resource function(s)) available by way of the information system 100 in the manner discussed above with reference to FIG. 5A. The user interface system 360 disposed at the selected armrest 388 is the rectangular grid 366GRD, and/or the rectangular grid 366GRD typically is not utilized with any additional emphasized interface elements 366APP. The rectangular grid 366GRD however can be utilized in conjunction with one or more other user interface systems 360 disposed at the other armrest 388 and/or other locations of the user chair 382 to form a composite user interface system 360C (shown in FIG. 3).

Figure 6A:
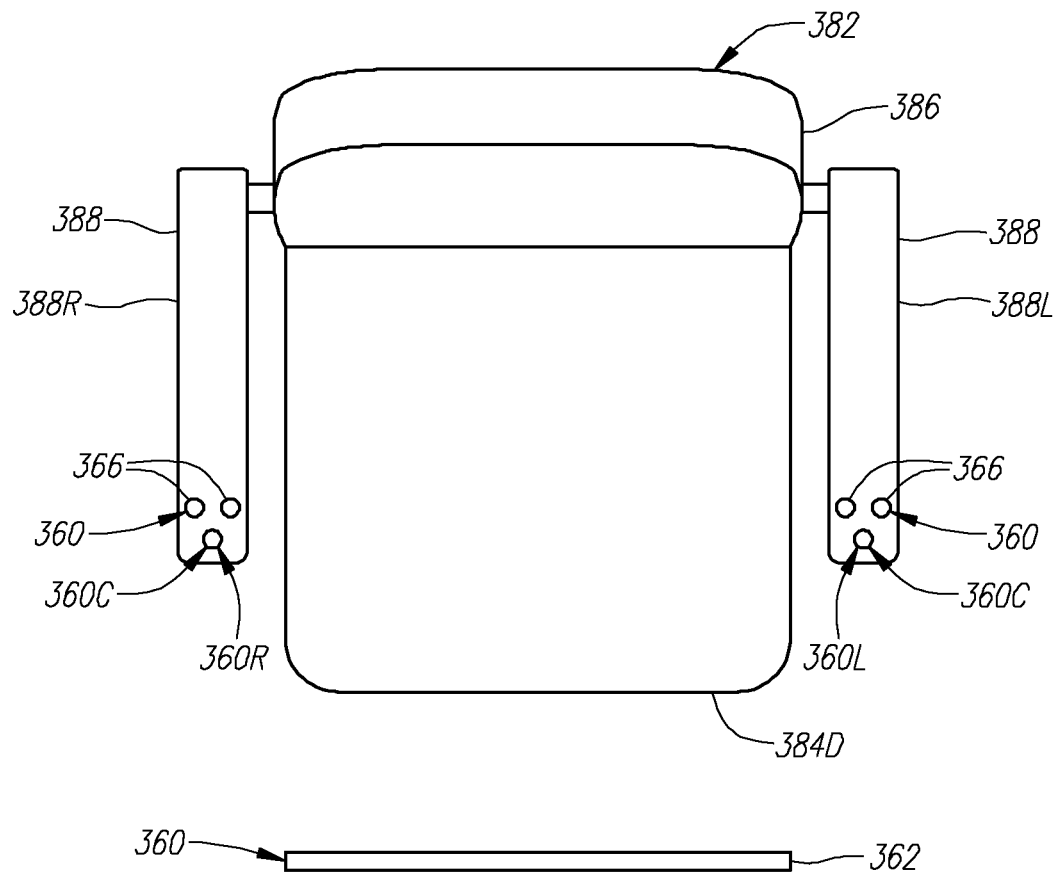
FIG. 6A is an exemplary top-level drawing illustrating another alternative embodiment of the user chair of FIG. 3, wherein the user interface system is utilized in conjunction with a video interface system.
Figure 22A:
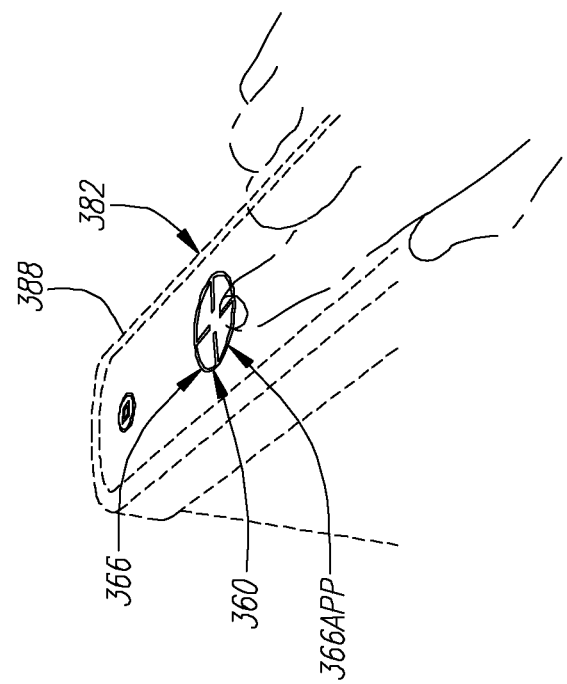
FIG. 22A is an exemplary detail drawing illustrating another alternative embodiment of the user chair of FIG. 1, wherein the user chair supports use of a chair-based video interface system.
Figure 22A:
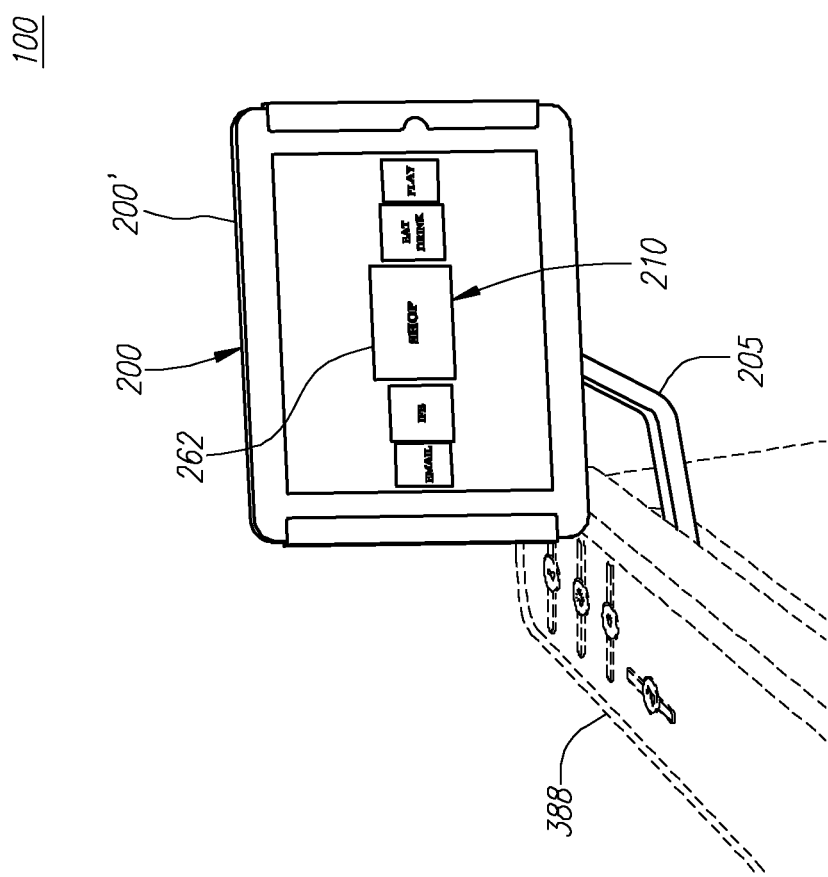
Figure 22B:
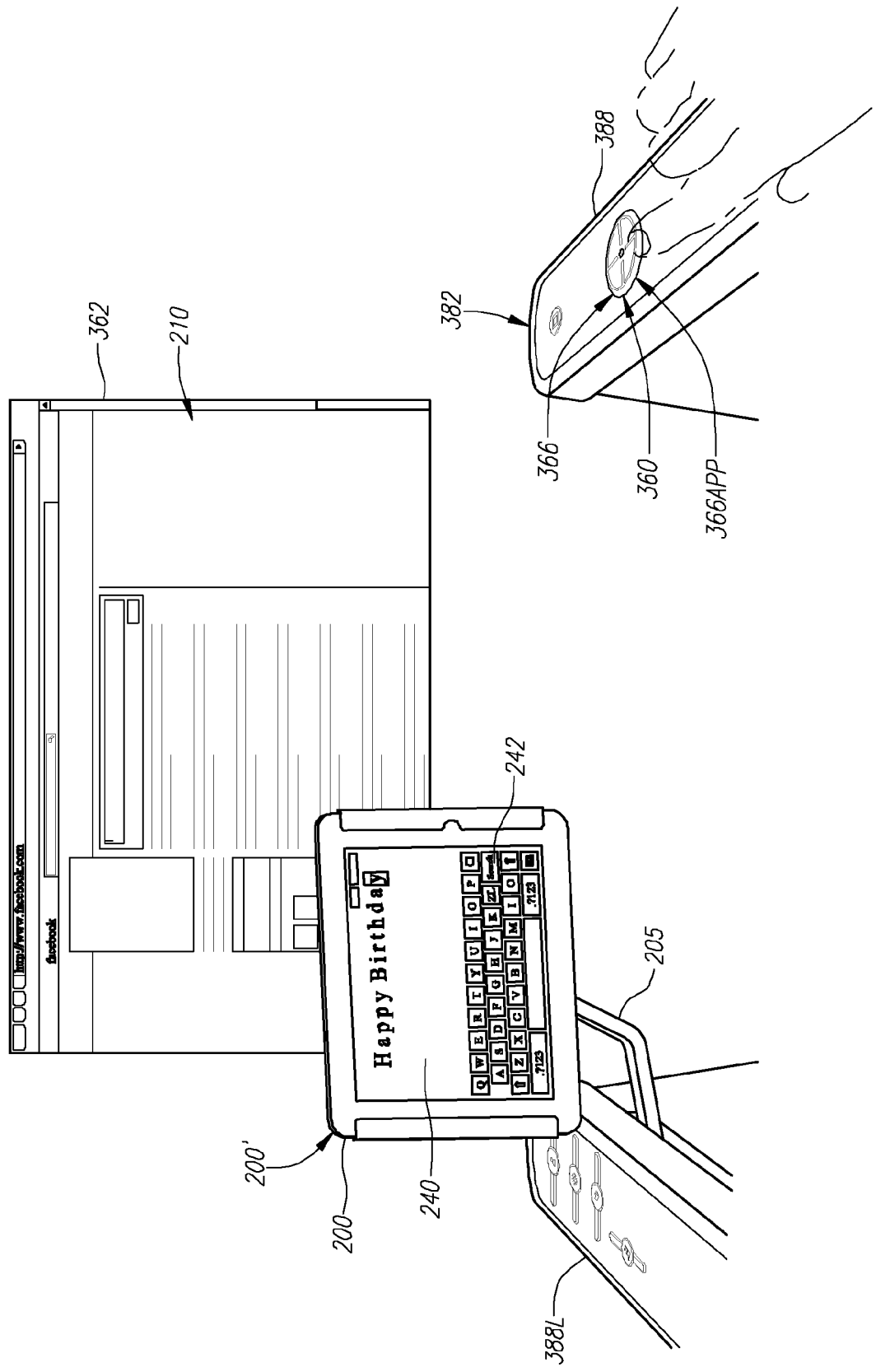
FIG. 22B is an exemplary detail drawing illustrating an alternative embodiment of the user chair of FIG. 1, wherein the chair-based video interface system provides a touch keyboard for entering the user information and can be utilized in conjunction with the video interface system of FIG. 6A.

Turning to FIG. 6A, a video interface system 362 and/or an audio interface system 364 (shown in FIGS. 26A-B) can be associated with the user chair 382 and provided as a portion of the user interface system 360. The interaction with the information system 100, in other words, can be performed via the interface element 366 in conjunction with the video interface system 362 and/or the audio interface system 364. The video interface system 362 and/or the audio interface system 364 preferably are provided in a manner to avoid physical interference with a user as the user approaches (and/or sits in) the user chair 382, utilizes the user interface system 360, and departs (and/or arises from) the user chair 382. The video interface system 362, for example, can face the user chair 382 and be disposed out of arm's reach as shown in FIG. 22B. Additionally, and/or alternatively, the video interface system 362 can be mounted at the user chair 382, such as at a selected armrest 388 of the user chair 382 as illustrated in FIG. 22A. The audio interface system 364 likewise can be disposed proximally to, and/or distally from, the user chair 382. As desired, the audio interface system 364 can be integrated with the user chair 382.

Figure 6B:
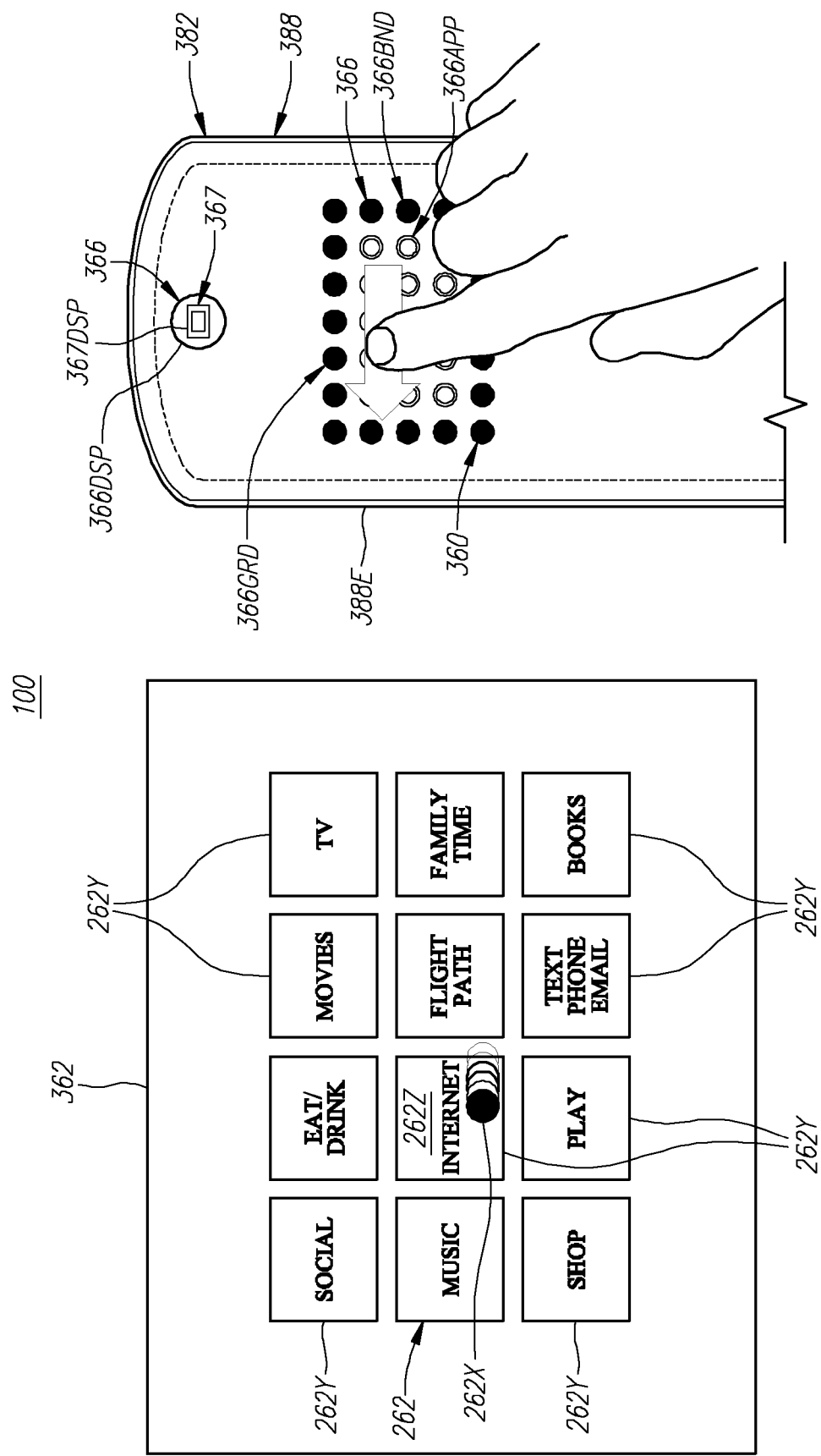
FIG. 6B is an exemplary detail drawing illustrating the user interface systems of FIGS. 5A-C, wherein the user interface system is utilized in conjunction with the video interface system of FIG. 6A.

Operation of the video interface system 362 and/or the audio interface system 364 can be controlled in any conventional manner. The user interface system 360, for example, can be utilized to control the video interface system 362. As illustrated in FIG. 6B, the user interface system 360 can include at least one interface element 366DSP that, upon becoming apparent, can be manipulated to control the video interface system 362. The video interface system 362, for example, can be at least activated and/or deactivated via the interface element 366DSP. In one embodiment, the interface element 366DSP can control one or more other conventional operations, such as brightness, contrast, tint, etc., of the video interface system 362. FIG. 6B shows that the interface element 366DSP that, upon becoming apparent, can be observably emphasized, such as by presenting a video function icon 367DSP. The function icon 367DSP can represent the type(s) of control over the video interface system 362 that can be achieved by manipulation of the interface element 366DSP.

Alternatively, and/or additionally, operation of the audio interface system 364 likewise can be controlled via the user interface system 360. In the manner discussed above with reference to the selected interface element 366, the user interface system 360 can include at least one selected interface element 366 that, upon becoming apparent, can be manipulated to control the audio interface system 364. The audio interface system 364, for example, can be at least activated and/or deactivated via the selected interface element 366. In one embodiment, the selected interface element 366 can control one or more other conventional operations, such as volume, tone, balance, etc., of the audio interface system 364. The selected interface element 366, upon becoming apparent, can be observably emphasized, such as by presenting an associated function icon 367. The function icon 367 can represent the type(s) of control over the audio interface system 364 that can be achieved by manipulation of the selected interface element 366.

When the user indicates a desire to interact with a selected system resource(s) 110 (shown in FIG. 1) (and/or the associated resource function(s)) available by way of the information system 100, one or more selected interface elements 366 can be activated as emphasized interface elements 366APP for providing preselected control function(s) to the selected system resource 110; while, other interface elements 366 can remain obscured as de-emphasized interface elements 366OBS (shown in FIG. 5A) in the manner set forth in more detail above with reference to the user interface system 360 of FIGS. 1-3. As desired, the video interface system 362 and/or the audio interface system 364 likewise can be activated to facilitate the interaction with the selected system resource 110. The video interface system 362 and/or the audio interface system 364 can be activated, for example, to provide visible and/or audible feedback for the emphasized interface elements 366APP.

In one embodiment, the video interface system 362 and/or the audio interface system 364 can present a listing (or catalogue) of the system resource(s) 110 (shown in FIG. 1) (and/or the associated resource function(s)) available by way of the information system 100. The video interface system 362, for example, can be activated to present control indicia 262Y (shown in FIGS. 6B and 7C), and the emphasized interface elements 366APP of the user interface system 360 can be manipulated to select among the control indicia 262Y when the user indicates a desire to interact with the selected system resource 110. The video interface system 362, for example, can present the control indicia 262Y and a cursor 262X (shown in FIGS. 6B and 7C). A position of the cursor 262X relative to the control indicia 262Y presented on the video interface system 362 can be adjusted via the user interface system 360. When the cursor 262X is positioned at a predetermined control indicia 262Y, the user interface system 360 can be actuated to select the predetermined control indicia 262Y, initiating the associated function of the selected system resource 110.

FIG. 6B shows the user interface systems 360 of FIGS. 5A-C being utilized in conjunction with the video interface system 362 of FIG. 6A. The user interface system 360 of FIG. 6B can be provided as a rectangular grid 366GRD of interface elements 366 in the manner described above. The interface elements 366 within the rectangular grid 366GRD can be mapped to corresponding regions of the video interface system 362. The video interface system 362, for example, can present the control indicia 262Y in the form of a (hierarchical) menu structure (or system) 262, wherein the control indicia 262Y comprise menu options associated with a selected level of the menu system 262.

The menu system 262 can provide an organized manner for presenting the available system resource(s) 110 (shown in FIG. 1) (and/or the associated resource function(s)). In one embodiment, the menu system 262 can be provided in the manner set forth in the co-pending U.S. patent application, entitled "PORTABLE USER CONTROL DEVICE AND METHOD FOR VEHICLE INFORMATION SYSTEMS," Ser. No. 12/210,689, filed on Sep. 15, 2008, which is assigned to the assignee of the present application and the disclosure of which is hereby incorporated herein by reference in its entirety and for all purposes. In one embodiment, the menu system 262 can include a welcome menu level and/or an instruction menu that provides user instruction for operating the user interface system 360. The welcome menu level, for example, can include a name and/or other selected user information and/or, in a transportation environment, can include travel information, such as a departure time, a departure location, an arrival time, and/or a destination city.

The user interface system 360, for example, can be locked with the user first approaches the user chair 382. The instruction menu can provide user instruction for unlocking the user interface system 360. In one embodiment, the user interface system 360 can be unlocked (and/or relocked) by performing a predetermined hand gesture adjacent to the user interface system 360.

The interface elements 366 within the rectangular grid 366GRD can be mapped to the control indicia 262Y as presented by the video interface system 362. To facilitate the mapping between the interface elements 366 and the video interface system 362, the control indicia 262Y of the menu system 262 preferably are presented in a manner consistent with the interface elements 366. For example, since the interface elements 366 of the user interface system 360 of FIG. 6B are illustrated as forming the rectangular grid 366GRD, the control indicia 262Y of the menu system 262 likewise are shown as being presented as being in a rectangular grid arrangement. Although shown and described as a rectangular grid of control indicia 262Y, the menu system 262 can be presented with any predetermined arrangement of control indicia 262Y that is consistent with the arrangement of the emphasized interface elements 366APP of the user interface system 360. The menu system 262 and associated menu operations can comprise an example of a selected system resource(s) 110 (shown in FIG. 1) (and/or the associated resource function(s)) available by way of the information system 100.

The interface elements 366 within the rectangular grid 366GRD, upon becoming apparent, can comprise emphasized interface elements 366APP in the manner set forth above. The emphasized interface elements 366APP can be manipulated to guide a cursor 262X toward selected control indicia 262Z. The rectangular grid 366GRD is illustrated in FIG. 6B as including optional boundary interface elements 366BND. The boundary interface elements 366BND preferably are correlated with a predetermined boundary of the menu system 262 and/or a predetermined boundary of the video interface system 362. Thereby, the cursor 262X remains within the bounds of the menu system 262 and/or the video interface system 362.

The presentation of the cursor 262X and the menu system 262 on the video interface system 362 can provide useful feedback for enabling user orientation. In other words, by viewing the position of the cursor 262X on the video interface system 362, the user can determine any additional manipulation of the emphasized interface elements 366APP for moving the cursor 262X adjacent to the selected control indicia 262Z. The video interface system 362 thereby can provide user-feedback for controlling movement of the cursor 262X relative to the selected control indicia 262Z. The graphical user interaction design for the video interface system 362 preferably is synchronized with the emphasized interface elements 366APP to facilitate providing relevant feedback for each manipulation of the user interface system 360. The user interface system 360 advantageously enables the user to navigate (and/or browse) the menu system 262 and to otherwise interact with the system resource(s) 110 (and/or the associated resource function(s)) available by way of the information system 100.

Figure 7B:
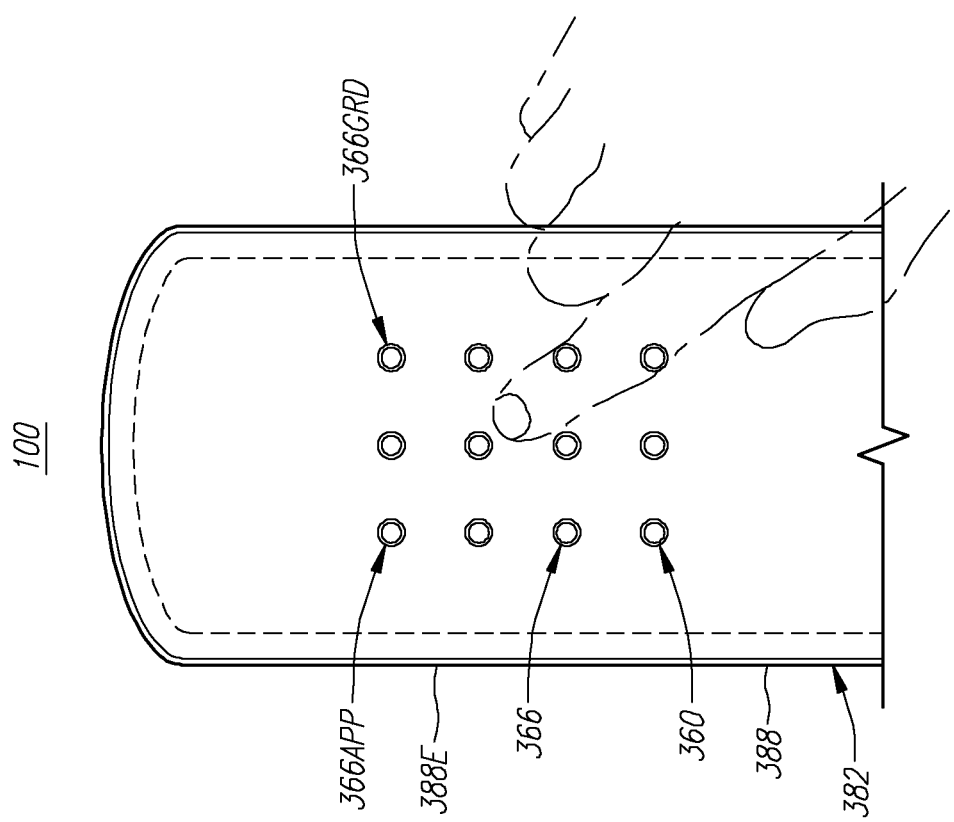
FIG. 7B is an exemplary detail drawing illustrating the user interface system of FIG. 7A, wherein the user interface system is emphasized when the hand of the user approaches, and becomes proximate to, the user interface system.
Figure 7C:
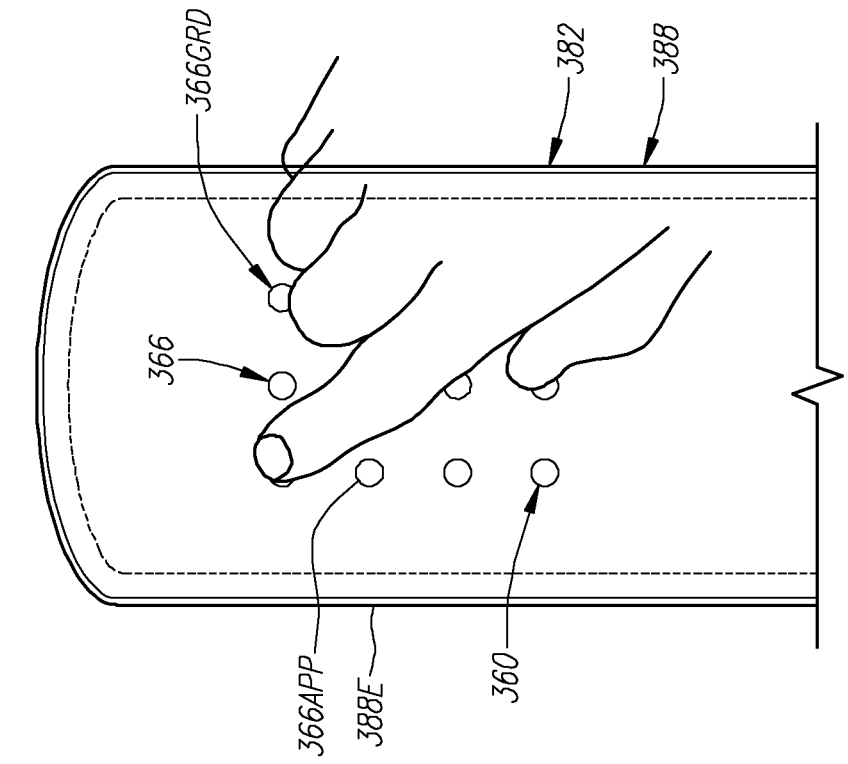
FIG. 7C is an exemplary detail drawing illustrating the user interface system of FIG. 7B, wherein the user interface system is utilized in conjunction with the video interface system of FIGS. 6A-B.
Figure 7C:
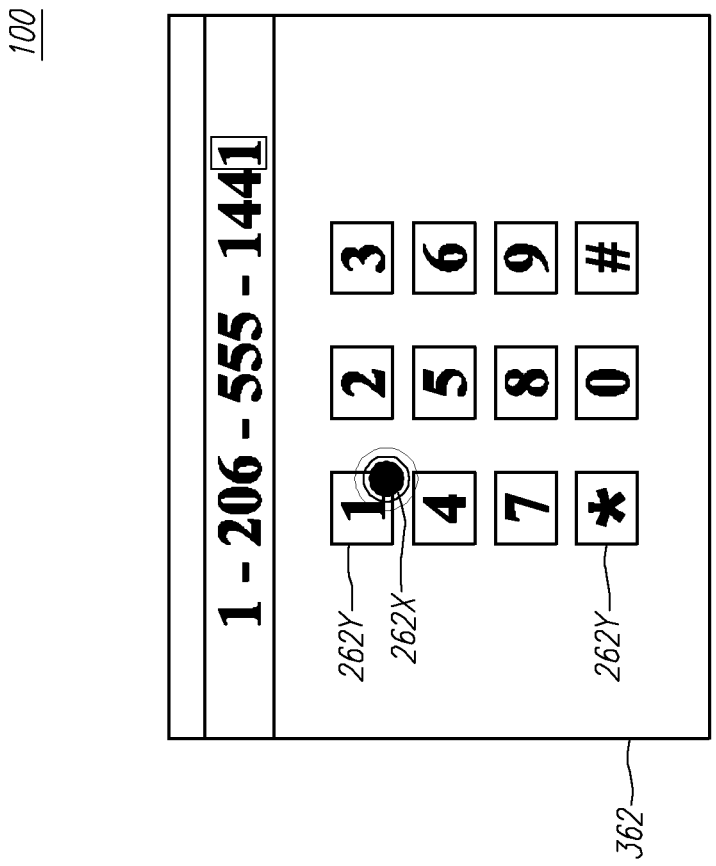

The user interface system 360 of FIGS. 5A-C can be utilized in a wide range of system applications. FIGS. 7A-C illustrate an exemplary telephone application for the user interface system 360. In other words, a telephone application is another example of a selected system resource(s) 110 (shown in FIG. 1) (and/or the associated resource function(s)) available by way of the information system 100, wherein one or more selected interface elements 366 can be activated for providing preselected control function(s) to the selected system resource 110. Turning to FIG. 7A, the user interface system 360 is shown as including a plurality of interface elements 366 that are disposed at a selected armrest 388 in an alternative rectangular grid arrangement 366GRD. The alternative rectangular grid 366GRD can be provided any manner, including in the manners set forth above with reference to the rectangular grids 366GRD (shown in FIGS. 5A-C), wherein the interface elements 366 are disposed in a conventional telephone key pad arrangement.

As illustrated in FIG. 7A, the interface elements 366 of the alternative rectangular grid 366GRD can be provided as de-emphasized interface elements 366OBS when the user is distal from the matrices 366MAT. When the user hand approaches, and becomes proximate to, the alternative rectangular grid 366GRD, the interface elements 366 forming the alternative rectangular grid 366GRD can become emphasized interface elements 366APP as shown in FIG. 7B. The interface elements 366 forming the alternative rectangular grid 366GRD preferably can be de-emphasized and/or emphasized in the manner discussed in more detail above with reference to FIGS. 1-3. For example, the interface elements 366 forming the alternative rectangular grid 366GRD can become visible at the selected armrest 388 in any conventional manner, including by becoming illuminated, by presenting control indicia, and/or by otherwise becoming observably emphasized. The interface elements 366 preferably present control indicia associated with a conventional telephone keypad, such as the numbers/letters associated with each telephone key.

In one embodiment, the user interface system 360 of FIGS. 7A-B can be utilized in conjunction with a video interface system 362 (shown in FIGS. 6A-B) and/or an audio interface system 364 (shown in FIGS. 26A-B) in the manner discussed in more detail above with reference to FIGS. 6A-B. FIG. 7C, for example, illustrates the user interface system 360 being utilized in conjunction with the video interface system 362 of FIG. 6A. In the manner set forth above with reference to FIG. 6B, the interface elements 366 within the rectangular grid 366GRD can be mapped to corresponding regions of the video interface system 362. The interface elements 366 optionally can include at least one interface element 366DSP (shown in FIG. 6B) that, upon becoming apparent, can be manipulated to control the video interface system 362.

The video interface system 362 is shown as presenting a conventional telephone key pad, such as the numbers and/or letters associated with each respective telephone key, wherein the individual buttons of the telephone key pad are associated with respective control indicia 262Y. The interface elements 366 within the rectangular grid 366GRD can be mapped to the control indicia 262Y as presented by the video interface system 362 and, upon becoming apparent, can comprise emphasized interface elements 366APP in the manner set forth above. The emphasized interface elements 366APP can be manipulated to guide a cursor 262X among the control indicia 262Y for dialing a telephone number or otherwise initiating a telephone call. As discussed above, the presentation of the cursor 262X and the telephone key pad on the video interface system 362 can provide useful feedback for enabling user orientation. The video interface system 362 optionally can provide feedback by presenting the telephone number as dialed as shown in FIG. 7C.

Figure 26A:
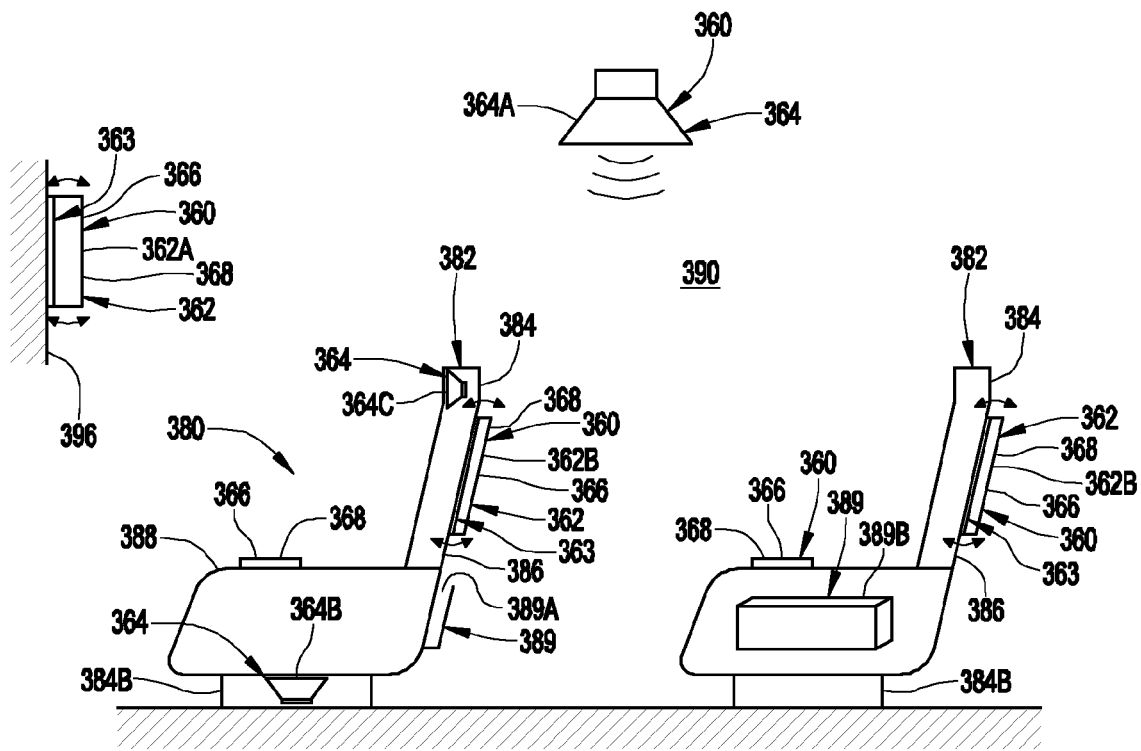
FIG. 26A is an exemplary top-level drawing illustrating a passenger cabin of a passenger vehicle, wherein the information system of FIGS. 24A-B has been installed.
Figure 26B:
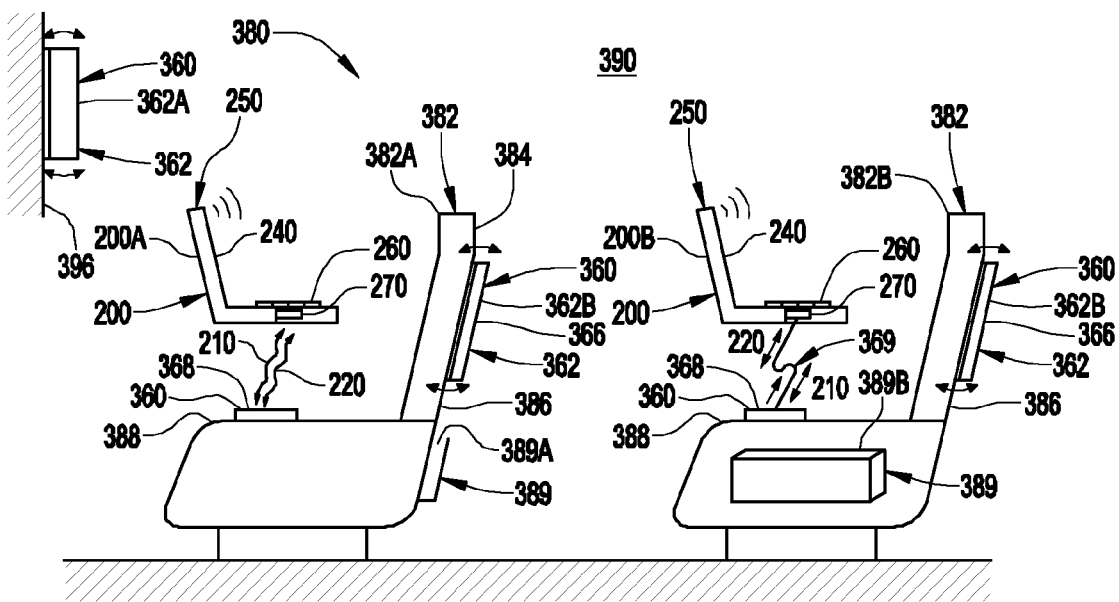
FIG. 26B is an exemplary top-level drawing illustrating an embodiment of the information system of FIG. 26A, wherein the information system is in communication with a personal media device.
Figure 27A:
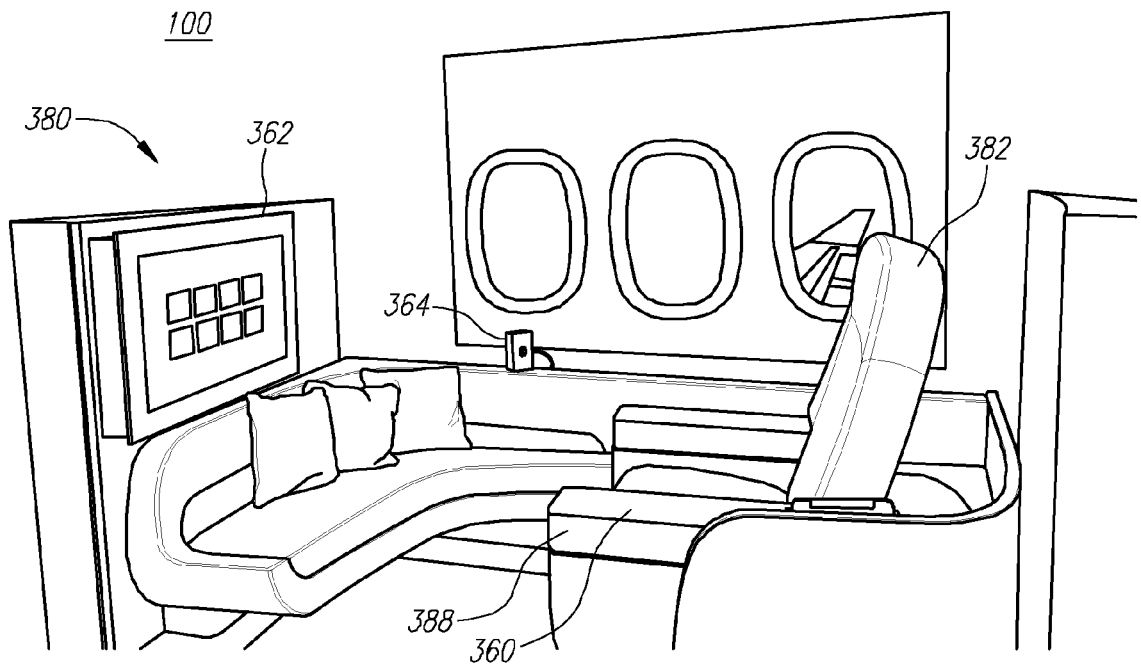
FIGS. 27A-B are an exemplary detail drawings illustrating another alternative embodiment of the user chair of FIG. 1, wherein the user chair is disposed within the passenger cabin of FIGS. 26A-B.
Figure 27B:
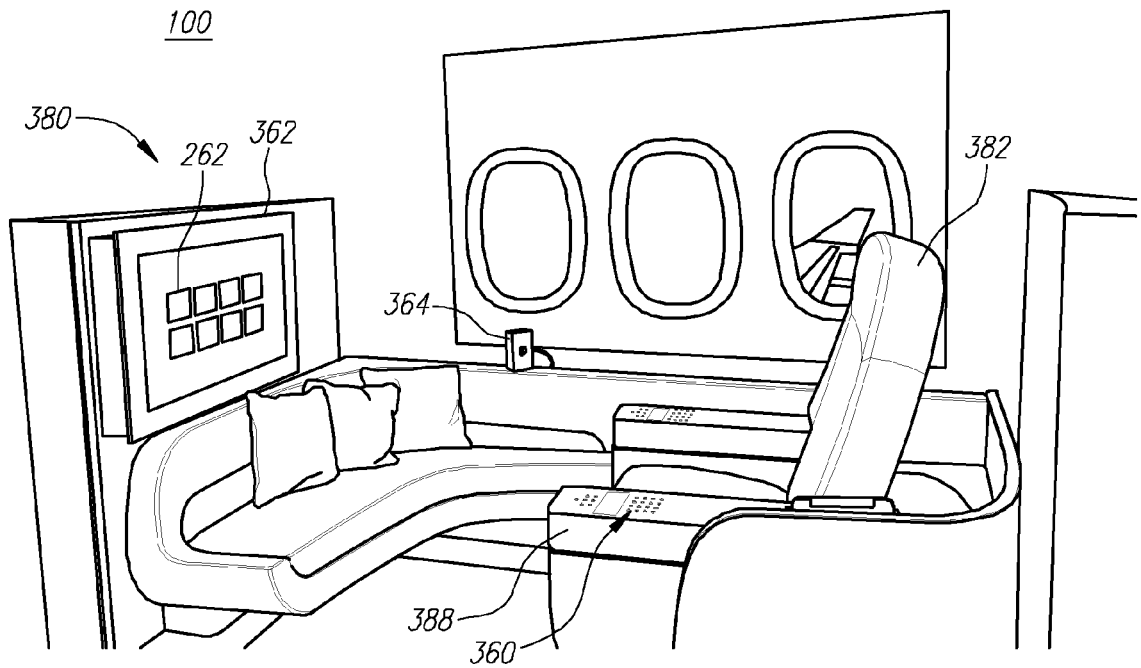

Alternatively, and/or additionally, the user interface system 360 can be utilized in conjunction with an audio interface system 364 (shown in FIGS. 26A-B). The audio interface system 364 advantageously can support two-way voice communications associated with conventional telephone communications. As desired, the selected system resource 110 can support data communications, including full duplex data communications and/or half duplex data communications. In one embodiment, the user interface system 360 can enable the user to initiate an outgoing telephone call and/or to receive an incoming telephone call via the selected system resource 110 (shown in FIG. 1). When the selected system resource 110 receives an incoming call, the user interface system 360, the video interface system 362, and/or an audio interface system 364 can provide an alert. The video interface system 362, for example, can present a visible incoming call notification, and/or the audio interface system 364 can provide an audible incoming call notification, such as by presenting a preselected ring tone. One or more of the interface elements 366 of the user interface system 360 optionally can notify the user of the incoming call by becoming observably emphasized in the manner discussed above. The interface elements 366, for example, can flash or otherwise illuminate when the incoming call is received.

When the user indicates a desire to interact with the selected system resource 110 to initiate and/or receive a telephone call by way of the information system 100, one or more selected interface elements 366 can be activated as emphasized interface elements 366APP for providing preselected control function(s) to the selected system resource 110 in the manner set forth in more detail above with reference to the user interface system 360 of FIGS. 1-3. Other interface elements 366 can remain obscured as de-emphasized interface elements 366OBS (shown in FIG. 5A). As shown in FIG. 7C, the video interface system 362 and/or the audio interface system 364 can be activated to facilitate the interaction with the selected system resource 110. The user interface system 360 advantageously enables the user to initiate and/or receive telephone calls via the system resource(s) 110 (shown in FIG. 1) (and/or the associated resource function(s)) available by way of the information system 100.

Another illustrative system application of the user interface system 360 of FIGS. 5A-C is as a gaming interface system 360GAME. Exemplary gaming interface applications for the user interface system 360 are shown and described with reference to FIGS. 8A-B, 9A-B, 10A-B, and 11A-B. In other words, support for one or more user games is another example of a selected system resource(s) 110 (shown in FIG. 1) (and/or the associated resource function(s)) available by way of the information system 100, wherein one or more selected interface elements 366 can be activated for providing preselected control function(s) to the selected system resource 110. The user interface system 360 is shown as including a plurality of interface elements 366 that can be disposed at one armrest 388, both armrests 388, and/or any other suitable location of the user chair 382.

In one embodiment, the gaming interface system 360GAME can be formed via one or more selected interface elements 366 of the user interface system 360. Stated somewhat differently, a plurality of selected interface elements 366 can cooperate to form a composite gaming interface element 366GAME for the user interface system 360. The gaming interface system 360GAME can comprise any suitable number and/or arrangement of the selected interface elements 366. If disposed at both armrests 388, the number and/or arrangement of the selected interface elements 366 disposed at the left user interface system 360L can be the same as, and/or different from, a number and/or arrangement of the selected interface elements 366 disposed at the right user interface system 360R. In other words, the gaming interface system 360GAME provided by the left user interface system 360L can be the same as, and/or different from, the gaming interface system 360GAME provided by the right user interface system 360R. The selected interface elements 366 for each user interface system 360L, 360R can be provided any manner, including in the manners set forth above with reference to the rectangular grids 366GRD (shown in FIGS. 5A-C), wherein the interface elements 366 are disposed in a conventional and/or customized gaming interface arrangement of any kind, and without limitation.

Figure 8A:
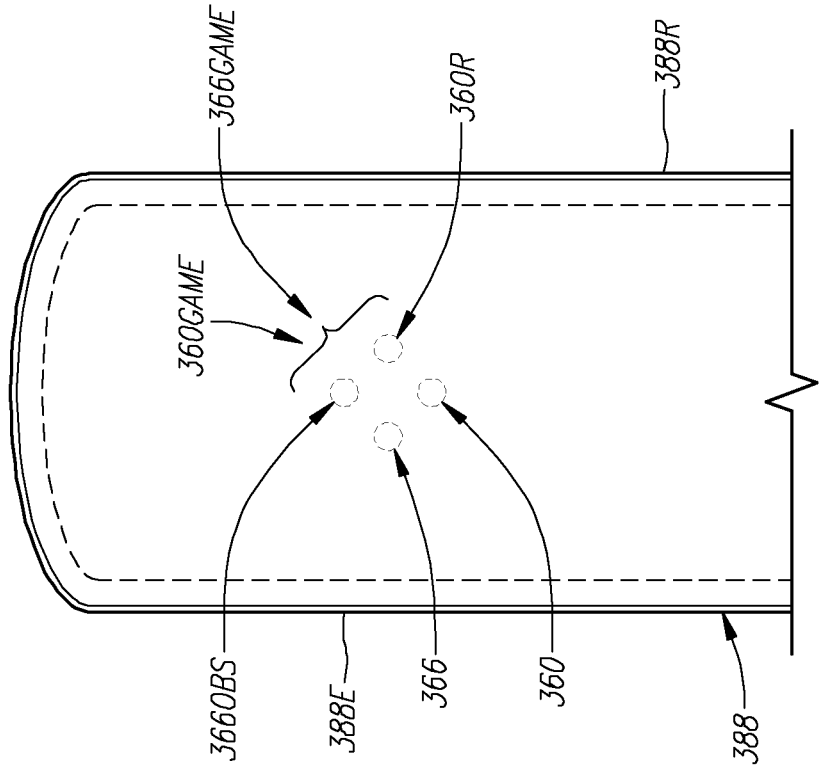
FIG. 8A is an exemplary detail drawing illustrating another alternative embodiment of the user interface system of FIGS. 4A-F, wherein the selected interface elements form a gaming interface.
Figure 8A:
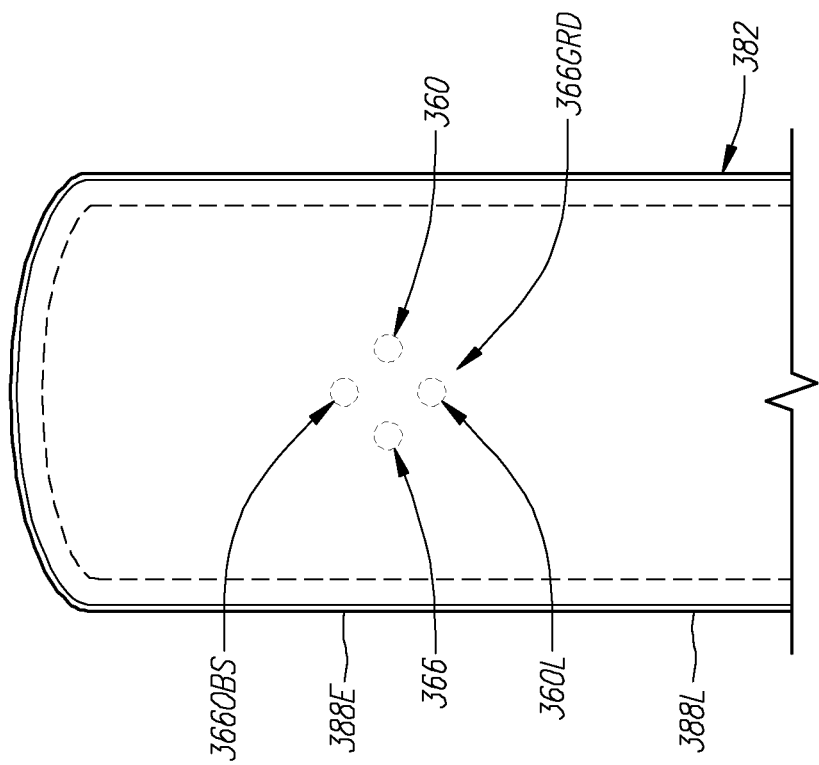
Figure 8B:
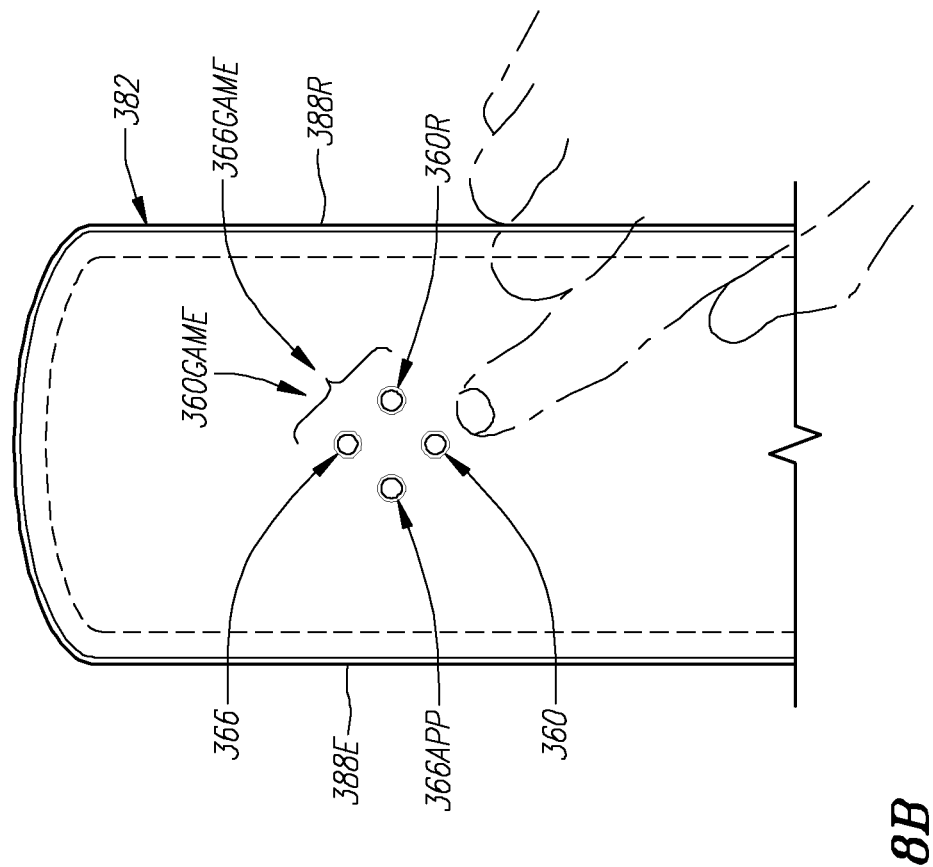
FIG. 8B is an exemplary detail drawing illustrating the user interface system of FIG. 8A, wherein the user interface system is emphasized when the hand of the user approaches, and becomes proximate to, the user interface system.
Figure 8B:
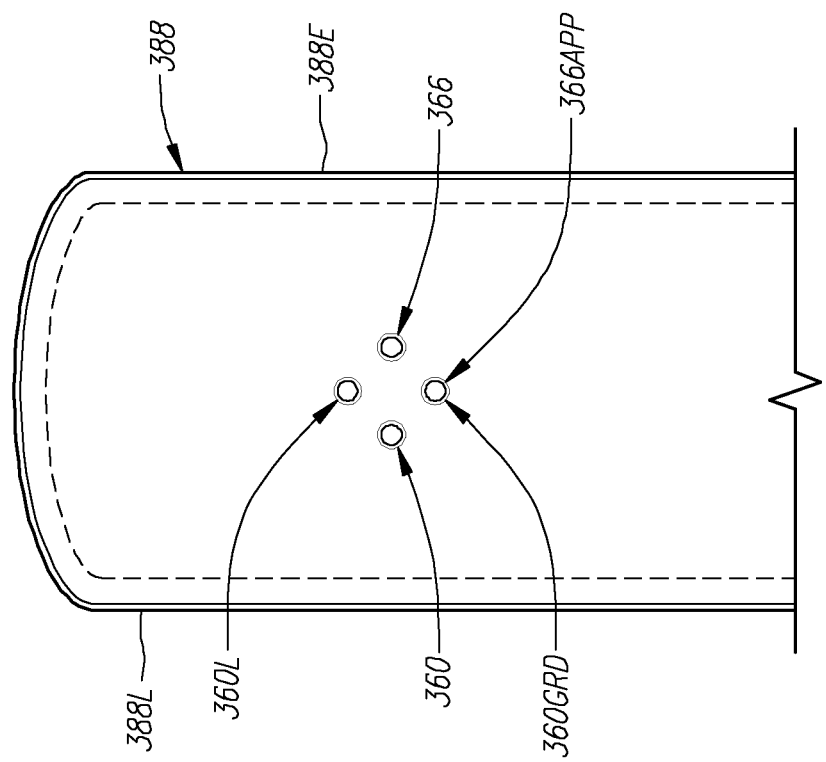

Turning to FIG. 8A, the user interface system 360 is illustrating as providing a gaming interface system 360GAME that comprises a rectangular grid 366GRD of interface elements 366 that is oriented at a preselected angle of forty-five degrees relative to the longitudinal axis of the relevant armrest 388. One application of the illustrated gaming interface system 360GAME can be playing a pinball game. The interface elements 366 of the user interface system 360 can be provided as de-emphasized interface elements 366OBS when the user is distal from the user interface system 360. When the user hand approaches, and becomes proximate to, the user interface system 360, the interface elements 366 forming the gaming interface system 360GAME can become emphasized interface elements 366APP as shown in FIG. 8B in the manner discussed above with reference to FIGS. 1-3. For example, the interface elements 366 forming the gaming interface system 360GAME can become visible at the relevant armrest 388 in any conventional manner, including by becoming illuminated, by presenting control indicia, and/or by otherwise becoming observably emphasized.

In one embodiment, the user interface system 360 of FIGS. 7A-B can be utilized in conjunction with a video interface system 362 (shown in FIGS. 6A-B) and/or an audio interface system 364 (shown in FIGS. 26A-B) in the manner discussed in more detail above with reference to FIGS. 6A-B. When the user indicates a desire to interact with the selected system resource 110 (shown in FIG. 1) to play a game by way of the information system 100, one or more selected interface elements 366 can be activated as emphasized interface elements 366APP to form the gaming interface system 360GAME for providing preselected control function(s) to the selected system resource 110 in the manner set forth in more detail above with reference to the user interface system 360 of FIGS. 1-3. The video interface system 362 and/or the audio interface system 364 likewise can be activated to facilitate the interaction with the selected system resource 110 and to otherwise play the game. The user interface system 360 advantageously enables the user to initiate and play games via the system resource(s) 110 (shown in FIG. 1) (and/or the associated resource function(s)) available by way of the information system 100.

Figure 9A:
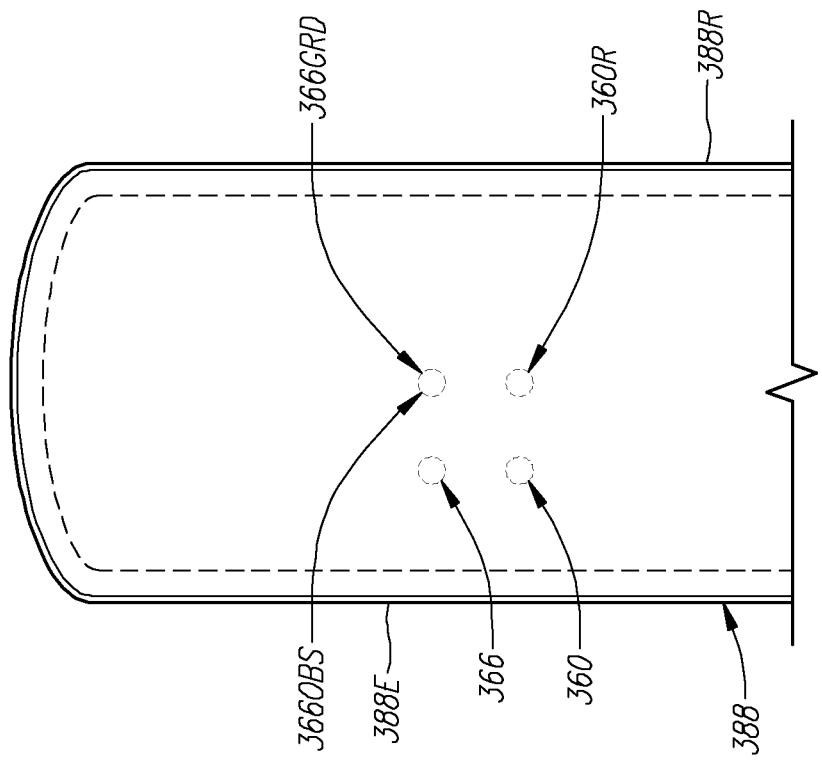
FIG. 9A is an exemplary detail drawing illustrating an alternative embodiment of the user interface system of FIGS. 8A-B, wherein the gaming interface is suitable for playing an arcade game.
Figure 9A:
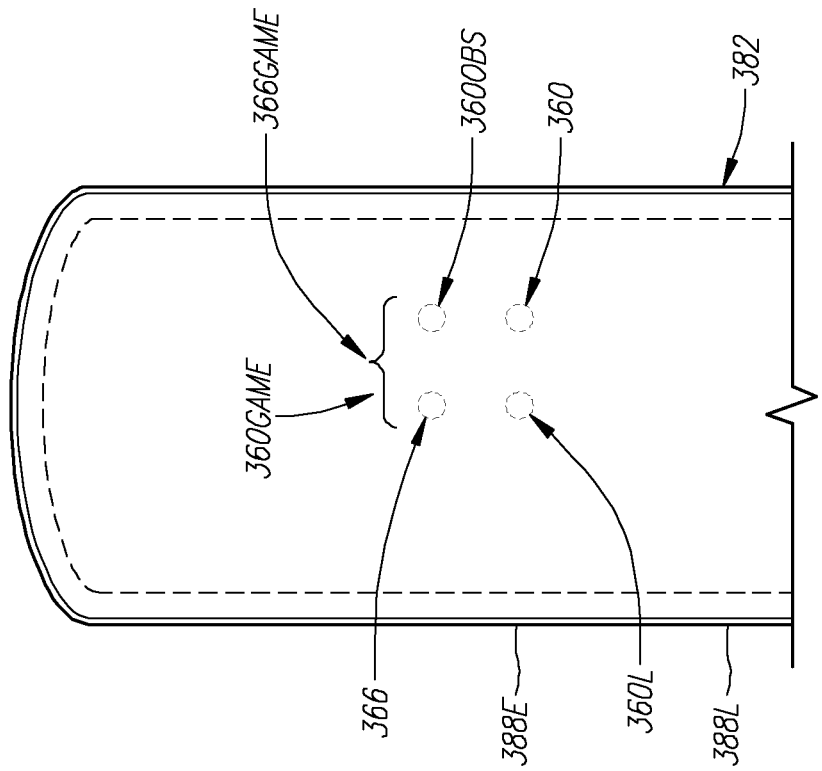
Figure 9B:
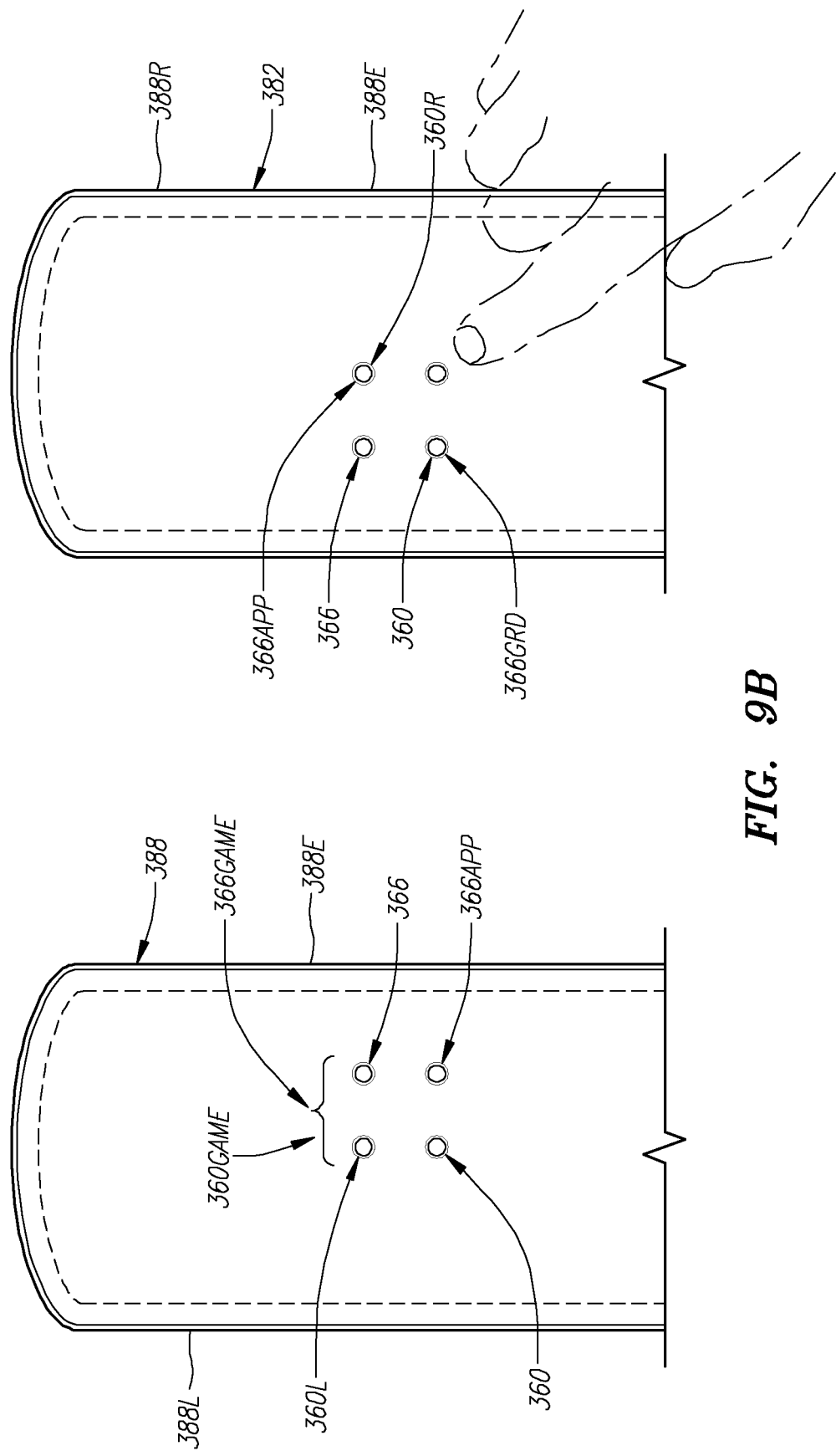
FIG. 9B is an exemplary detail drawing illustrating the user interface system of FIG. 9A, wherein the user interface system is emphasized when the hand of the user approaches, and becomes proximate to, the user interface system.

An alternative embodiment of the user interface system 360 of FIGS. 8A-B is shown in FIGS. 9A-B. The user interface system 360 of FIGS. 9A-B can be provided in the manner set forth above with reference to the user interface system 360 of FIGS. 8A-B and can form a gaming interface system 360GAME that is suitable for playing an arcade game. Turning to FIG. 9A, the user interface system 360 is illustrated as providing a gaming interface system 360GAME that comprises a rectangular grid 366GRD of interface elements 366. The rectangular grid 366GRD of interface elements 366 is shown as being oriented at a preselected angle of zero degrees relative to the longitudinal axis of the relevant armrest 388. In other words, the rectangular grid 366GRD can be parallel with a longitudinal axis of the selected armrest 388.

Although illustrated as being disposed at centerlines of the armrests 388 of the user chair 382 in FIGS. 8A-B, the rectangular grid 366GRD can be offset from the centerlines of the armrests 388 as shown in FIGS. 9A-B. The rectangular grid 366GRD can be offset to the left side and/or the right side of the centerlines of the armrests 388 by any predetermined distance as desired. The predetermined length distance by which the rectangular grid 366GRD can be offset from the centerlines of the armrests 388 can be within any preselected range of lengths, such as any half-inch range between one-half inch and three inches (or longer). The offset can be provided in any suitable manner. Exemplary manners for providing the offset can include disposing the rectangular grid 366GRD at an armrest location that is offset from the centerline of a relevant armrest 388 and/or forming the rectangular grid 366GRD from interface elements 366 of the matrix 366MAT (shown in FIGS. 4A-F) that are offset from the centerline of a relevant armrest 388.

The interface elements 366 of the user interface system 360 can be provided as de-emphasized interface elements 366OBS when the user is distal from the user interface system 360. When the user hand approaches, and becomes proximate to, the user interface system 360, the interface elements 366 forming the gaming interface system 360GAME can become emphasized interface elements 366APP as shown in FIG. 9B in the manner discussed above with reference to FIGS. 8A-B. The video interface system 362 and/or the audio interface system 364 likewise can be activated to facilitate the interaction with the selected system resource 110 and to otherwise play the game. The user interface system 360 advantageously enables the user to initiate and play arcade games via the system resource(s) 110 (and/or the associated resource function(s)) available by way of the information system 100.

Figure 10A:
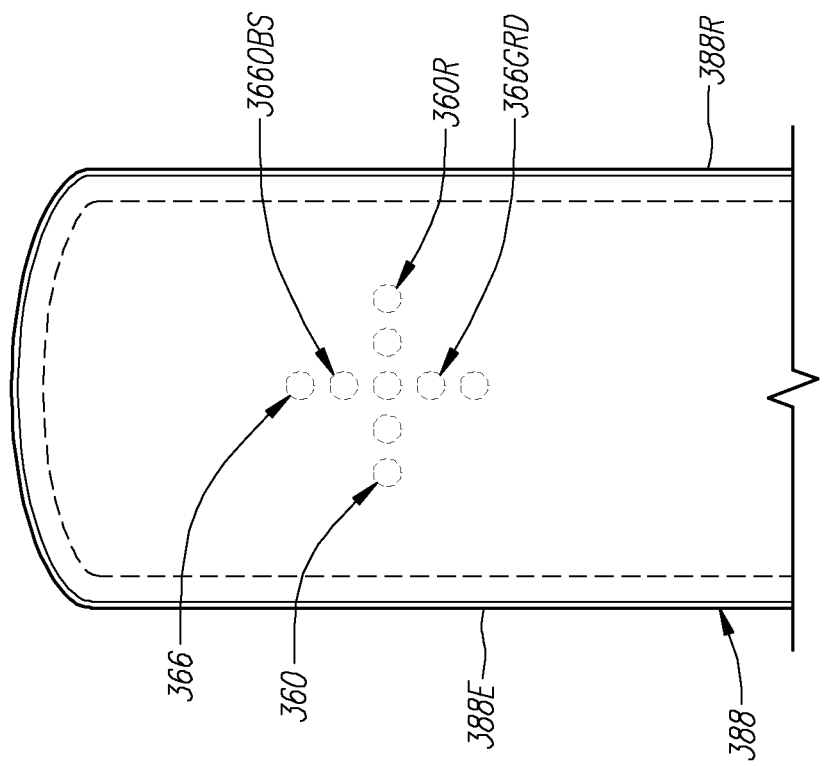
FIG. 10A is an exemplary detail drawing illustrating another alternative embodiment of the user interface system of FIGS. 8A-B, wherein the gaming interface forms a double gamer D-pad.
Figure 10A:
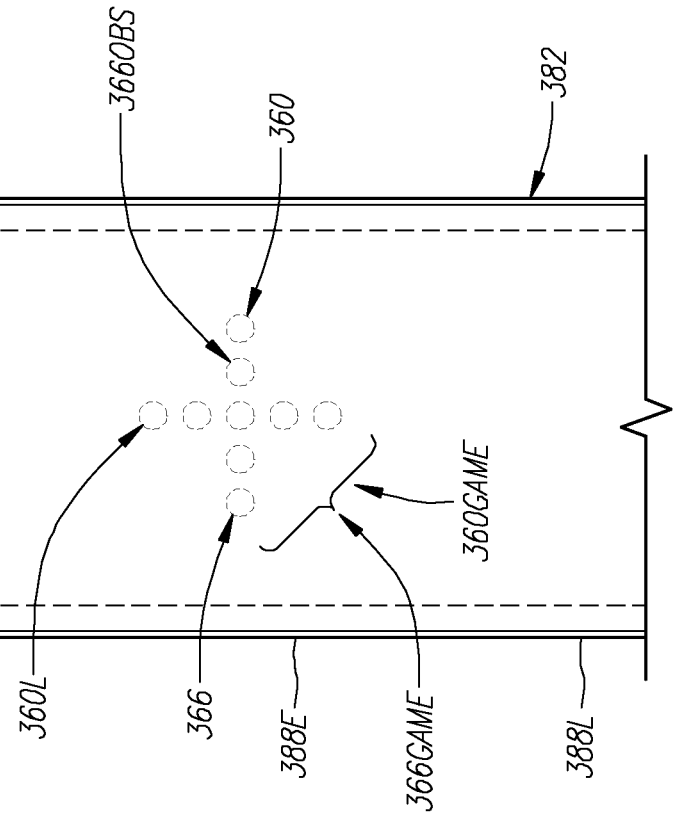
Figure 10B:
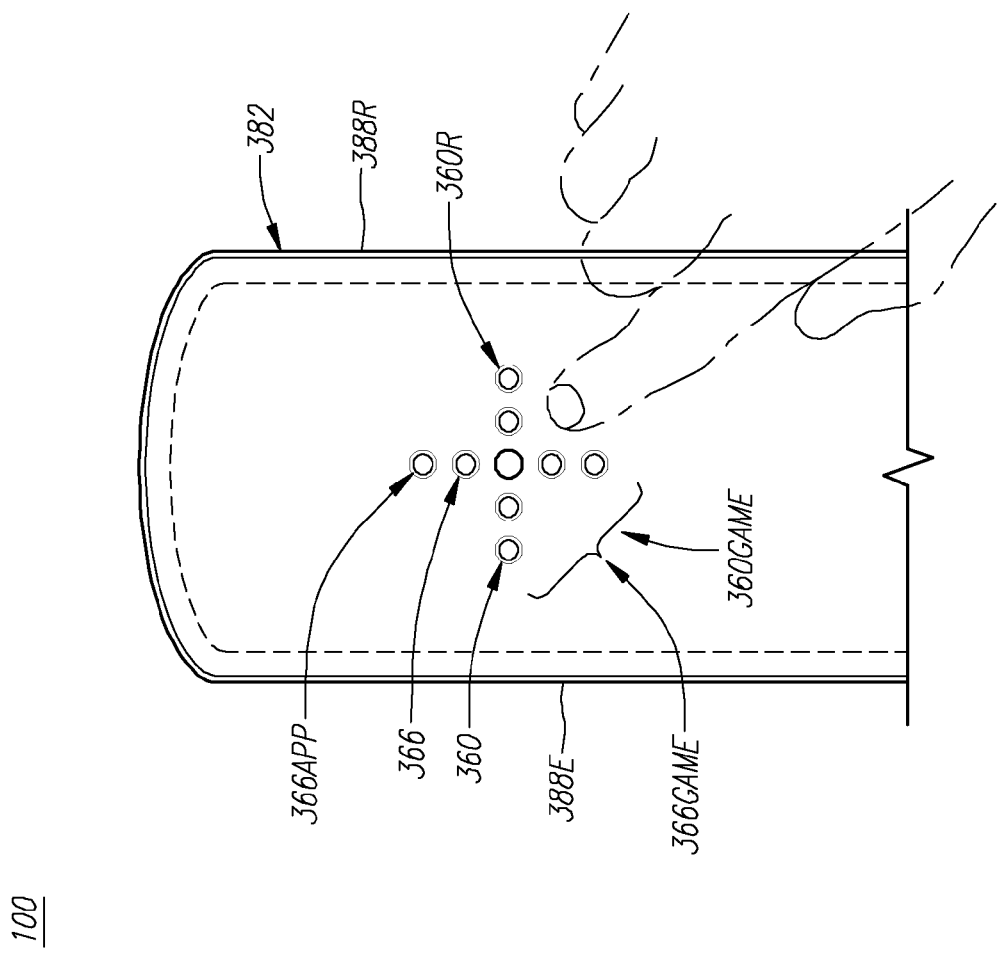
FIG. 10B is an exemplary detail drawing illustrating the user interface system of FIG. 10A, wherein the user interface system is emphasized when the hand of the user approaches, and becomes proximate to, the user interface system.
Figure 10B:
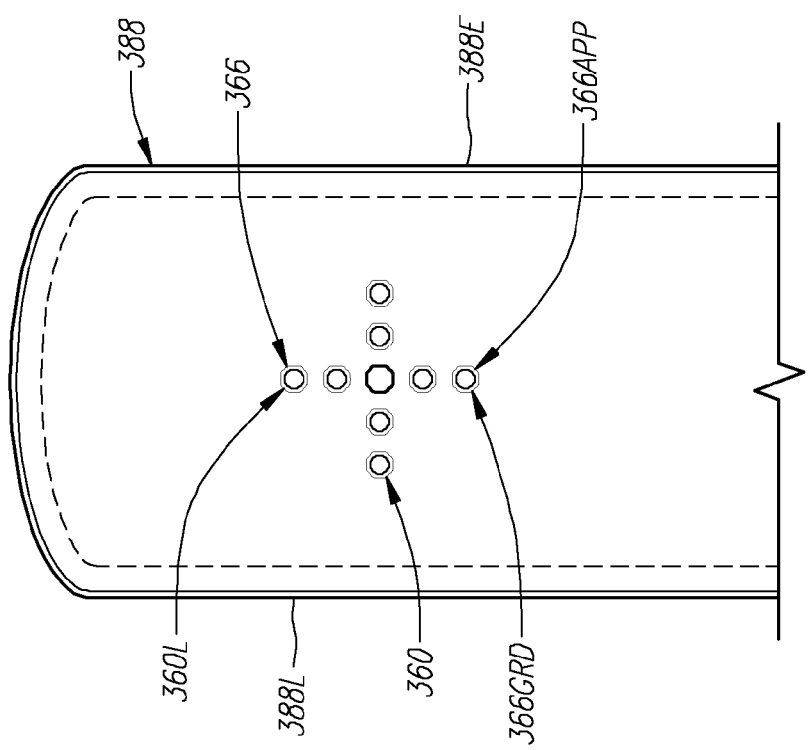

Another alternative embodiment of the user interface system 360 of FIGS. 8A-B is shown in FIGS. 10A-B. Being provided in the manner set forth above with reference to the user interface system 360 of FIGS. 8A-B, the gaming interface system 360GAME of FIGS. 10A-B comprises a double gamer D-pad for playing selected games. Exemplary games suitable for the double gamer D-pad include a trivia game, a sliders game, and/or a mock trackball game. Turning to FIG. 10A, the interface elements 366 of the user interface system 360 can be provided as de-emphasized interface elements 366OBS when the user is distal from the user interface system 360. When the user hand approaches, and becomes proximate to, the user interface system 360, the interface elements 366 forming the gaming interface system 360GAME can become emphasized interface elements 366APP as shown in FIG. 10B in the manner discussed above with reference to FIGS. 8A-B. The video interface system 362 and/or the audio interface system 364 likewise can be activated to facilitate the interaction with the selected system resource 110 and to otherwise play the game. The user interface system 360 advantageously enables the user to initiate and play the selected games via the system resource(s) 110 (and/or the associated resource function(s)) available by way of the information system 100.

Figure 11A:
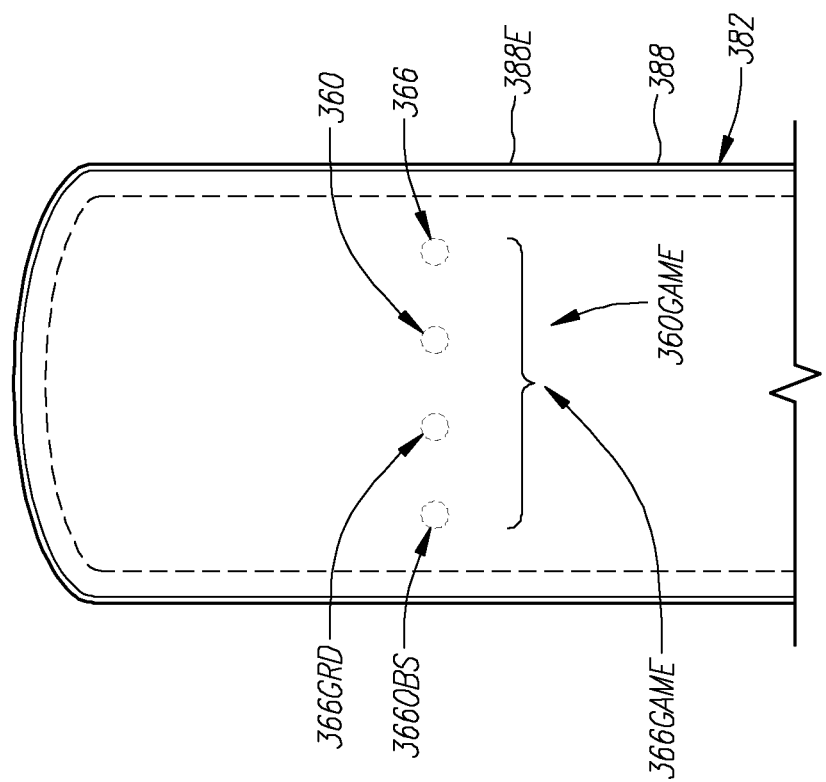
FIG. 11A is an exemplary detail drawing illustrating another alternative embodiment of the user interface system of FIGS. 8A-B, wherein the gaming interface is suitable for playing a trivia game.
Figure 11B:
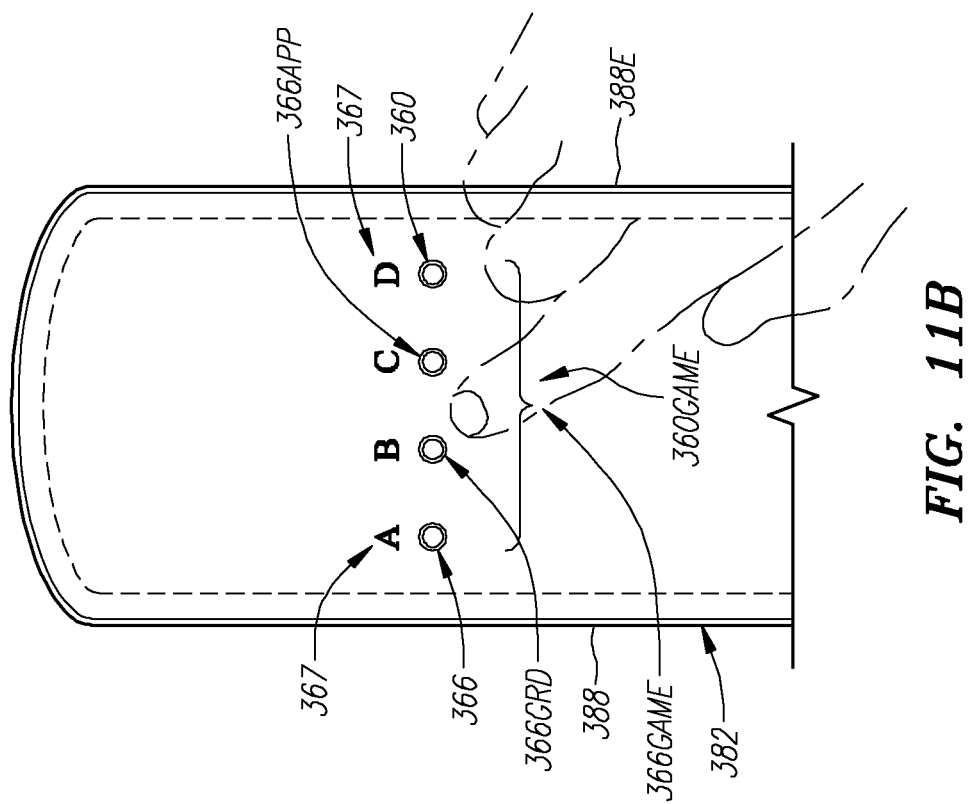
FIG. 11B is an exemplary detail drawing illustrating the user interface system of FIG. 11A, wherein the user interface system is emphasized when the hand of the user approaches, and becomes proximate to, the user interface system.

Still another alternative embodiment of the user interface system 360 of FIGS. 8A-B is shown in FIGS. 11A-B. The user interface system 360 of FIGS. 11A-B can be provided in the manner set forth above with reference to the user interface system 360 of FIGS. 8A-B and can form a gaming interface system 360GAME that is suitable for playing a selected trivia game. Turning to FIG. 11A, the interface elements 366 of the user interface system 360 can be provided as de-emphasized interface elements 366OBS when the user is distal from the user interface system 360. When the user hand approaches, and becomes proximate to, the user interface system 360, the interface elements 366 forming the gaming interface system 360GAME can become emphasized interface elements 366APP as shown in FIG. 11B in the manner discussed above with reference to FIGS. 8A-B.

The interface elements 366 forming the gaming interface system 360GAME can become visible at the relevant armrest 388 in any conventional manner, including by becoming illuminated, by presenting control indicia, and/or by otherwise becoming observably emphasized. As illustrated in FIG. 11B, for example, interface elements 366 can become observably emphasized by presenting associated function icons 367. The video interface system 362 and/or the audio interface system 364 likewise can be activated to facilitate the interaction with the selected system resource 110 and to otherwise play the game. The user interface system 360 advantageously enables the user to initiate and play the selected games via the system resource(s) 110 (and/or the associated resource function(s)) available by way of the information system 100. Although shown and described with reference to FIGS. 8A-B, 9A-B, 10A-B, and 11A-B as comprising selected exemplary interfaces for purposes of illustration only, the user interface system 360 can provide any suitable type of gaming interface system 360GAME via one or more interface elements 366 and/or can be disposed at any appropriate location of the user chair 382.

Another illustrative system application of the user interface system 360 of FIGS. 5A-C is as a pointer control interface system, such as a mouse and/or trackball system. An exemplary embodiment of a pointer control interface system 360PNT is shown and described with reference to FIGS. 12A-D. The pointer control interface system 360PNT can be formed via one or more interface elements 366 that are disposed at a selected armrest 388 or other suitable location of the user chair 382. Stated somewhat differently, a plurality of interface elements 366 can cooperate to form a composite pointer control interface element 366PNT for the user interface system 360. The selected interface elements 366 can be provided any manner, including in the manners set forth above with reference to the rectangular grids 366GRD (shown in FIGS. 5A-C), wherein the interface elements 366 are disposed in a conventional and/or customized pointer control interface arrangement of any kind, and without limitation.

Figure 12A:
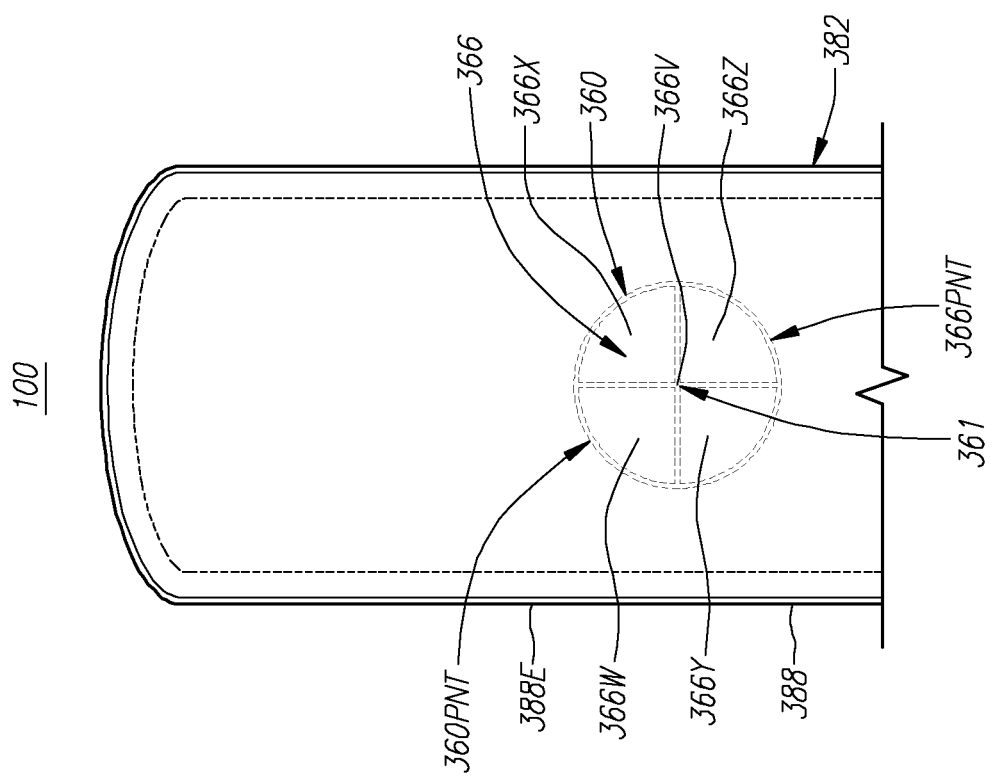
FIG. 12A is an exemplary detail drawing illustrating another alternative embodiment of the user interface system of FIGS. 4A-F, wherein the selected interface elements form a pointer control interface system.

Turning to FIG. 12A, the pointer control interface system 360PNT is shown as comprising a plurality of directional interface elements 366W-Z for providing directional control for the pointer control interface system 360PNT. The directional interface elements 366W-Z preferably can provide three hundred, sixty degree (360°) pointer control and/or can be oriented at any preselected angle relative to the longitudinal axis of the selected armrest 388. The preselected angle can be within any predetermined range of angles, such as any five-degree range between zero degrees and forty-five degrees (or more). Each directional interface element 366W-Z can comprise one or more interface elements 366 as desired.

The pointer control interface system 360PNT is shown in FIG. 12A as including at least one optional selection interface element 366V for providing selection control for the pointer control interface system 360PNT. In the illustrated embodiment, the selection interface element 366V is disposed at a central portion 361 of the pointer control interface system 360PNT. Although shown as being centrally disposed relative to the directional interface elements 366W-Z for purposes of illustration, the selection interface element 366V can be provided at any suitable region of the user interface system 360 relative to the directional interface elements 366W-Z. In one embodiment, the pointer control interface system 360PNT, preferably a central selection interface element 366V, is illuminated at the chair location to assist the user with locating the pointer control interface system 360PNT.

Figure 12B:
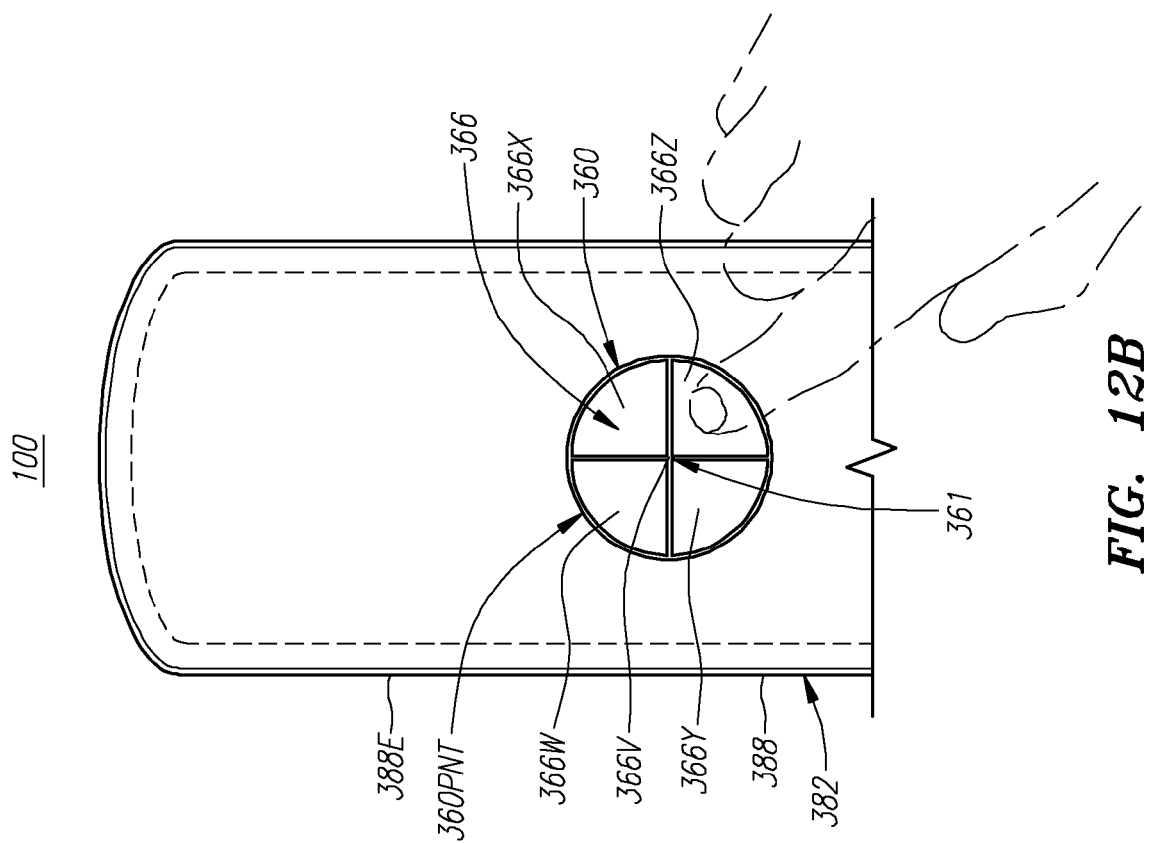
FIG. 12B is an exemplary detail drawing illustrating the user interface system of FIG. 12A, wherein the user interface system is emphasized when the hand of the user approaches, and becomes proximate to, the user interface system.

The directional interface elements 366W-Z and/or the selection interface element 366V forming the pointer control interface system 360PNT can be provided as de-emphasized interface elements 366OBS as shown in FIG. 12A when the user is distal from the user interface system 360. When the user hand approaches, and becomes proximate to, the user interface system 360, the interface elements 366 forming the directional interface elements 366W-Z and/or the selection interface element 366V can become emphasized interface elements 366APP as illustrated in FIG. 12B in the manner discussed above. The directional interface elements 366W-Z and/or the selection interface element 366V forming the pointer control interface system 360PNT can become visible at the relevant armrest 388 in any conventional manner, including by becoming illuminated, by presenting control indicia, and/or by otherwise becoming observably emphasized.

Exemplary observably emphasis for the pointer control interface system 360PNT can include illuminating the directional interface elements 366W-Z and/or the selection interface element 366V and/or presenting each directional interface element 366W-Z and/or the selection interface element 366V with a preselected color and/or control indicia. The directional interface elements 366W-Z, for instance, can be provided with directional function icons, such as arrows. Additionally, and/or alternatively, the preselected color(s) can be the same, and/or different, among the directional interface element 366W-Z, and the preselected color of the selection interface element 366V can be the same as, and/or different from, the preselected color(s) of the directional interface elements 366W-Z.

Figure 12C:
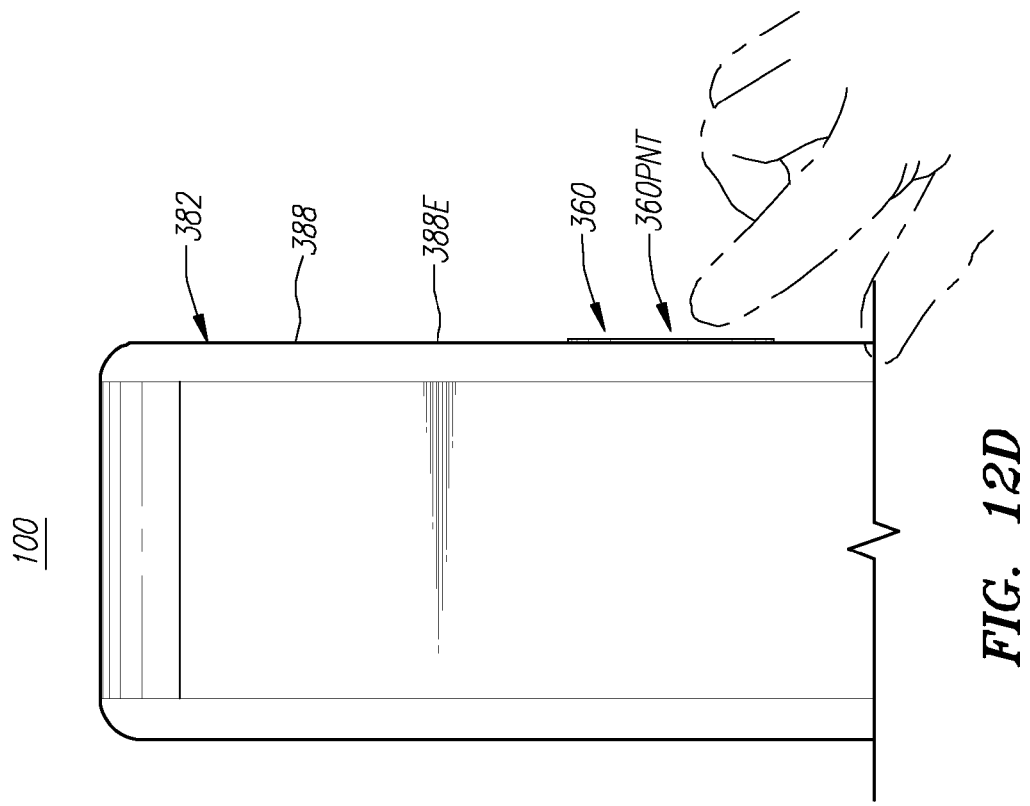
FIG. 12C is an exemplary detail drawing illustrating an embodiment of the user interface system of FIG. 12B, wherein the pointer control interface system is formed with a domed profile.
Figure 12D:
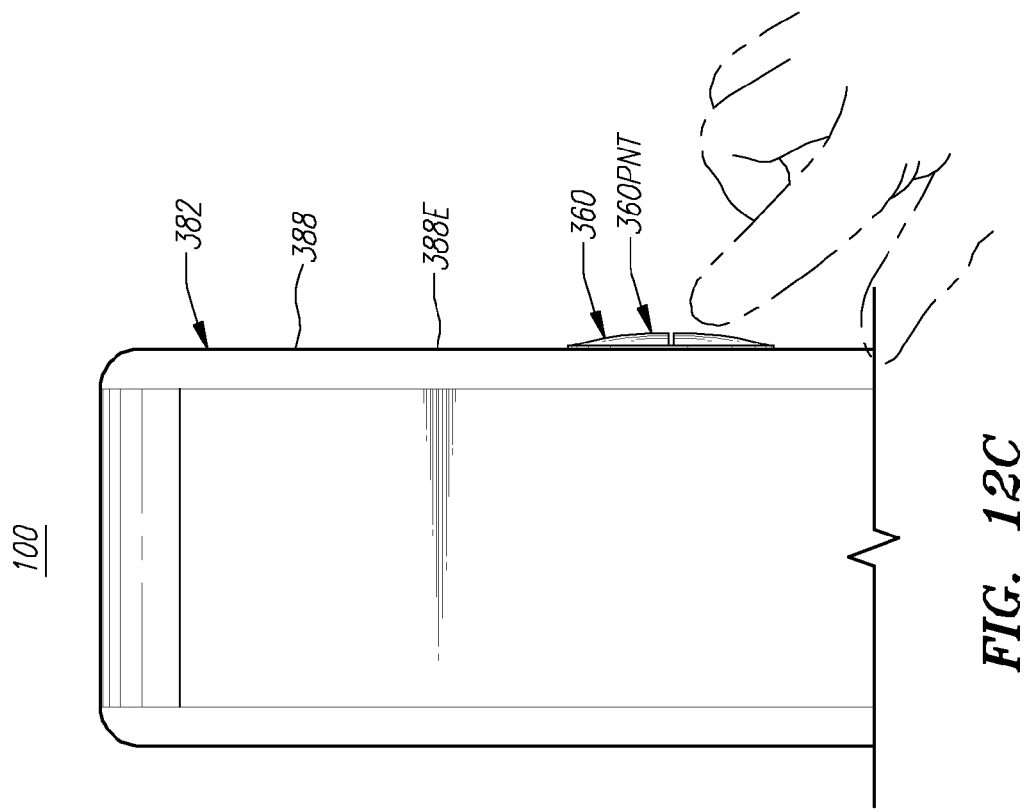
FIG. 12D is an exemplary detail drawing illustrating an alternative embodiment of the user interface system of FIG. 12B, wherein the pointer control interface system is formed with a flat profile.

Although shown and described as being formed via four directional interface elements 366W-Z and as having a round shape with reference to FIGS. 12A-B for purposes of illustration only, the pointer control interface system 360PNT can be formed with any suitable number and/or arrangement of directional interface elements 366W-Z and/or can be provided with any appropriate shape and/or profile, without limitation. The pointer control interface system 360PNT, upon becoming apparent, can be provided as a control ball (or dome), for example, with a domed profile as shown in FIG. 12C. Alternatively, FIG. 12D shows the pointer control interface system 360PNT as being provided with a flat profile. The characteristics, such as the shape, the profile, and/or the number and/or arrangement of the directional interface elements 366W-Z, of the pointer control interface system 360PNT can depend upon any selected criteria, including a predetermined application of the user interface system 360 and/or the nature of the interaction with the system resource(s) 110 (and/or the associated resource function(s)) available by way of the information system 100. In other words, the characteristics of the pointer control interface system 360PNT can be based at least in part upon a type of user interface that is suitable for interacting with the relevant system resource 110 available by way of the information system 100 (shown in FIG. 1).

The pointer control interface system 360PNT of FIGS. 12A-D advantageously can be utilized in conjunction with a video interface system 362 (shown in FIGS. 6A-B) and/or an audio interface system 364 (shown in FIGS. 26A-B). In the manner set forth above with reference to FIGS. 6A-B, the video interface system 362 and/or the audio interface system 364 can present a listing (or catalogue) of the system resource(s) 110 (shown in FIG. 1) (and/or the associated resource function(s)) available by way of the information system 100, and the pointer control interface system 360PNT, upon becoming apparent, can be manipulated to navigate among the available system resources 110 and selected one or more of the system resources 110.

In one embodiment of the user chair 382, the pointer control interface system 360PNT (typically in conjunction with the video interface system 362 and/or the audio interface system 364) can comprise the user interface system 360 in its entirety. In other words, the pointer control interface system 360PNT can comprise the only user control interface at the user chair 382. The pointer control interface system 360PNT thereby can enable the user to interact with the system resource(s) 110 (shown in FIG. 1) (and/or the associated resource function(s)) available by way of the information system 100 with simple conventional gestures made with one hand (or finger) and/or two hands (or fingers). The hand gestures preferably are performed adjacent to, and/or within a predetermined range, the pointer control interface system 360PNT of the user interface system 360.

Exemplary hand gestures can include tapping, double tapping, sliding, swiping, twisting, pinching, pulling, etc., without limitation. Each hand gestures can be associated with predetermined control functions. The twisting hand gesture, for instance, can be associated with a rotation function for rotating viewing content 210 (shown in FIGS. 22A-B) presented via the video interface system 362 (shown in FIGS. 6A-B); whereas, other hand gestures can be associated with other presentation control functions such as dragging, zooming in, zooming out, and/or panning. Once a selected hand gesture is performed adjacent to the pointer control interface system 360PNT, the user interface system 360 can execute the associated predetermined control function. The viewing content 210 as presented, for example, can be manipulated in a predetermined manner by performing one or more hand gestures adjacent to the pointer control interface system 360PNT of the user interface system 360. In one embodiment, manipulation of one or more of the interface elements 366 of the user interface system 360 can be achieved by performing a hand gesture.

Figure 13A:
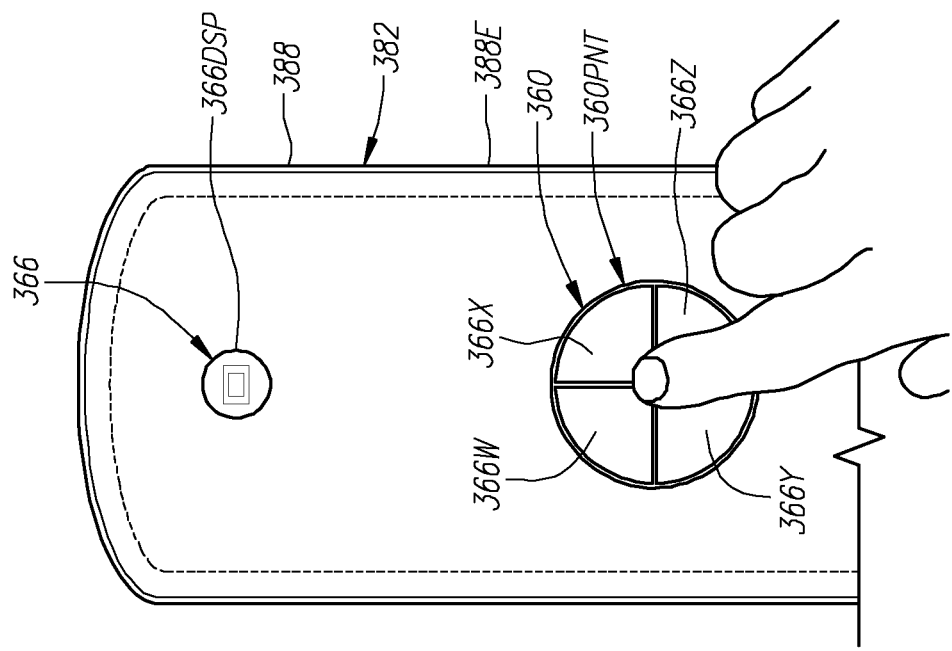
FIGS. 13A-C are exemplary detail drawings illustrating an embodiment of the pointer control interface system of FIGS. 12A-D, wherein the user interface system is utilized to navigate a hierarchical menu system presented via the video interface system of FIGS. 6A-B.
Figure 13A:
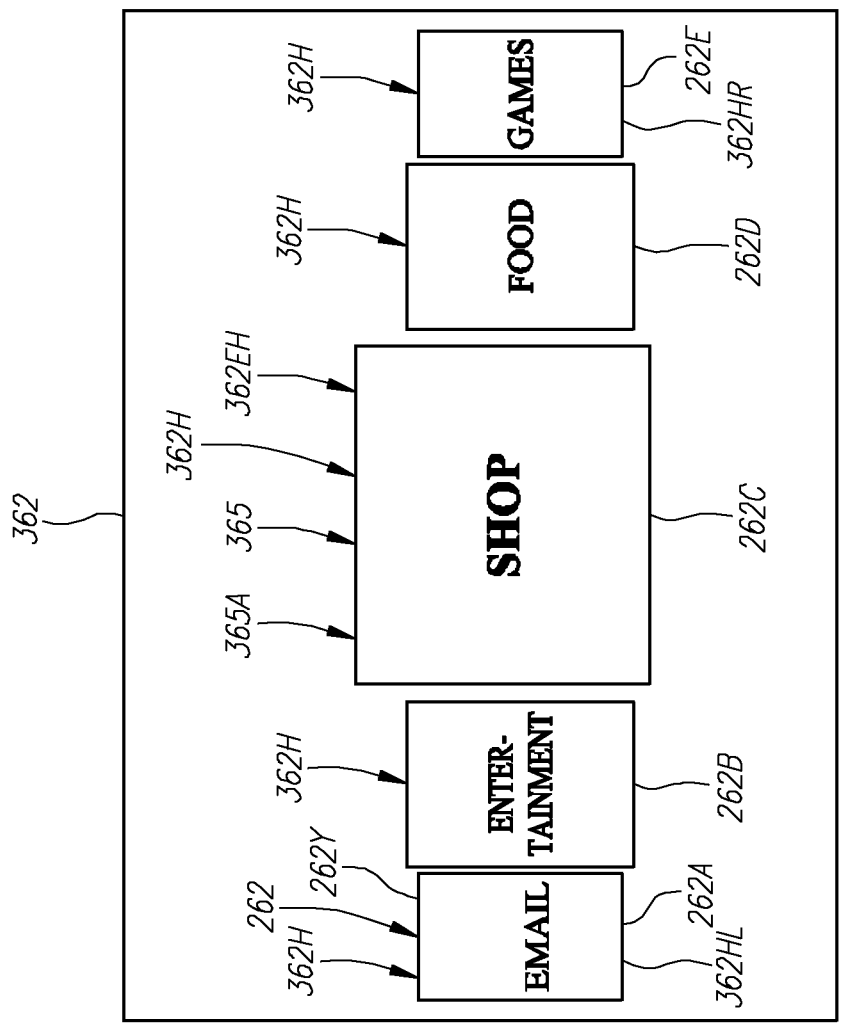
Figure 13B:
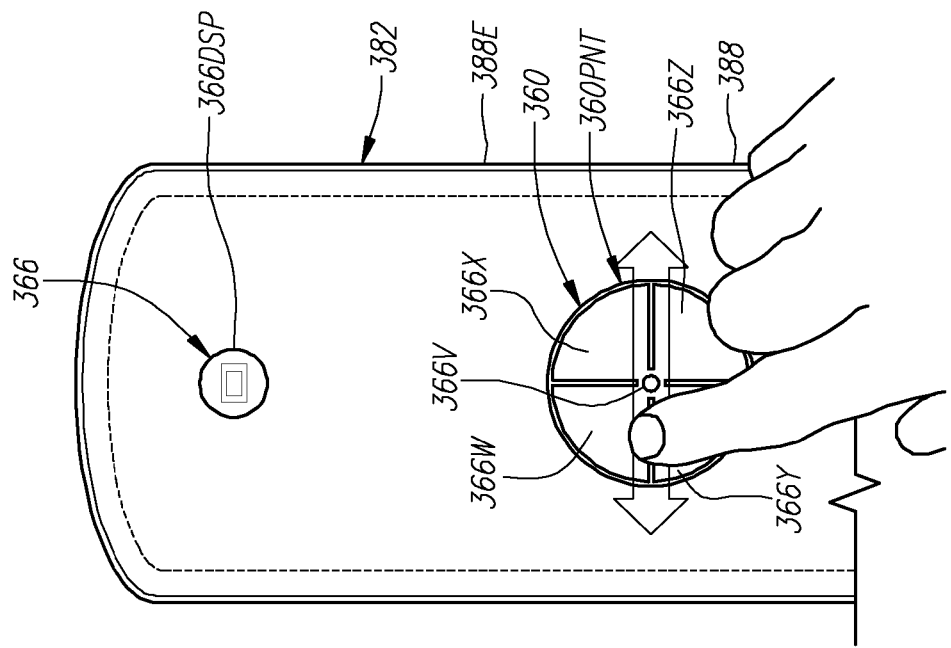
Figure 13B:
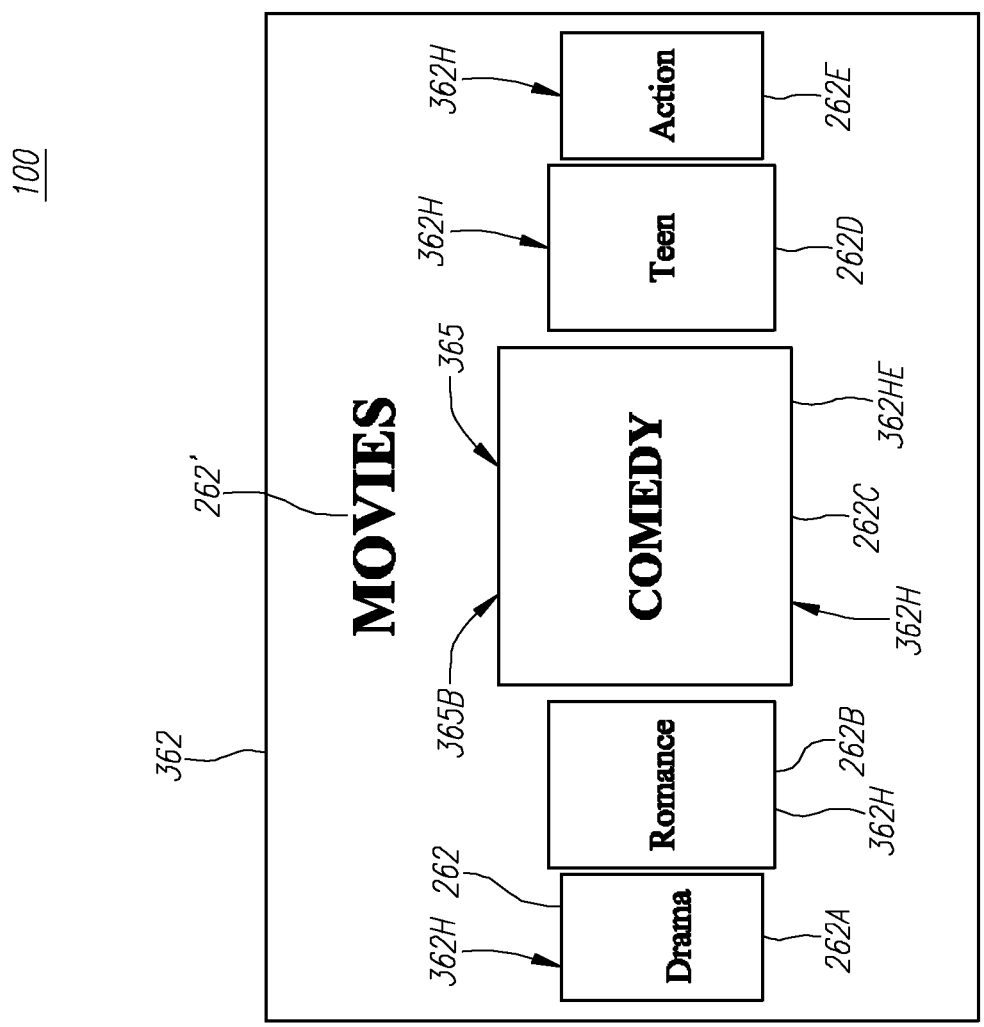
Figure 13C:
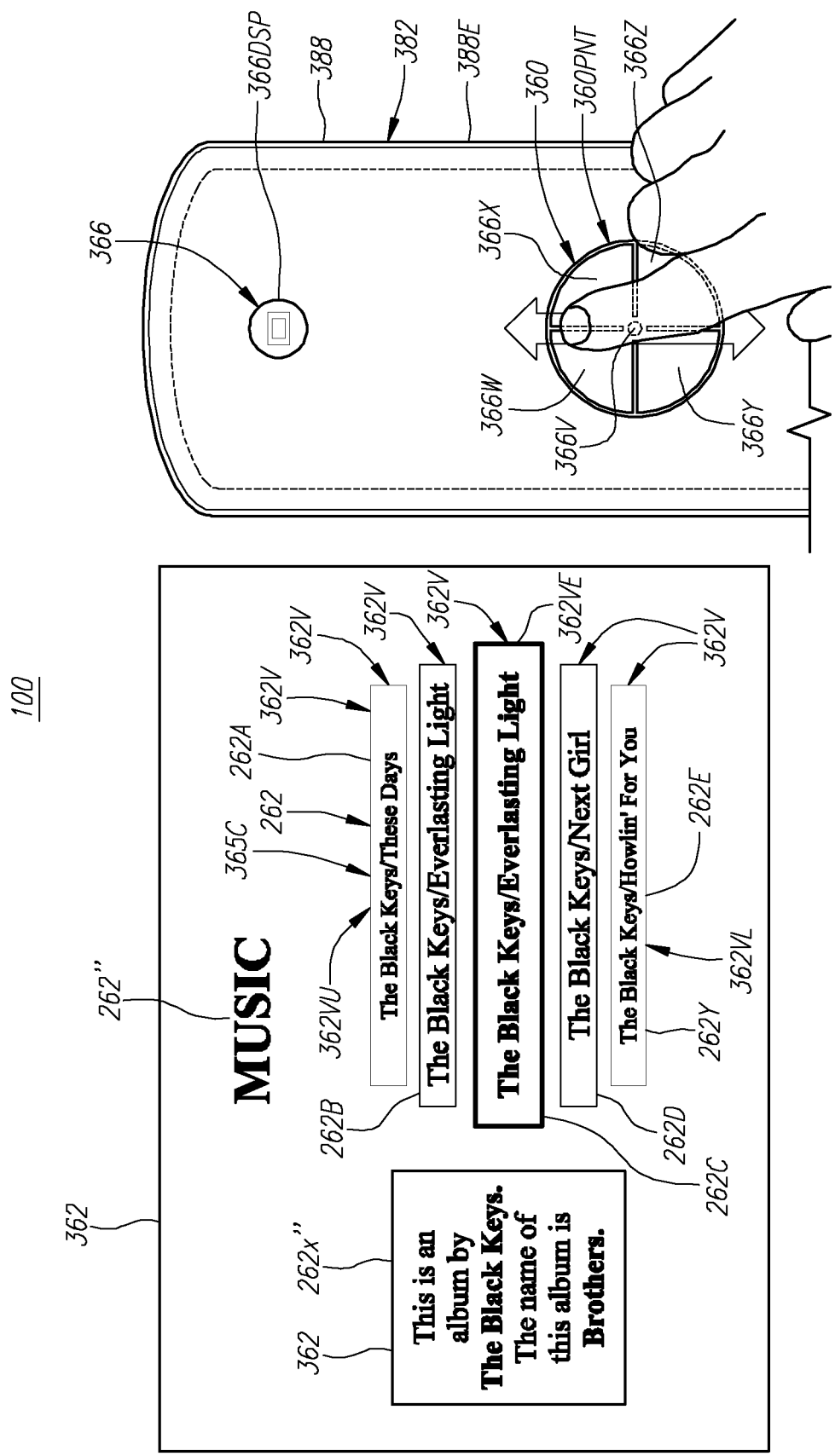

Turning to FIGS. 13A-C, for example, the video interface system 362 can present a menu system 262 for selecting among the system resource(s) 110 (shown in FIG. 1) (and/or the associated resource function(s)). The menu system 262 can be provided in any conventional manner, including in the manner set forth above with reference to the menu system 262 (shown in FIG. 6B), and is illustrated as including a plurality of control indicia 262Y representing the available system resources 110. The pointer control interface system 360PNT, upon becoming apparent, can be manipulated to navigate the menu system 262 and, as desired, to select at least one control indicia 262Y representing a selected system resource 110. In other words, the video interface system 362 can present the control indicia 262Y of the menu system 262, and the pointer control interface system 360PNT, upon becoming apparent, can be utilized to view and/or select one or more of the control indicia 262Y.

The pointer control interface system 360PNT can be manipulated to navigate the menu system 262 in any conventional manner, including in the manner set forth in more detail above with reference to the menu system 262 (shown in FIG. 6B). For example, one or more of the directional interface elements 366W-Z of the pointer control interface system 360PNT can be utilized to navigate among the control indicia 262Y, and/or the selection interface element 366V of the pointer control interface system 360PNT can be actuated to select one or more of the control indicia 262Y. The selected control indicia 262Y can be selected in any suitable manner. Exemplary manners for selecting the control indicia 262Y can include manipulating the pointer control interface system 360PNT to adjust a position of a cursor 262X (shown in FIG. 6B) presented on the video interface system 362 relative to the control indicia 262Y and/or scrolling through the control indicia 262Y presented on the video interface system 362.

Figures 20A, 20B:
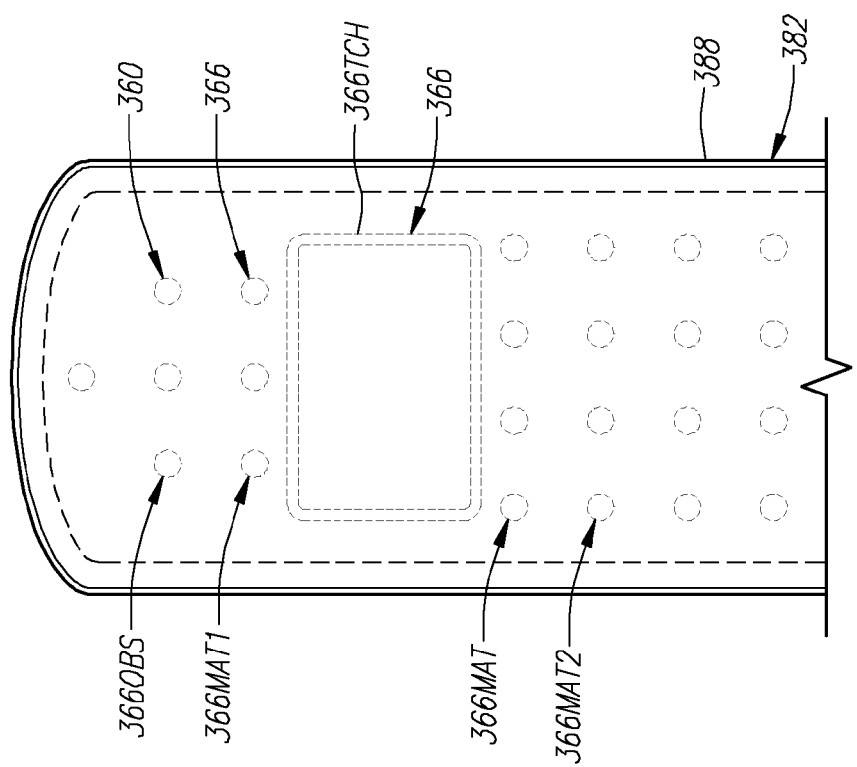
FIGS. 20A-B are exemplary detail drawings illustrating another alternative embodiment of the user chair of FIG. 1, wherein the user interface system can include at least one touch pad system.

Additionally, and/or alternatively, the menu system 262 can be navigated via performance of one or more selected hand gestures adjacent to the pointer control interface system 360PNT in the manner set forth in more detail above with reference to the pointer control interface system 360PNT (shown in FIGS. 20A-B). One or more predetermined hand gestures, for example, can be associated with predetermined control functions for returning to a main (or home) menu level of the menu system 262, returning to a previously-viewed menu level (or menu item). Additionally, and/or alternatively, a selected interface element 366 can be associated with the control function for returning to a main (or home) menu level of the menu system 262. The selected interface element 366, upon becoming emphasized, thereby can be manipulated to return to the main menu level of the menu system 262. In one embodiment, the hand gestures can be performed adjacent to the pointer control interface system 360PNT (or other emphasized interface elements 366APP) disposed at more than one location at the user chair 382.

Turning to FIG. 13A, for example, the user interface system 360 is shown as including at least one interface element 366DSP. The interface element 366DSP can be provided in the manner discussed above with reference to the interface element 366DSP (shown in FIG. 6B) and, upon becoming apparent, can be manipulated to activate and otherwise control the video interface system 362 and/or the audio interface system 364. Upon being activated, the video interface system 362 can present the menu system 262. If the menu system 262 comprises a hierarchical menu system with a plurality of menu levels 365, the menu system 262 of FIG. 13A can comprise a first selected menu level 365A, such as main (or home) menu level, of the menu system 262. The user interface system 360 advantageously can support directly returning to the main menu level from any other menu level via a predetermined hand gesture performed adjacent to the user interface system 360. In one embodiment, the interface element 366DSP likewise can be manipulated to deactivate the video interface system 362 and/or the audio interface system 364

FIG. 13A shows an illustrative embodiment of the first selected menu level 365A of the menu system 262. The first selected menu level 365A is illustrated as comprising a horizontal menu system, wherein exemplary control indicia 262Y are disposed in a horizontal arrangement and are associated with selected system resource(s) 110 (shown in FIG. 1) (and/or the associated resource function(s)). The exemplary control indicia 262Y include control indicia 262A representing electronic mail (or e-mail) functionality, control indicia 262B representing entertainment (or viewing) content functionality, control indicia 262C representing shopping functionality, control indicia 262D representing food (and/beverage) ordering functionality, and/or control indicia 262E representing user games functionality, without limitation. The control indicia 262A-E are shown as being disposed in respective horizontal positions 362H associated with the video interface system 362. Although shown and described as comprising a horizontal menu system with exemplary control indicia 262A-E for purposes of illustration only, the first selected menu level 365A can include any predetermined number and/or arrangement of control indicia 262Y that can be associated with any selected system resources 110.

The pointer control interface system 360PNT, upon becoming apparent, can be manipulated to navigate among the control indicia 262A-E (and/or represented system resources 110) of the first selected menu level 365A of the menu system 262. Navigation of the first selected menu level 365A can be performed via any suitable manipulation of the pointer control interface system 360PNT. One or more directional interface elements 366W-Z of the pointer control interface system 360PNT can be manipulated, for example, to horizontally scroll (or rotate) the control indicia 262A-E by one or more horizontal positions 362H of the video interface system 362. The control indicia 262A-E can scroll by one or more horizontal positions 362H in a leftward direction when at least one of the directional interface elements 366W, 366Y is actuated and/or by one or more horizontal positions 362H in a rightward direction when at least one of the directional interface elements 366X, 366Z is actuated.

If the presented control indicia 262A-E comprise a complete group of the control indicia 262Y for the first selected menu level 365A of the menu system 262, the control indicia 262Y presented at a leftmost horizontal position 362HL of the video interface system 362 can be repositioned to a rightmost horizontal position 362HR of the video interface system 362 during leftward scrolling of the first selected menu level 365A. The control indicia 262Y presented at the rightmost horizontal position 362HR likewise can be repositioned to the leftmost horizontal position 362HL during rightward scrolling.

Alternatively, the first selected menu level 365A can include other control indicia 262Y that is not presented on the video interface system 362. In other words, the video interface system 362 may not simultaneously present all of the control indicia 262Y of the first selected menu level 365A, and/or the presented control indicia 262A-E comprise a selected subgroup of the control indicia 262Y. Any unpresented control indicia 262Y can be presented via the video interface system 362 by replacing one or more of the presented control indicia 262A-E with the unpresented control indicia 262Y. If the pointer control interface system 360PNT, for example, is manipulated to scroll the presented control indicia 262A-E by one position in the leftward direction, the control indicia 262A can be scrolled to an unpresented position; whereas, unpresented control indicia 262Y can be scrolled to the rightmost horizontal position 362HR of the video interface system 362.

In one embodiment, a navigation (or scrolling) speed can be increased by moving the user hand from a first position to a second position of the pointer control interface system 360PNT, wherein the second position is further from the central portion 361 (shown in FIGS. 12A-B) of the pointer control interface system 360PNT than is the first position. The navigation speed likewise can be decreased by moving the user hand from the second position of the pointer control interface system 360PNT to the first position. In other words, the navigation speed can be controlled based at least in part on a distance between the user hand and the central portion 361 of the pointer control interface system 360PNT. The control indicia 262Y (and/or the represented system resources 110) at an emphasized horizontal position 362HE of the video interface system 362 can be selected by manipulation of the selection interface element 366V (shown in FIGS. 12A-B) of the pointer control interface system 360PNT.

An alternative embodiment of the menu system 262 is illustrated in FIG. 13B. The menu system 262 of FIG. 13B can comprise a menu system that is at least partially associated with, and/or separate from, the menu system 262 of FIG. 13A. If provided as a part of the same hierarchical menu system, the menu system 262 of FIG. 13B can form a second selected menu level 365B of the menu system 262 of FIG. 13A. Being provided in the manner set forth above with reference to the first selected menu level 365A of the menu system 262 (shown in FIG. 13A), the second selected menu level 365B is shown as comprising a horizontal menu system with exemplary control indicia 262Y being disposed in a horizontal arrangement and being associated with selected system resource(s) 110 (shown in FIG. 1) (and/or the associated resource function(s)).

Turning to FIG. 13B, the second selected menu level 365B can be associated with selected entertainment content, such as movies 262', available via the information system 100. Accordingly, the control indicia 262Y for the second selected menu level 365B can represent different types (or genres) of movies. The exemplary control indicia 262Y include control indicia 262A representing dramatic movie content functionality, control indicia 262B representing romantic movie content functionality, control indicia 262C representing comedic movie content functionality, control indicia 262D representing teenage movie content functionality, and/or control indicia 262E representing action movie content functionality, without limitation. The control indicia 262A-E are shown as being disposed in respective horizontal positions 362H associated with the video interface system 362.

The pointer control interface system 360PNT, upon becoming apparent, can be manipulated to navigate among the various menu levels 365 of the menu system 262. For example, if the pointer control interface system 360PNT is manipulated to navigate the first selected menu level 365A (shown in FIG. 13A) and/or to select the control indicia 262B (shown in FIG. 13A) that represents entertainment (or viewing) content functionality, the information system 100 can respond by presenting the second selected menu level 365B, which is associated with movie entertainment content, via the video interface system 362. The pointer control interface system 360PNT likewise can be manipulated to navigate among, and/or to select, the control indicia 262A-E (and/or represented system resources 110) of the second selected menu level 365B in the manner set forth above with reference to navigation of the first selected menu level 365A (shown in FIG. 13A). In one embodiment, the menu system 262 can include one or more additional menu levels 365 associated with the control indicia 262A-E of the second selected menu level 365B. Each additional menu level 365 can be provided in the manner discussed above and/or can include any predetermined number and/or arrangement of control indicia 262Y that can be associated with any selected system resources 110.

Additionally, and/or alternatively, the menu system 262 of FIG. 13C can comprise a menu system that is at least partially associated with, and/or separate from, the menu systems 262 of FIGS. 13A-B. If provided as a part of the same hierarchical menu system, the menu system 262 of FIG. 13C can form a third selected menu level 365C of the menu system 262 of FIGS. 13A-B. The third selected menu level 365C is shown as comprising a vertical menu system with exemplary control indicia 262Y being disposed in a vertical arrangement and being associated with selected system resource(s) 110 (shown in FIG. 1) (and/or the associated resource function (s)). FIG. 13C shows that the third selected menu level 365C can be associated with selected entertainment content, such as music 262", available via the information system 100.

Accordingly, the control indicia 262Y for the third selected menu level 365C can represent different types (or genres) of music.

The different music genres can be compiled in any conventional manner, such as by artist, album, song titles, and/or other music selections. As shown in FIG. 13C, the control indicia 262Y for the third selected menu level 365C can represent music selections from an album "Brothers" by the artist "The Black Keys." The exemplary control indicia 262Y include control indicia 262A representing a song entitled "These Days", control indicia 262B representing a song entitled "Everlasting Light", control indicia 262C representing a song entitled "Next Girl", control indicia 262D representing a song entitled "Tighten Up", and/or control indicia 262E representing a song entitled "Howlin' For You", without limitation. The third selected menu level 365C optionally can present biographical information 262X", such as an album cover and/or cover notes, about the songs (and/or albums). The control indicia 262A-E are shown as being disposed in respective vertical positions 362L associated with the video interface system 362. Although shown and described as comprising a vertical menu system with exemplary control indicia 262A-E for purposes of illustration only, the third selected menu level 365C can include any predetermined number and/or arrangement of control indicia 262Y that can be associated with any selected system resources 110.

The pointer control interface system 360PNT, upon becoming apparent, can be manipulated to navigate among the control indicia 262A-E (and/or represented system resources 110) of the third selected menu level 365C of the menu system 262. Navigation of the third selected menu level 365C can be performed via any suitable manipulation of the pointer control interface system 360PNT in a manner analogous to the manner discussed in more detail above with reference to the horizontal menu system (shown in FIG. 13A). One or more directional interface elements 366W-Z of the pointer control interface system 360PNT can be manipulated, for example, to vertically scroll the control indicia 262A-E by one or more vertical positions 362V of the video interface system 362. The control indicia 262A-E can scroll by one or more vertical positions 362V in a upward direction when at least one of the directional interface elements 366W, 366X is actuated and/or by one or more vertical positions 362V in a downward direction when at least one of the directional interface elements 366Y, 366Z is actuated. The control indicia 262Y (and/or the represented system resources 110) at an emphasized vertical position 362VE of the video interface system 362 can be selected by manipulation of the selection interface element 366V (shown in FIGS. 12A-B) of the pointer control interface system 360PNT.

If the presented control indicia 262A-E comprise a complete group of the control indicia 262Y for the third selected menu level 365C of the menu system 262, the control indicia 262Y presented at a uppermost vertical position 362VU of the video interface system 362 can be repositioned to a lowermost vertical position 362VL of the video interface system 362 during upward scrolling of the third selected menu level 365C. The control indicia 262Y presented at the lowermost vertical position 362VL likewise can be repositioned to the uppermost vertical position 362VU during downward scrolling.

Alternatively, the third selected menu level 365C can include other control indicia 262Y that is not presented on the video interface system 362 in the manner discussed in more detail above with reference to the horizontal menu system (shown in FIG. 13A). In other words, the video interface system 362 may not simultaneously present all of the control indicia 262Y of the third selected menu level 365C, and/or the presented control indicia 262A-E comprise a selected subgroup of the control indicia 262Y. Any unpresented control indicia 262Y can be presented via the video interface system 362 by replacing one or more of the presented control indicia 262A-E with the unpresented control indicia 262Y. If the pointer control interface system 360PNT, for example, is manipulated to scroll the presented control indicia 262A-E by one position in the upward direction, the control indicia 262A can be scrolled to an unpresented position; whereas, unpresented control indicia 262Y can be scrolled to the lowermost vertical position 362VL of the video interface system 362.

Figure 14A:
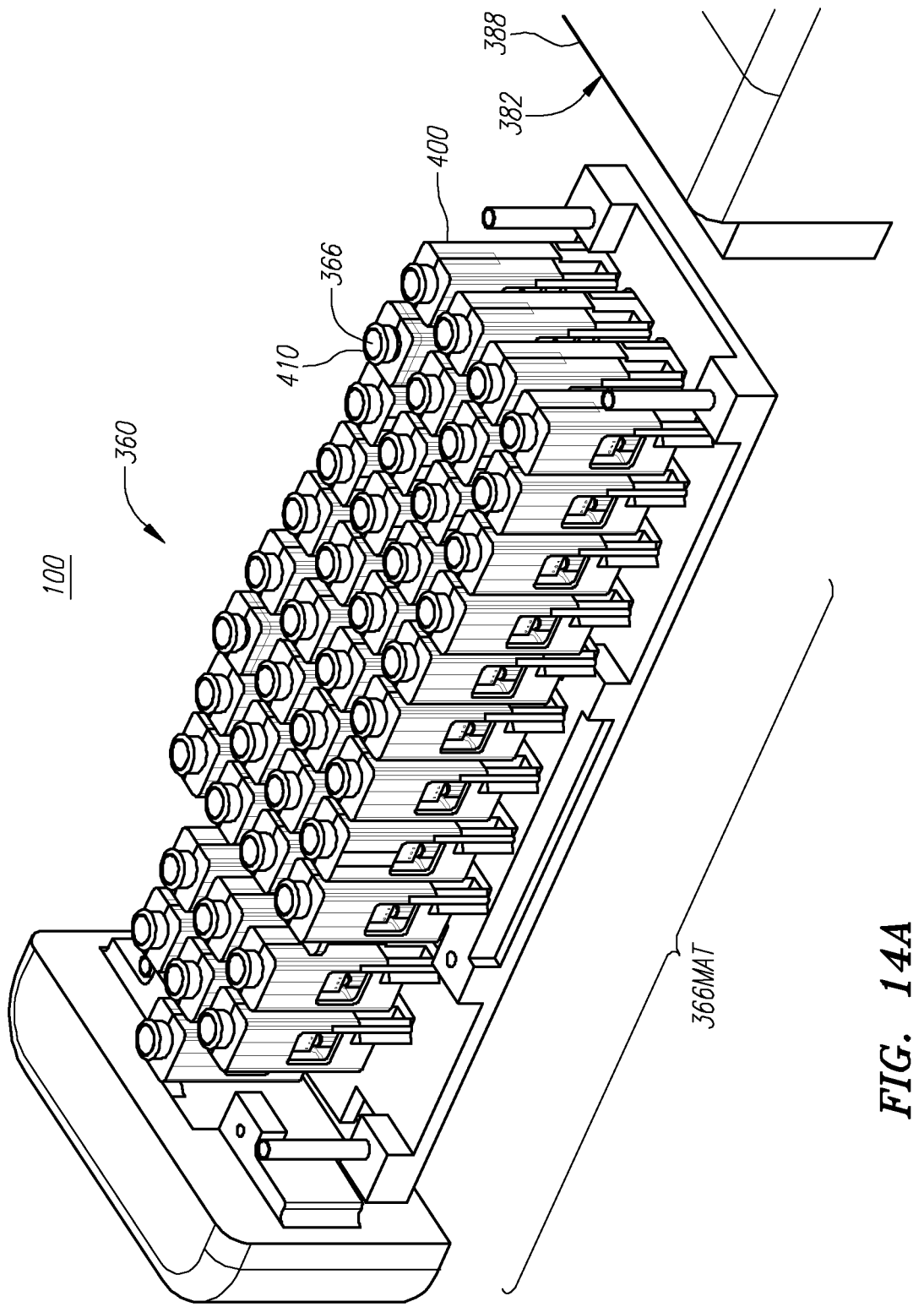
FIG. 14A is an exemplary detail drawing illustrating another alternative embodiment of the user interface system of FIGS. 4A-F, wherein the interface elements comprise electro-mechanical solenoids.

As set forth in more detail above, when a user hand approaches, and becomes proximate to, the user interface system 360, selected interface elements 366 of the user interface system 360 can become apparent (or otherwise emphasized) in any conventional manner. With reference to the user interface system 360 shown in FIGS. 2A-B, for example, the selected interface elements 366A, 366D, upon becoming apparent, can extend from the user interface system 360 and engage the armrest covering 388B. FIG. 14A illustrates another alternative embodiment of the user interface system 360 of FIGS. 4A-F, wherein the interface elements 366 forming the matrix arrangement 366MAT comprise electro-mechanical solenoids 400. The electro-mechanical solenoids 400 can enable the interface elements 366 to be obscured from view by retracting within the user interface system 360 when a user is distal from the user interface system 360 and, upon becoming apparent, to become emphasized by extending from the user interface system 360. The user interface system 360 thereby can support a wide variety of interactive control scenarios via a selected armrest 388 of a user chair 382.

When disposed at the selected armrest 388 of the user chair 382 in the manner set forth in more detail above with reference to the user interface system 360 (shown in FIGS. 2A-B), the interface elements 366 can be positioned adjacent to an armrest covering 388B (shown in FIGS. 2A-B) and covered by the armrest covering 388B. The interface elements 366 thereby can be selectively presented by the user chair 382 via the armrest covering 388B. When powered off (or idle), the solenoids 400 can retract within the user interface system 360 such that the interface elements 366 can be obscured from view by the armrest covering 388B. With the interface elements 366 obscured, the user chair 382 looks ordinary.

One or more of the interface elements 366 can become apparent when the user hand approaches, and becomes proximate to, the user interface system 360. The solenoids 400 of the apparent interface elements 366 wake up and wait in a ready state for user commands. Once a command is given (i.e., a mode of operation is selected), each relevant solenoid 400 can extend from the user interface system 360, forming a raised projection (or bump) 388C (shown in FIG. 2B) at an associated region of the armrest covering 388B in the manner discussed above. The raised projections 388C create a tactile feel for control of the selected operation mode.

The electro-mechanical solenoids 400 preferably are designed such that they can rise and/or lower based on automatic and/or manual commands. FIG. 14A also shows that the solenoids 400 can be outfitted with a cap 410. The cap 410 can incorporate a capacitive touch sensor and/or a light emitting diode (LED) illuminator. In one embodiment, approximately twenty-five solenoids 400 can be associated with each armrest 388. As desired, the cap 410 can elevate and/or illuminate. A matrix (or array) of light emitting diodes (LEDs)

can be disposed below the caps 410, and/or a set of four pico solenoids (not shown) can be located under the cap 410 to raise and lower as desired.

In a preferred embodiment, one or more of the solenoids 400 can be used in a plurality of different ways. One operational mode, for example, can include using the solenoids 400 as capacitive touch sensors for detecting a location of the user hand. This operational mode is sometimes called a "hover" mode and can be used to provide visual feedback through the interaction design. The hover mode likewise can be utilized for providing mouse-like functionality. Another illustrative operational mode of operation of the solenoids 400 can comprise configuring the solenoids as selector switches. Each solenoid 400 thereby can be depressed and released to detect specific desired selections. In other words, the solenoid 400 can be "clickable."

Figure 14B:
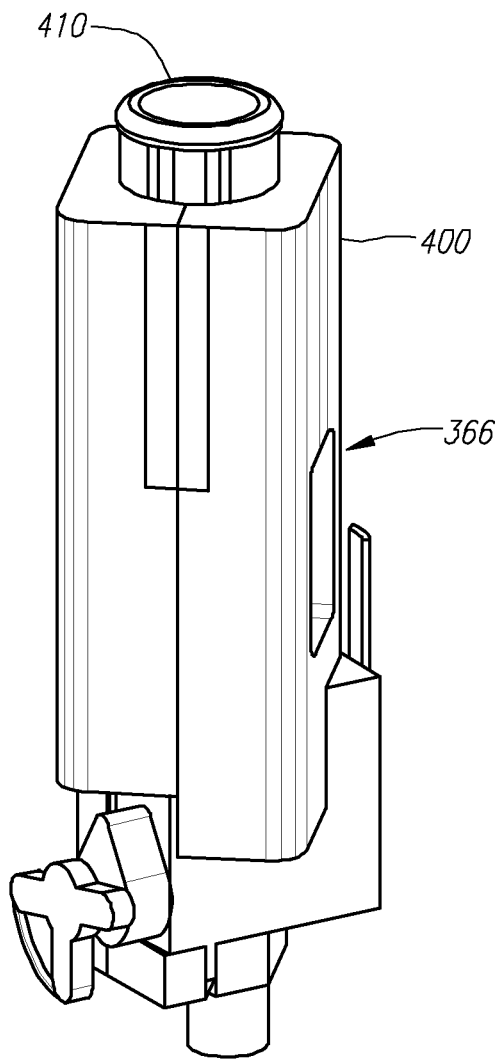
FIG. 14B is an exemplary detail drawing illustrating an embodiment of a selected electro-mechanical solenoid of FIG. 14A.

FIG. 14B shows a detail drawing of the electro-mechanical solenoid 400. In one preferred embodiment, each solenoid 400 can include at least one processing system (not shown), such as a microprocessor (IP), central processing unit (CPU), application-specific integrated circuit (ASIC), field programmable gate array (FPGA), and/or digital signal processor (DSP) of any kind. As desired, the processing system can be shared among two or more solenoids 400. The operation of the solenoids 400 thereby can be provided in a fully programmable and/or reconfigurable manner.

Figure 15A:
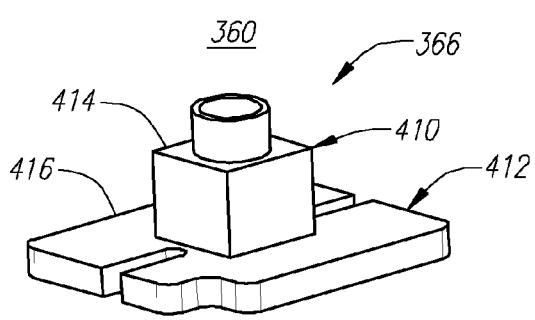
FIGS. 15A-K are exemplary detail drawings illustrating one embodiment of a method for manufacturing the user interface system of FIGS. 14A-B.
Figure 15B:
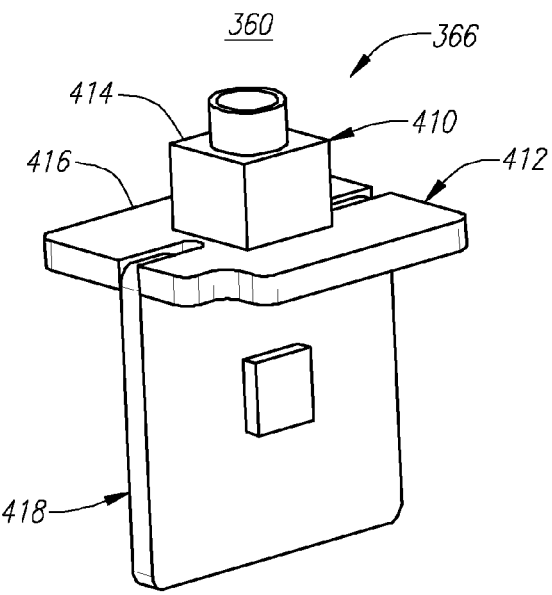

The user interface system 360 of FIGS. 14A-B can be provided (or manufactured) in any conventional manner. One exemplary manner for manufacturing the user interface system 360 of FIGS. 14A-B is illustrated with reference to FIGS. 15A-K. Turning to FIG. 15A, a cap assembly 412 for the cap 410 is shown as including an illuminated capacitive touch sensor 414. The capacitive touch sensor 414 can be provided in any suitable manner and, as shown in FIG. 15A, can be disposed on a printed circuit board (or PCB) 416. The printed circuit board 416 can be coupled with a second printed circuit board (or PCB) 418 as illustrated in FIG. 15B. The printed circuit boards 416, 418 can be coupled in any conventional manner, such as by soldering, such that the coupled printed circuit boards 416, 418 can support functionality for the illuminated capacitive touch sensor 414. As illustrated in FIG. 15B, the second printed circuit board 418 is disposed in a perpendicular orientation relative to the printed circuit board 416 such that the printed circuit boards 416, 418 can form a T-shaped assembly.

Figure 15C:
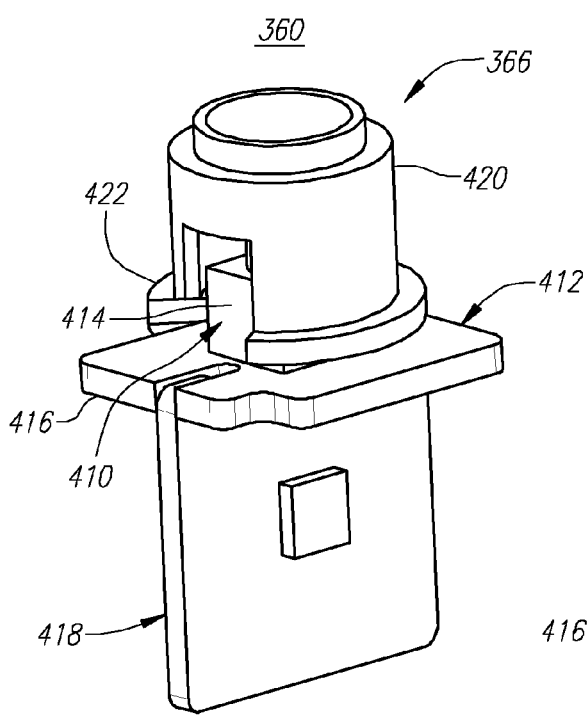
Figure 15D:
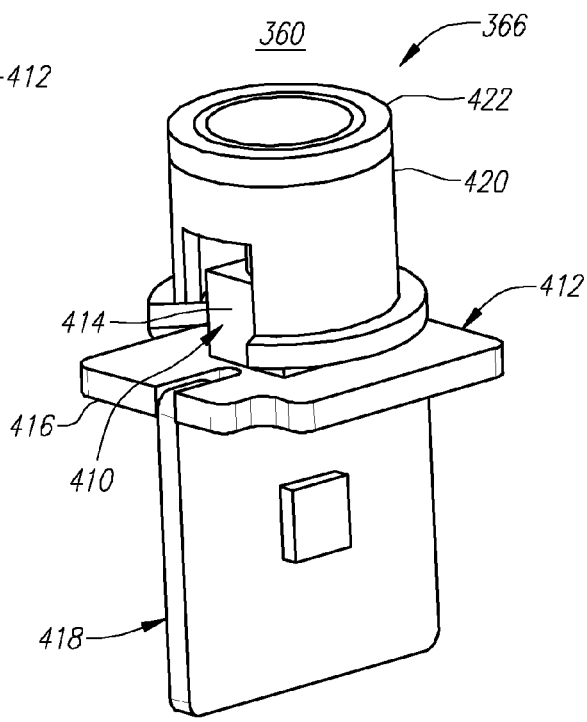

FIG. 15C shows that the capacitive touch sensor 414 can be disposed within a cap cover 420. The cap cover 420 can be formed from any suitable translucent material and defines an internal channel 22 for receiving the capacitive touch sensor 414. The translucent material enables light emitted from the capacitive touch sensor 414, when illuminated, to pass through the cap cover 420. The cap cover 420 optionally can be provided with a predetermined color selected from a plurality of colors and/or can provide control indicia, such as a function icon 367 (shown in FIG. 6B), that represents a preselected control function associated with the selected interface element 366 when the selected interface element 366 is activated. The light emitted from the capacitive touch sensor 414 thereby can be presented with the predetermined color. In one embodiment, a conductive ring 422 can be disposed about a periphery of the cap cover 420 as shown in FIG. 15D. The conductive ring 422 can be formed from any suitable conductive material, such as copper or any other metal. The conductive ring 422 preferably is in electrical communication with at least one of the printed circuit boards 416, 418.

Figure 15E:
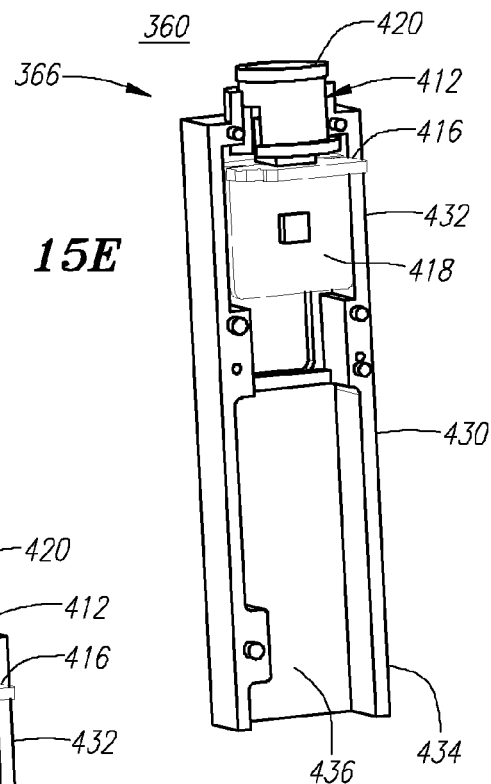
Figure 15F:
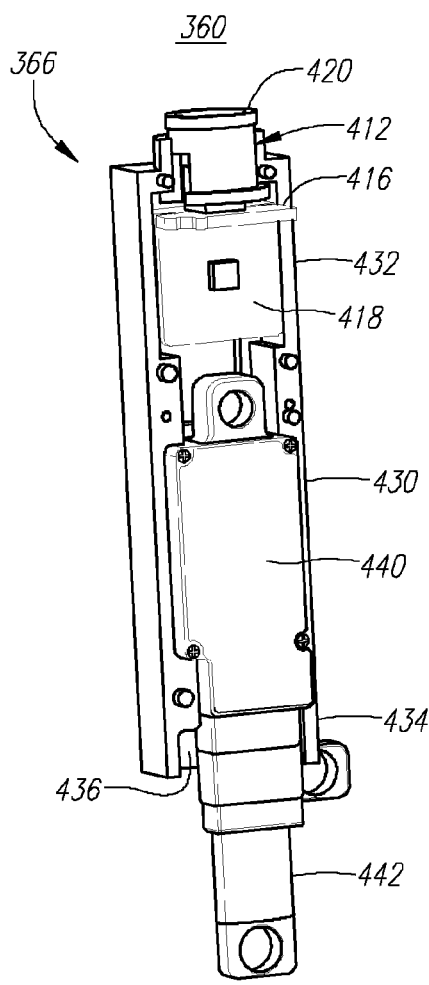
Figure 15G:
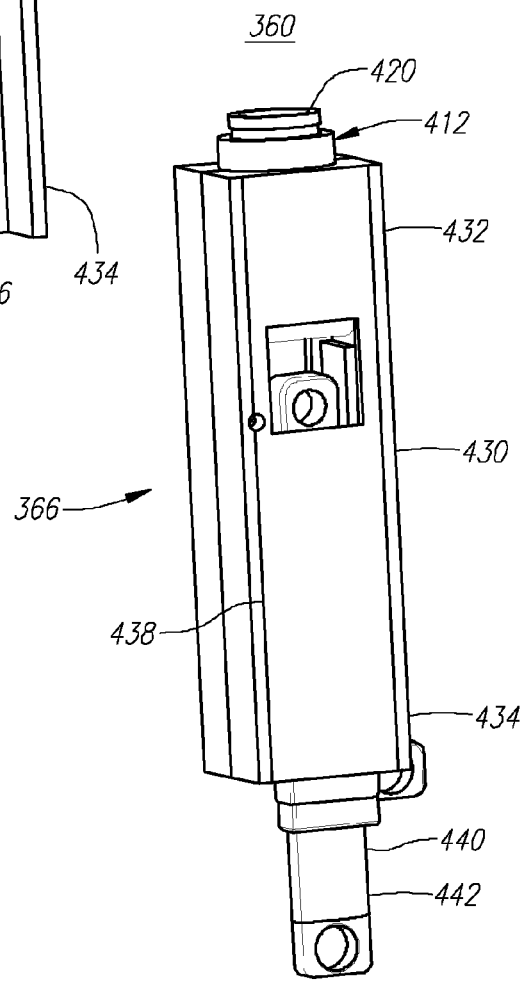

A slider module 430 is shown in FIG. 15E. The slider module 430 of FIG. 15E includes opposite end regions 432, 434 and defines a central channel 436. The opposite end regions 432, 434 can communicate via the central channel 436. The central channel 436 adjacent to the end region 432 can be adapted to receive the cap assembly 412 such that the printed circuit boards 416, 418 are disposed within the central channel 436 and the cap cover 420 extends from the end region 432 of the slider module 430 as illustrated in FIG. 15E. As shown in FIG. 15F, the central channel 436 adjacent to the end region 434 can be adapted to receive an actuator assembly 440. When the actuator assembly 440 is properly disposed within the central channel 436, a control interface 442 of the actuator assembly 440 can extend from the end region 434 of the slider module 430. FIG. 15G shows that a module cover plate 438 optionally can be coupled with the slider module 430 to enclose the cap assembly 412 and the actuator assembly 440 within the slider module 430, forming an interface element 366.

Figure 15H:
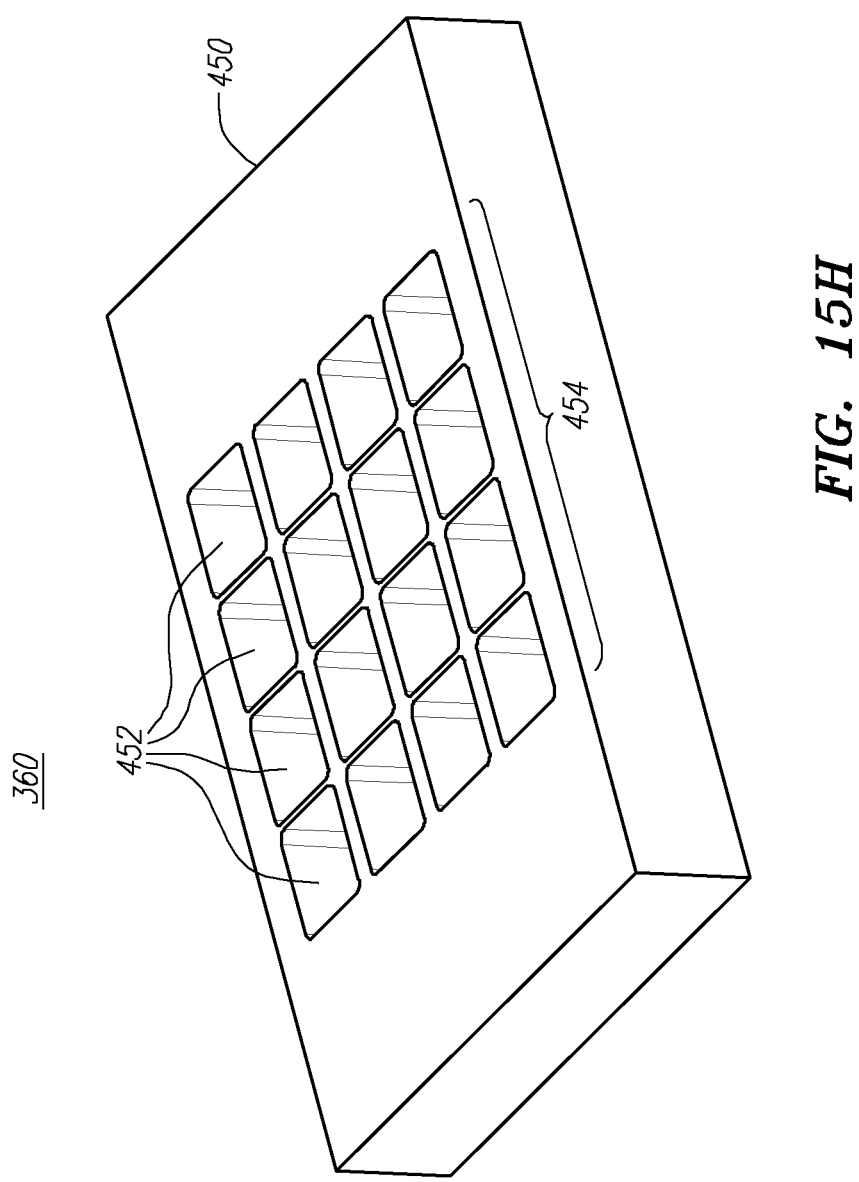
Figure 15I:
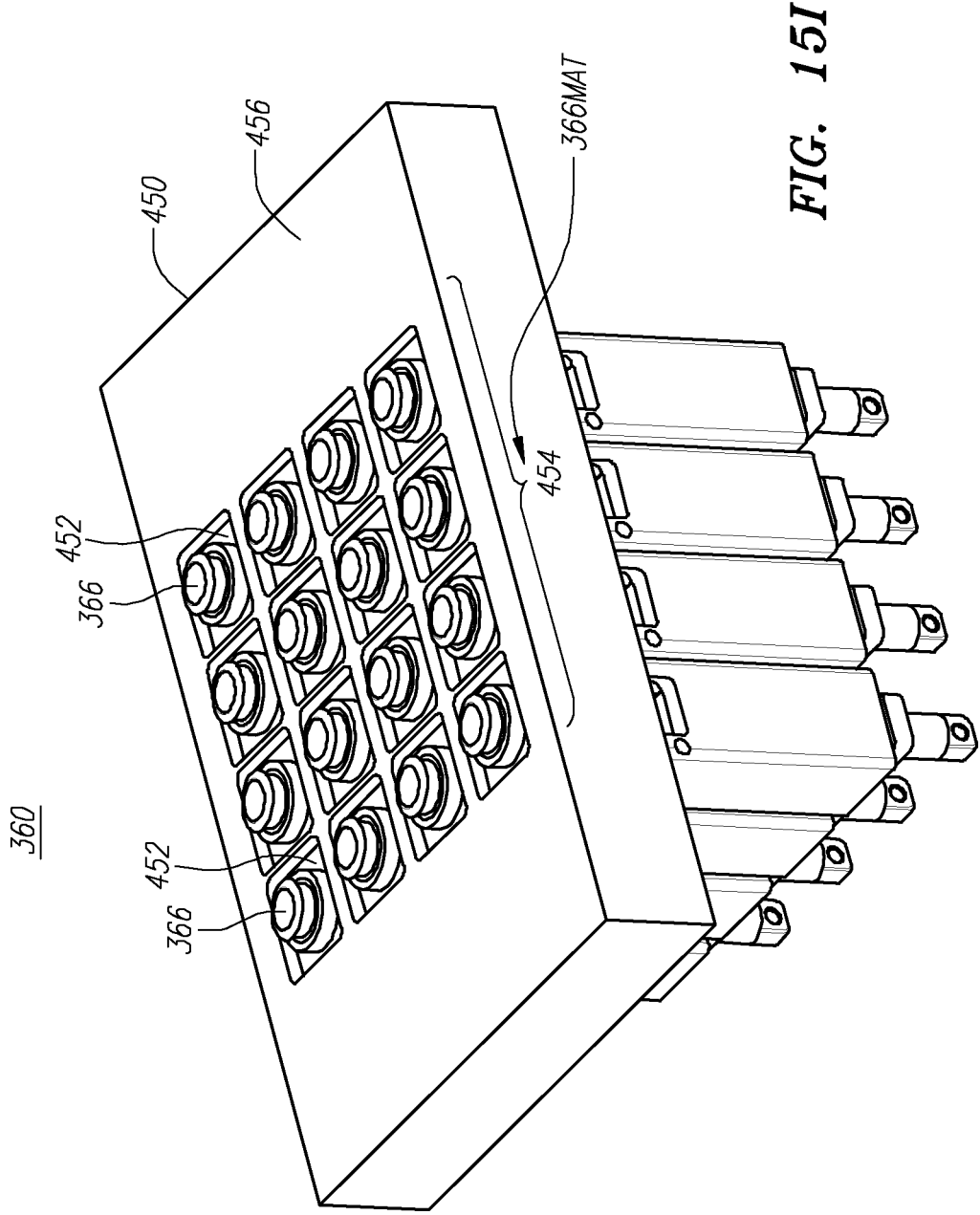

Turning to FIG. 15H, a rack assembly 450 for the user interface system 360 is shown as having a predetermined region 454 that defines a plurality of openings 452 for receiving a plurality of interface elements 366 (shown in FIG. 15G). The plurality of openings 452 preferably are provided in an array (or matrix) arrangement, such as the array (or matrix) arrangement 366MAT (shown in FIGS. 4A-F). The size, number of openings 452, the spacing between adjacent openings 452, the orientation of the openings 452 relative to a predetermined axis of the rack assembly 450, and/or other characteristics of the predetermined region 454 can be provided in the manner discussed above with reference to the array arrangement 366MAT. As shown in FIG. 15I, an interface element 366 of FIG. 15G can be disposed within one or more of the openings 452 defined by the rack assembly 450, forming the array arrangement 366MAT of interface elements 366 set forth in more detail above with reference to FIGS. 4A-E.

Figure 15J:
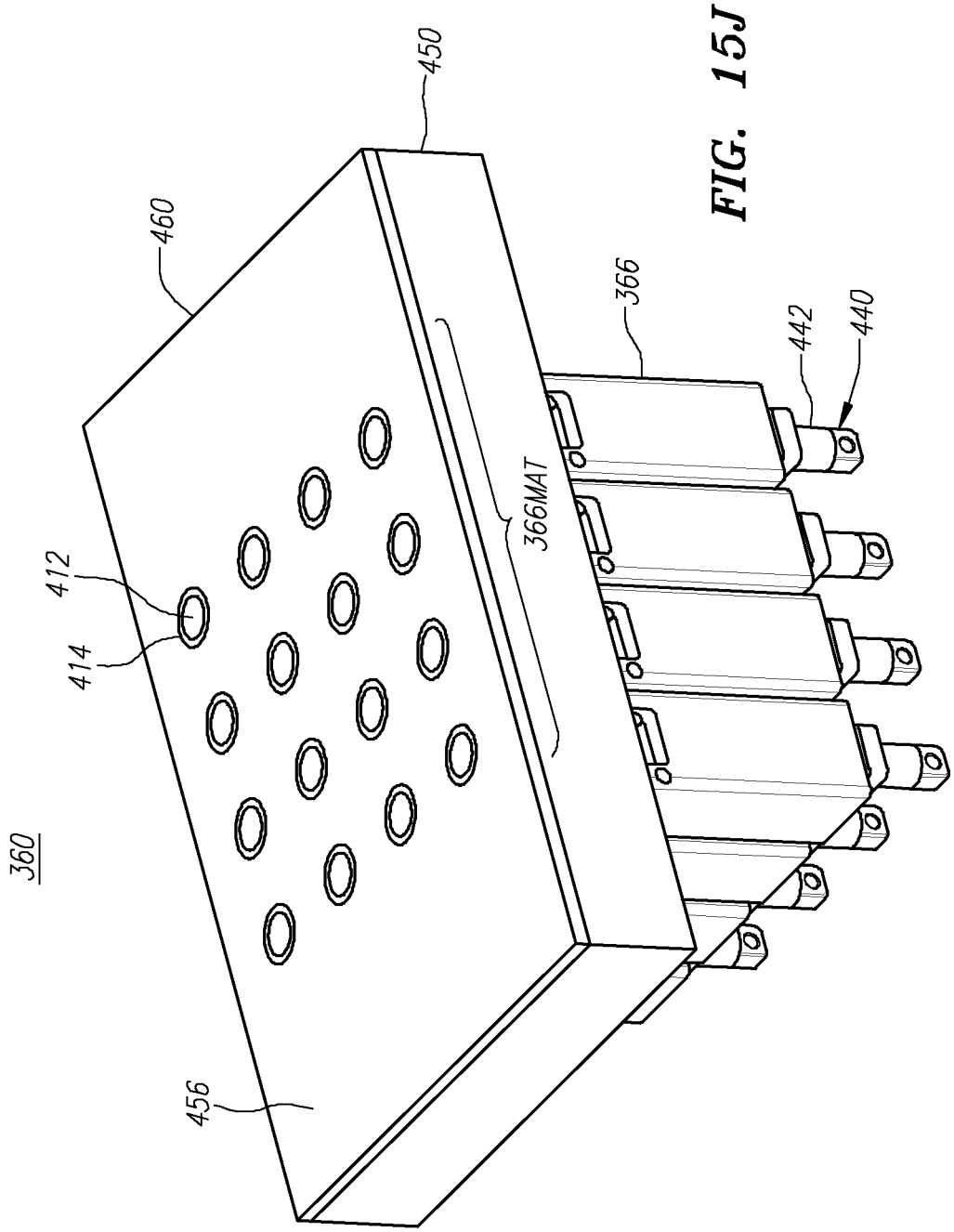

The rack assembly 450 preferably is formed from a metal or other conductive material to limit any possible electrical interference among the installed interface elements 366. The capacitive touch sensors 414 of the installed interface elements 366 are shown as being positioned adjacent to (and/or flushly aligned with) an interface surface 456 of the rack assembly 450. To help protect the capacitive touch sensors 414, an optional protective cover (and/or coating) 460 can be applied to an interface surface 456 of the rack assembly 450 as illustrated in FIG. 15J. The protective cover 460 preferably is formed from a material, such as plastic, that does not adversely affect the functionality of the capacitive touch sensors 414.

Figure 15K:
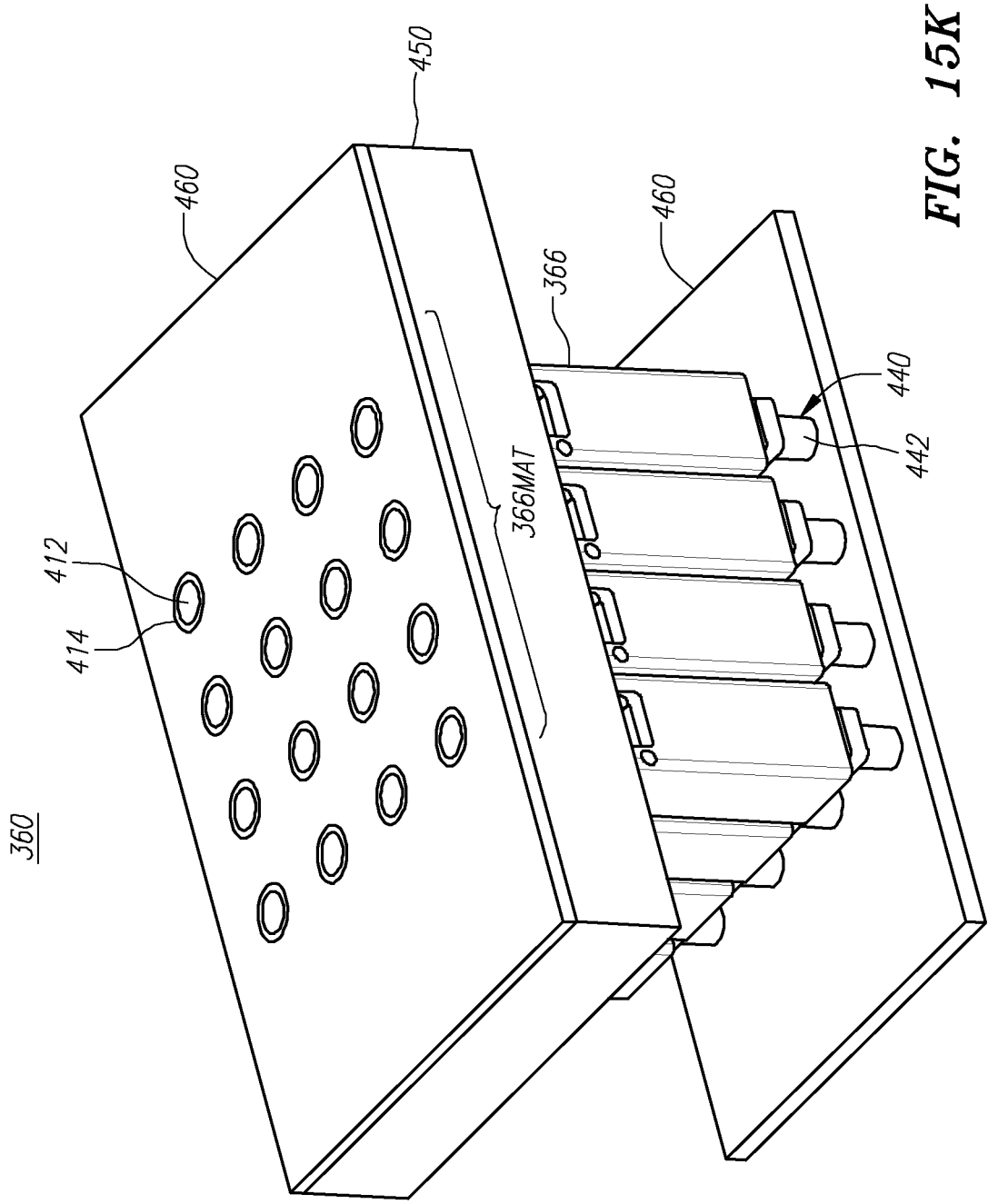

The rack assembly 450 with the installed interface elements 366 can be disposed on a base structure 460 as shown in FIG. 15K. In other words, the rack assembly 450 can be coupled with the base structure 460. As illustrated in FIG. 15K, the control interface 442 of the actuator assembly 440 for each installed interface element 366 communicates with the base structure 460. The actuator assemblies 440 of selected installed interface elements 366, upon the user interface system 360 becoming apparent, can be activated to extend by a predetermined distance. In one embodiment, one or more of the activated actuator assemblies 440 can extend to a full length of the activated actuator assemblies 440. Other activated actuator assemblies 440 can extend to a predetermined percentage of the full length. The capacitive touch sensors 414 of the apparent interface elements 366 thereby can extend from the rack assembly 450 by the predetermined distance, such as the predetermined distance set forth above with reference to FIGS. 2A-B.

Alternatively, and/or additionally, one or more of the interface elements 366 of the user interface system 360 can be provided as virtual control elements. The user interface system 360 can be disposed at the user chair 382 in any of the manner(s) described above such that, when a user hand approaches, and becomes proximate to, the user interface system 360, selected interface elements 366 of the user interface system 360 can become apparent (or otherwise emphasized). In one embodiment, the interface elements 366 can be projected onto one or more selected locations of the user chair 382.

Figure 16A:
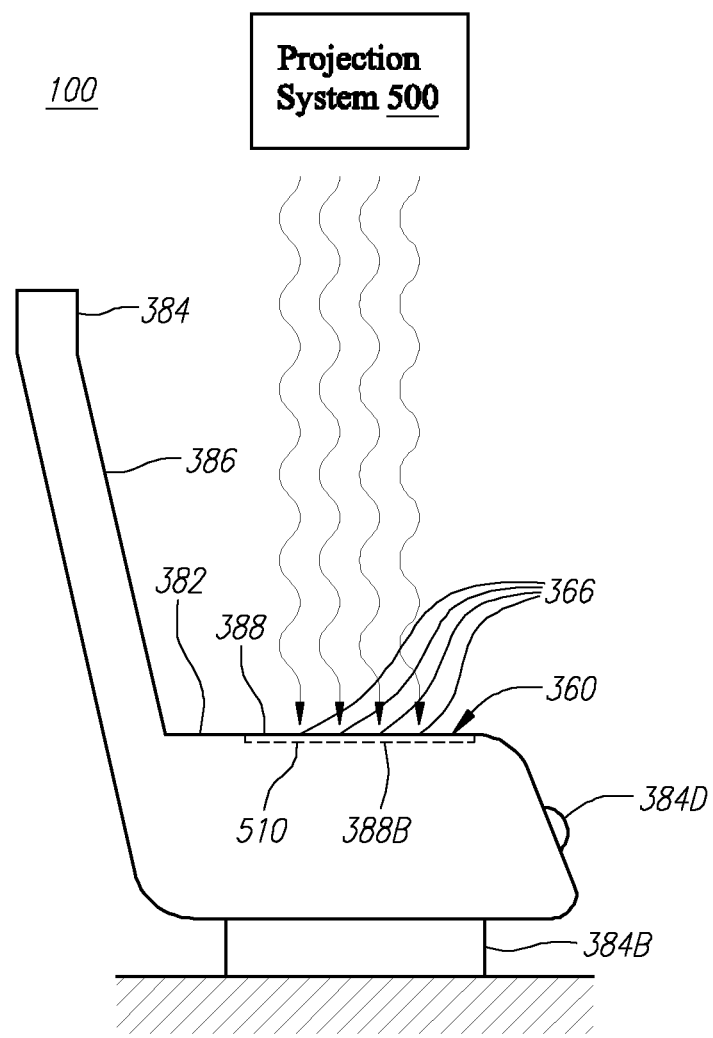
FIG. 16A is an exemplary top-level drawing illustrating another alternative embodiment of the user chair of FIG. 1, wherein the user interface system is projected onto the armrest of the user chair.

The operating environment of the information system 100, for example, can include a projection system 500, such as a pico projection system, for projecting the interface elements 366 onto the selected locations of the user chair 382 as illustrated in FIG. 16A. The interface elements 366 thereby can be presented as virtual control elements at the selected locations of the user chair 382. Exemplary selected locations upon which the virtual control elements can be projected include, but are not limited to, a selected armrest 388, both armrests 388, and/or a tray table provided at the chair back 386 (shown in FIG. 1) and/or the selected armrest 388. As desired, the projection system 500 can include a projector for projecting selected interface elements 366 onto multiple locations of the user chair 382 and/or a plurality of projectors for projecting the selected interface elements 366 onto respective locations of the user chair 382. A selected location of the user chair 382 may be associated with one or more of the projectors.

The projection system 500 can be disposed at the user chair 382 and/or at a wall, a floor, a ceiling, an adjacent user chair, and/or any other suitable location within the operating environment such that the projection system 500 can project the interface elements 366 onto the selected locations of the user chair 382. Exemplary projection systems and mounting locations for the projection systems are set forth in the above-referenced co-pending U.S. patent application, entitled "SYSTEM AND METHOD FOR INTERACTING WITH INFORMATION SYSTEMS," Ser. No. 12/897,589, filed on Oct. 4, 2010, which is assigned to the assignee of the present application and the disclosure of which is hereby incorporated herein by reference in its entirety and for all purposes.

Turning to FIG. 16A, for example, the projection system 500 is illustrated as projecting a plurality of interface elements 366 onto a selected armrest 388 of the user chair 382. The selected armrest 388 can include an armrest covering 388B, and the projection system 500 can project the interface elements 366 onto the armrest covering 388B of the selected armrest 388. In the manner discussed above with reference to FIGS. 2A-B, the armrest covering 388B can comprise a region (and/or surface) of the armrest 388 upon which the user can rest an arm when seated in the user chair 382. The armrest covering 388B preferably is provided in a manner that enables (and/or facilitates) presentation of the interface elements 366 as virtual control elements. The material forming the armrest covering 388B can be the same as, or different from, material covering other chair components of the user chair 382.

The projection system 500 optionally can project viewing content 210 (shown in FIGS. 22A-B) onto the selected armrest 388 and/or any other location at (and/or external to) the user chair 382. Thereby, the projected viewing content 210 can be presented in the manner set forth above with reference to the video interface system 362 (shown in FIG. 6A), the touch display system 200' (shown in FIGS. 22A-B), and/or the personal media device 200 (shown in FIG. 26B). The projection system 500, for example, can project the viewing content 210 onto a book or other item provided by the user. If used in conjunction with one or more of the video interface system 362, the touch display system 200', and/or the personal media device 200, the projection of the viewing content 210 advantageously can enable the user to multitask in the manner set forth herein with reference to FIG. 22B.

In one embodiment, the armrest 388 of the user chair 382 can include a proximity sensor (not shown) and/or a touch film interface system (or layer) 510, such as a capacitive sensor system, in the manner set forth above with reference to FIG. 3. The touch film interface system 510, for example, can form the armrest covering 388B. Alternatively, the armrest covering 388B can cover the touch film interface system 510 such that the touch film interface system 510 is disposed within the armrest 388 and thereby obscured by the armrest covering 388B. The touch film interface system 510 can be formed, bonded, adhered, or otherwise affixed at the selected armrest 388. Although the touch film interface system 510 can be provided with any predetermined dimensions, the touch film interface system 510 preferably conforms with a geometry of the selected armrest 388 and/or is provided with predetermined dimensions suitable for providing the interface elements 366 of the user interface system 360.

The projection system 500, in operation, can be adapted to project the interface elements 366 of the user interface system 360 onto the armrest covering 388B (and/or the touch film interface system 510) of the selected armrest 388 when a user hand approaches, and becomes proximate to, the armrest covering 388B. In other words, when the user is distal from the user interface system 360, the projection system 500 does not project the interface elements 366 onto the armrest covering 388B. The user interface system 360 thereby can be obscured from view (or otherwise de-emphasized), and/or the user chair 382 can appear to be an ordinary chair when the user interface system 360 is not in use in the manner discussed above. When the user wishes to utilize the user interface system 360, the projection system 500 can project one or more interface elements 366 of the user interface system 360 onto the armrest covering 388B. The user interface system 360 thereby can become apparent (or otherwise emphasized) at the user chair 382.

The projected interface elements 366 can be mapped to corresponding regions of the armrest covering 388B. In other words, each projected interface element 366 can be associated with a selected region of the armrest covering 388B. Thereby, when a user hand is adjacent to the selected region of the armrest covering 388B, the touch film interface system 510 senses the user hand such that the user can manipulate the associated projected interface element 366 to interact with the system resource(s) 110 (shown in FIG. 1) (and/or the associated resource function(s)) available by way of the information system 100. In the manner set forth above, the projected interface elements 366 can be presented in any conventional manner, such as via one or more conventional pushbuttons. The touch film interface system 510 advantageously can detect an approach of the user hand prior to actual contact with the projected interface elements 366. Use of the touch film interface system 510 can enable the user interface system 360 to be actuated prior to actual contact with projected interface elements 366.

In the manner discussed above with reference to the user interface system 360 (shown in FIGS. 2A-B), the user interface system 360 can be projected with any characteristics, such as size (and/or dimension) and/or shape (and/or geometry). The interface elements 366 likewise can be projected with any suitable characteristics. Exemplary characteristics of the interface elements 366 include a quantity, size, shape, spacing, and/or arrangement of the interface elements 366.

The characteristics of the user interface system 360 and/or the interface elements 366 preferably are based upon at least the location of the user chair 382 at which the user interface system 360 is projected, a size and/or shape of the location, and/or the type(s) of control interfaces suitable for interacting with the system resource(s) 110 (and/or the associated resource function(s)) available by way of the information system 100. The projector system 500 preferably can project one or more of the user interface systems 360 shown and described with reference to FIGS. 2-13 onto the user chair 382. In one embodiment, the projected user interface system 360 can comprise a conventional keyboard system, such as a QWERTY keyboard, telephone keyboard, a calculator keyboard, etc., without limitation. The size (and/or dimension) of the keyboard system can be based at least in part upon the size (and/or dimension) of the chair location upon which the keyboard system is projected.

Figure 16B:
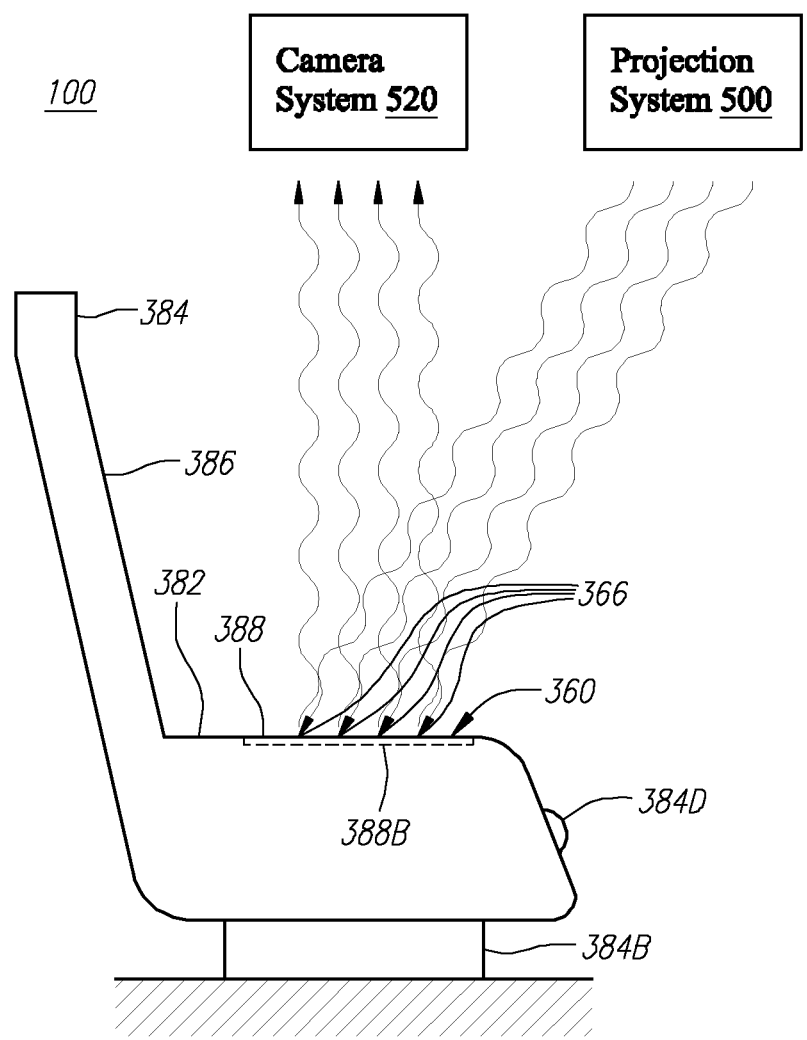
FIG. 16B is an exemplary top-level drawing illustrating an alternative embodiment of the user chair of FIG. 16B, wherein a camera system detects user interaction with the user interface system.

Additionally, and/or alternatively, the operating environment of the information system 100 can include a projection system 500 and a camera system 520 as shown in FIG. 16B. Turning to FIG. 16B, the projection system 500 can be provided in the manner set forth above with reference to the projection system 500 (shown in FIG. 16A) and can project the user interface system 360 onto one or more locations, such as a selected armrest 388, of the user chair 382. The camera system 520 can detect the presence of the user and/or user interaction with the user interface system 360. Thereby, the user chair 382 advantageously can require no special accommodation in order to provide the user interface system 360. The user chair 382 preferably provides the armrest covering 388B in a manner that enables (and/or facilitates) presentation of the interface elements 366 as virtual control elements as set forth above. The projection system 500 optionally can project the user interface system 360 onto any surface, including surfaces external to the user chair 382. The user interface system 360, for example, can be projected onto a book or other item provided by the user.

In the manner discussed above with reference to the projection system 500 (shown in FIG. 16A), the projection system 500 can be adapted to project the interface elements 366 of the user interface system 360 onto the armrest covering 388B of the selected armrest 388 when a user hand approaches, and becomes proximate to, the armrest covering 388B. In other words, when the user is distal from the user interface system 360, the projection system 500 does not project the interface elements 366 onto the armrest covering 388B. The user interface system 360 can be obscured from view (or otherwise de-emphasized), and/or the user chair 382 can appear to be an ordinary chair when the user interface system 360 is not in use. When the user wishes to utilize the user interface system 360, the projection system 500 can project one or more interface elements 366 of the user interface system 360 onto the armrest covering 388B. The user interface system 360 thereby can become apparent (or otherwise emphasized) at the user chair 382.

The camera system 520 can include a camera for detecting the presence of the user and/or user interaction with selected interface elements 366 at multiple locations of the user chair 382 and/or a plurality of cameras for detecting the user interaction with selected interface elements 366 at respective locations of the user chair 382. A selected location of the user chair 382 may be associated with one or more of the cameras. The camera system 520 can be mounted in the same manner as set forth above for mounting the projection system 500. The camera system 520, for example, can be disposed at the user chair 382 and/or at a wall, a floor, a ceiling, an adjacent user chair, and/or any other suitable location within the operating environment such that the camera system 520 can detect the presence of the user and/or user interaction with the interface elements 366 at the selected locations of the user chair 382.

The projected interface elements 366 can be mapped to corresponding regions of the armrest covering 388B. In other words, each projected interface element 366 can be associated with a selected region of the armrest covering 388B. Thereby, when a user hand is adjacent to the selected region of the armrest covering 388B, the camera system 520 detects the user hand such that the user can manipulate the associated projected interface element 366 to interact with the system resource(s) 110 (shown in FIG. 1) (and/or the associated resource function(s)) available by way of the information system 100. In the manner set forth above, the projected interface elements 366 can be presented in any conventional manner, such as via one or more conventional pushbuttons. The camera system 520 optionally can detect an approach of the user hand prior to actual contact with the projected interface elements 366. Stated somewhat differently, the camera system 520 can enable the user interface system 360 to be actuated prior to actual contact with projected interface elements 366.

Advantageously, the user interface system 360 can be provided at the user chair 382 in a dynamic manner. In other words, the selection of interface elements 366 that can become apparent (or otherwise emphasized) when the user approaches, and becomes proximate to, the user interface system 360 can change in response to selected stimuli. Turning to FIG. 17A, for example, the user interface system 360 of FIGS. 4A-B is shown as comprising a matrix 366MAT of interface elements 366. In the manner set forth above with reference to the matrix 366MAT (shown in FIGS. 4A-F and FIG. 5A), the matrix 366MAT can define a rectangular grid 366GRD of selected interface elements 366 that can become apparent as emphasized interface elements 366APP when the hand of the user approaches, and becomes proximate to, the user interface system 360. A first set of the emphasized interface elements 366APP is illustrated as being provided as boundary interface elements 366BND for defining a boundary that at least partially surrounds a second set of the emphasized interface elements 366APP.

If one or more of the emphasized interface elements 366APP associated with the rectangular grid 366GRD becomes unavailable, the user interface system 360 can dynamically adjust a position of the rectangular grid 366GRD within the matrix 366MAT in an effort to avoid the unavailable emphasized interface elements 366APP. An unavailable emphasized interface element 366APP can become unavailable for any number of reasons. The unavailable emphasized interface element 366APP, for example, can become unavailable by entering a failure mode.

Figure 17B:
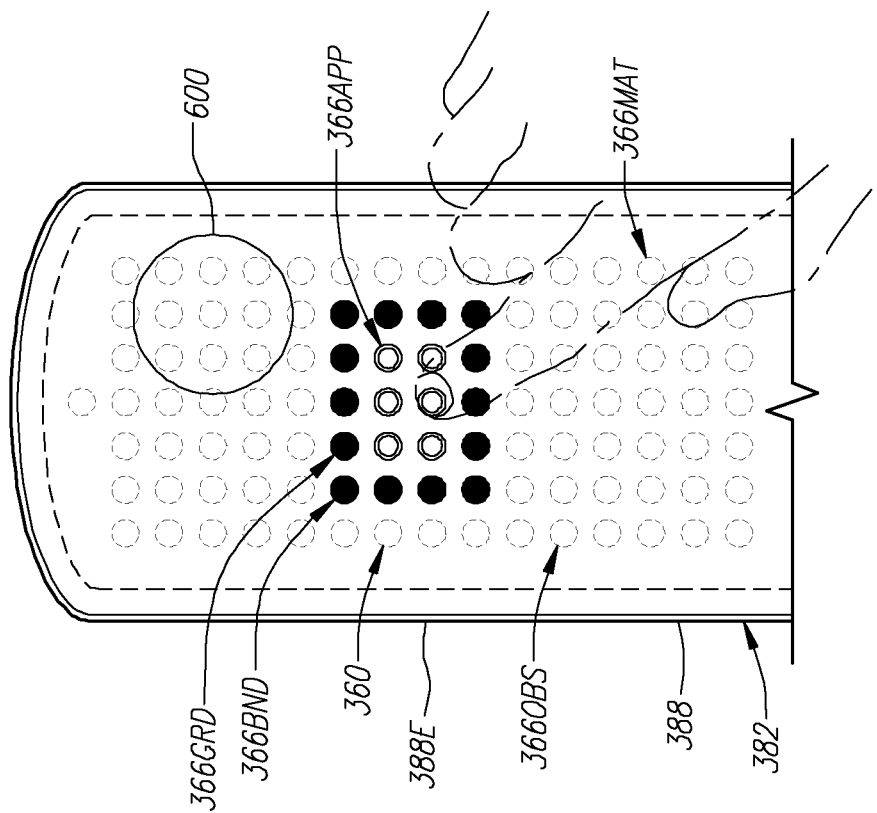
FIGS. 17A-B are exemplary detail drawings illustrating another alternative embodiment of the user chair of FIG. 1, wherein the user interface system can be provided at the user chair in a dynamic manner.
Figure 17A:
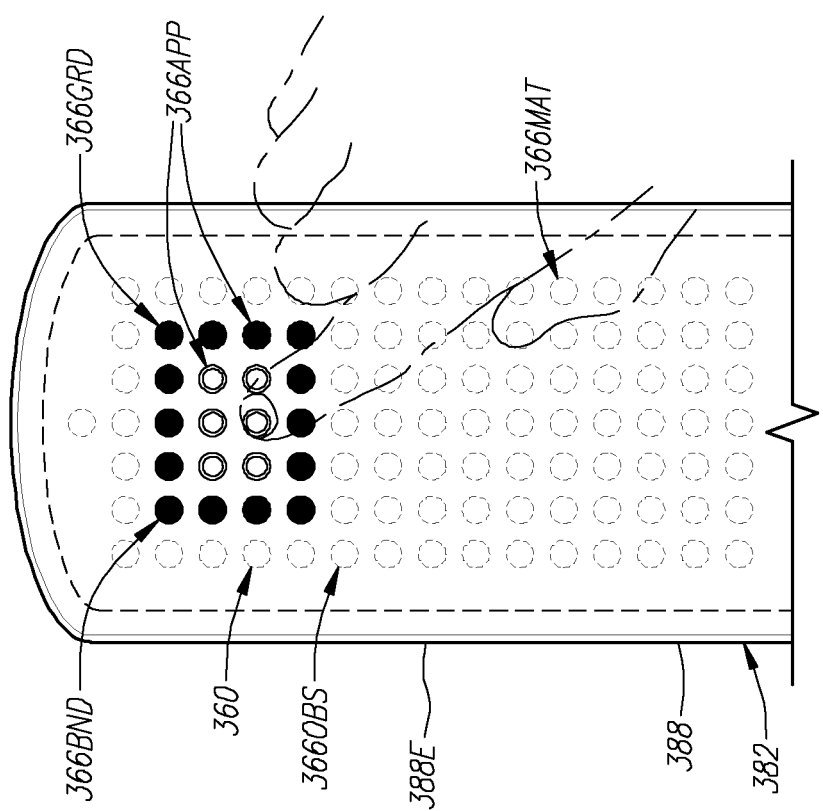

As illustrated in FIG. 17B, the unavailable emphasized interface elements 366APP are shown as being obstructed by a foreign object 600, such as a beverage container, being placed on the selected armrest 388. The user interface system 360 is shown as adjusting the position of the rectangular grid 366GRD to other interface elements 366 within the matrix 366MAT in an effort to avoid use of the unavailable interface elements 366 obstructed by the foreign object 600. Although shown as comprising a one-dimensional translation for purposes of illustration only, the user interface system 360 can dynamically adjust the position of the rectangular grid 366GRD within the matrix 366MAT in any conventional manner, including a translation in more than one dimension and/or a rotation. In one embodiment, the rectangular grid 366GRD can be provided at a user interface system 360 disposed at an alternative location of the user chair 382. Additionally, and/or alternatively, the rectangular grid 366GRD can be returned to its original position on the matrix 366MAT if the unavailable emphasized interface element 366APP again become available.

In one embodiment, the position of the rectangular grid 366GRD can be established by the user. The user, for example, can establish the position of the rectangular grid 366GRD by manipulating a selected interface element 366 within the matrix 366MAT. The user interface system can identify the selected interface element 366 as being a fiducial as a basis for establishing the position of the rectangular grid 366GRD. The selected interface element 366, for example, can provide a center point for the rectangular grid 366GRD such that the rectangular grid 366GRD is formed via one or more interface elements 366 disposed around the selected interface element 366.

As set forth above, the user interface system 360 disclosed herein can be utilized in a wide range of system applications. FIGS. 18A-B illustrate another alternative embodiment of the user chair of FIG. 1, wherein a user interface system 360 can provide a chair control interface for controlling one or more chair features of the user chair 382 can be disposed at any suitable location of the user chair 382. Exemplary chair features that can be controlled via the user interface system can include a footrest adjustment, lumbar support adjustment, (manual and/or powered) chair position adjustment, in-chair massage control, in-chair temperature control, and/or other conventional chair features without limitation. Typical chair position adjustments can include an adjustable headrest, armrest, footrest, lumbar support, chair back angle, forward/backward/lateral chair position, upward/downward chair elevation, and/or chair swivel, without limitation.

Turning to FIG. 18A, for example, the user interface system 360 is shown as being provided at a selected armrest 388. The user interface system 360 is shown as including four interface elements 366R-U that are associated with respective exemplary chair features of the user chair 382. The interface element 366R can be associated with a selected chair communication function, such as a selected passenger support service (PSS) function, such as an attendant call function, if the user chair 382 is disposed aboard a passenger vehicle 390 (shown in FIGS. 24A-B). The interface element 366S is shown as being associated with a chair light control function, such as chair light on/off control; whereas, the interface element 366T can be associated with a chair audio volume control function. The interface element 366U can be associated with a chair position adjustment control function such as for controlling a chair back angle (and/or recline) function for the user chair 382.

The interface elements 366R-U of the user interface system 360 can be provided as de-emphasized interface elements 366OBS when the user is distal from the user interface system 360. When the user hand approaches, and becomes proximate to, the user interface system 360, the interface elements 366R-U can become emphasized interface elements 366APP as shown in FIG. 18B in the manner discussed above. The interface elements 366R-U, upon becoming apparent, can be manipulated for controlling the respective chair feature functions and can become observably emphasized at the selected armrest 388 in the manner discussed above with reference to FIGS. 2A-B.

As illustrated in FIG. 18B, for example, the interface elements 366R-U can become observably emphasized by presenting associated function icons 367R-U. The user interface system 360 advantageously enables the user to control selected chair feature functions. Although shown and described as comprising a particular arrangement of four interface elements 366R-U that control selected chair feature functions and that are disposed at the selected armrest 388 for purposes of illustration only, the user interface system 360 can comprise any preselected number and/or arrangement of interface elements 366 for controlling any conventional chair function(s) and can be disposed at any suitable location of the user chair 382 as desired.

Figure 19B:
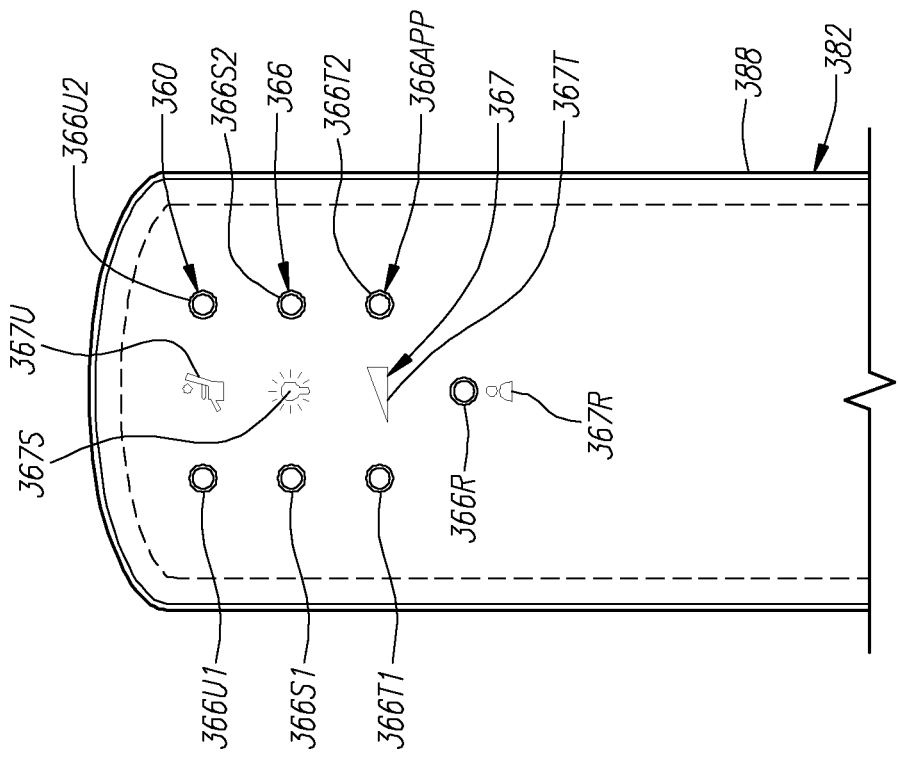
FIGS. 19A-B are exemplary detail drawings illustrating an alternative embodiment of the user interface system of FIGS. 18A-B.
Figure 19A:
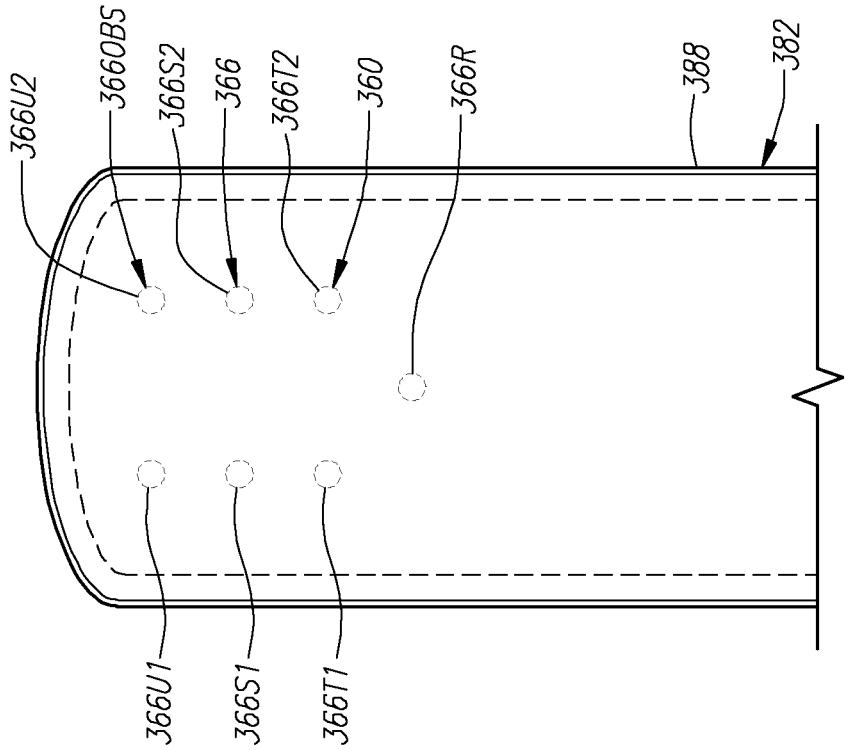

An alternative user interface system 360 for controlling the selected chair functions is shown in FIGS. 19A-B. Turning to FIG. 19A, the user interface system 360 is shown as being provided at the selected armrest 388 and as including seven interface elements 366R, 366S1/2, 366T1/2, 366U1/2 that are associated with respective exemplary chair features of the user chair 382. In the manner discussed above with reference to FIGS. 18A-B, the interface element 366R can be associated with a selected chair communication function. The other exemplary chair features advantageously can be controlled by respective pairs of interface elements 366S1/2, 366T1/2, and 366U1/2. Stated somewhat differently, the interface elements interface elements 366R, 366S1/2, 366T1/2, 366U1/2 can respectively provide additional control functionality over single interface elements 366S, 366T, 366U (shown in FIGS. 18A-B).

Illustrated as being associated with a chair light control function, the interface elements 366S1/2, for example, can provide incremental up/down control over chair light brightness (or intensity) in contrast to a chair light on/off control that can be provided by the interface element 366S. Alternatively, the interface element 366S1 can provide chair light on/off control; whereas, the interface element 366S2 can provide incremental up/down control over light brightness. The interface elements 366T1, 366T2 are shown as being associated with a chair audio volume control function. The interface element 366T might provide chair audio volume on/off control; whereas, the interface elements 366S1/2 can provide incremental up/down control over chair audio volume. The interface elements 366U1, 366U2 are shown as being associated with a chair position adjustment control function. If associated with a chair back angle (and/or recline) function for the user chair 382, for example, the interface elements 366U1/2 can provide incremental up/down control over chair back angle in contrast to a chair back up/down control that can be provided by the interface element 366U.

The interface elements 366R, 366S1/2, 366T1/2, 366U1/2 of the user interface system 360 can be provided as de-emphasized interface elements 366OBS when the user is distal from the user interface system 360 in the manner set forth in more detail above. When the user hand approaches, and becomes proximate to, the user interface system 360, the interface elements 366R, 366S1/2, 366T1/2, 366U1/2 can become emphasized interface elements 366APP as shown in FIG. 19B. The interface elements 366R, 366S1/2, 366T1/2, 366U1/2, upon becoming apparent, can be manipulated for controlling the respective chair feature functions and can become observably emphasized at the selected armrest 388 in the manner discussed above with reference to FIGS. 2A-B.

As illustrated in FIG. 19B, for example, the interface elements 366R, 366S1/2, 366T1/2, 366U1/2 can become observably emphasized by presenting associated function icons 367R-U. The user interface system 360 advantageously enables the user to control selected chair feature functions. Although shown and described as comprising a particular arrangement of seven interface elements 366R, 366S1/2, 366T1/2, 366U1/2 that control selected chair feature functions and that are disposed at the selected armrest 388 for purposes of illustration only, the user interface system 360 can comprise any preselected number and/or arrangement of interface elements 366 for controlling any conventional chair function(s) and can be disposed at any suitable location of the user chair 382 as desired.

FIGS. 20A-B show that the user interface system 360 can include one or more (track) touch pad systems 366TCH. Stated somewhat differently, one or more of the interface elements 366 of the user interface system 360 can be provided as a touch pad system 366TCH. Turning to FIG. 20A, the user interface system 360 is shown as being disposed at a selected armrest 388 of the user chair 382 and including a touch pad system 366TCH. The touch pad system 366TCH can be provided in any conventional manner and can be disposed adjacent to one or more other interface elements 366, such as one or more array arrangements 366MAT1, 366MAT2 of interface elements 366 as illustrated in FIG. 20A. The first and second array arrangements 366MAT1, 366MAT2 can comprise any number and/or arrangement of interface elements 366 in the manner set forth in more detail above with reference to, for example, the array arrangement 366MAT (shown in FIGS. 3 and 4A-F) of interface elements 366.

In one embodiment, one or more of the touch pad systems 366TCH can be provided as a touchscreen display system. The touchscreen display system can be provided in any conventional manner and advantageously can combine the control functionality of the touch pad system 366TCH with the video presentation functionality of the video interface system 362 (shown in FIG. 6A) and/or the touch display system 200' (shown in FIGS. 22A-B). The user interface system 360 optionally can support dragging viewing content 210 among the touchscreen display system, the video interface system 362, and/or the touch display system 200'. For example, the video interface system 362 can provide a large viewable area relative to the touch screen display system and thereby can provide "screen extension" behavior by presenting viewing content 210 dragged from the touchscreen display system. Additionally, and/or alternatively, viewing content 210, such as entertainment content, presented by the video interface system 362 can be dragged to the touchscreen display system for presentation.

The touchscreen display system advantageously can support private interactions with the system resource(s) 110 (shown in FIG. 1) (and/or the associated resource function(s)) available by way of the information system 100. Exemplary private interactions can include entry (or viewing) of personal information, credit card numbers, personal identification numbers (PINs), transaction information, or any other confidential information that the user wishes to enter (or view) in private. In one embodiment, the touchscreen display system can be removably coupled with the user seat 382 such that the touchscreen display system can be removed from the user seat 382, for instance, to take a closer look at smaller viewing content 210 and/or to facilitate game playing via the touchscreen display system. The touchscreen display system optionally can be rotatably coupled with the user seat 382 such that the touchscreen display system can be rotated to a suitable angle relative to the user chair 382 to facilitate use of the touchscreen display system. If the touchscreen display system presents a conventional keyboard system, for example, the touchscreen display system can be rotated to enable the keyboard system to be presented in a manner to facilitate typing.

The touch pad system 366TCH and any other interface elements 366 of the user interface system 360 can be provided as de-emphasized interface elements 366OBS when the user is distal from the user interface system 360 in the manner set forth in more detail above. When the user hand approaches, and becomes proximate to, the user interface system 360, the touch pad system 366TCH and any other interface elements 366 can become emphasized interface elements 366APP as shown in FIG. 20B. The touch pad system 366TCH and any other interface elements 366, upon becoming apparent, can become observably emphasized and can be manipulated for interacting with the system resource(s) 110 (shown in FIG. 1) (and/or the associated resource function(s)) available by way of the information system 100 in the manner set forth above.

Figure 21A:
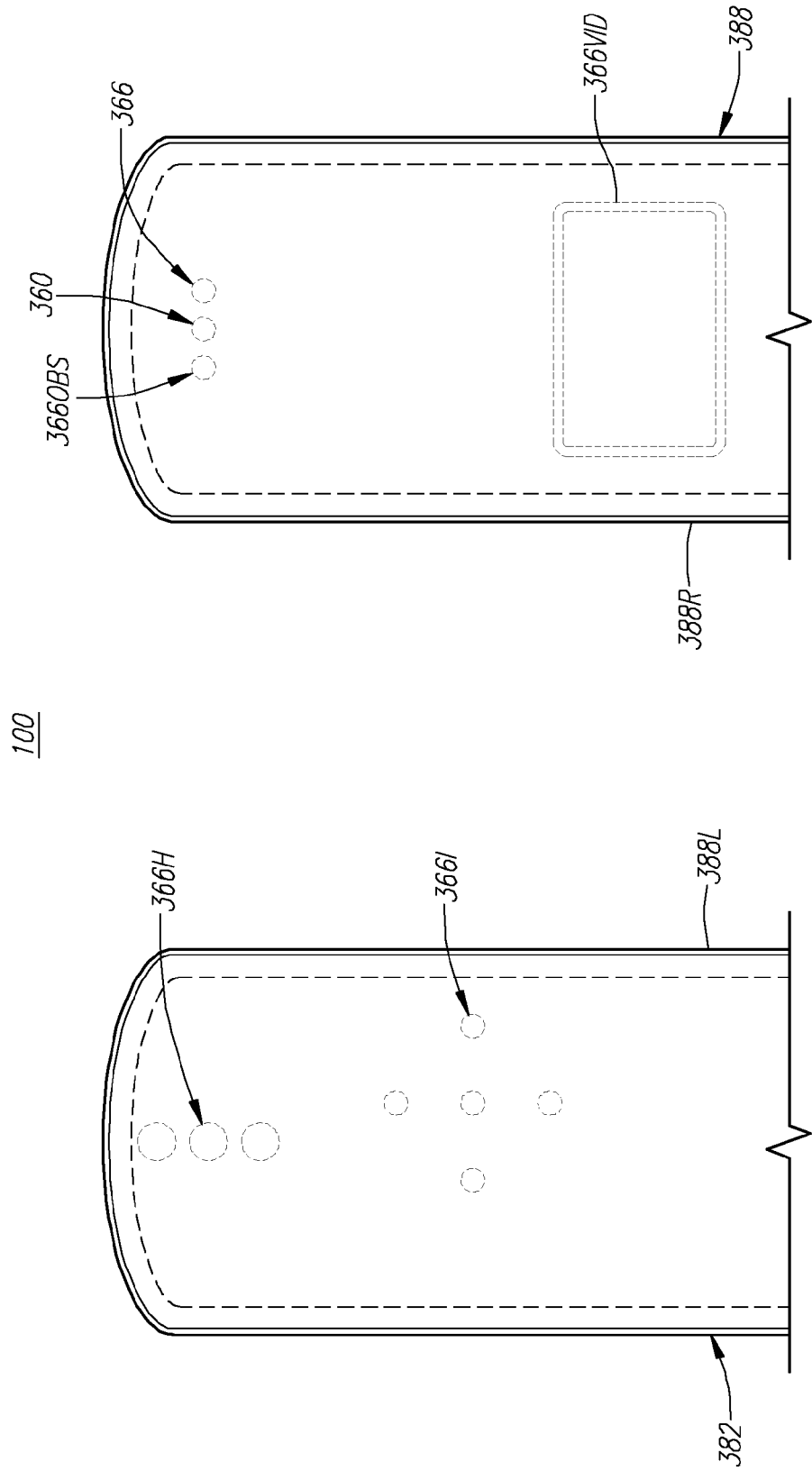
FIGS. 21A-B are exemplary detail drawings illustrating another alternative embodiment of the user chair of FIG. 3, wherein the user interface system is disposed at a left armrest of the user chair is different from the user interface system is disposed at a right armrest of the user chair.
Figure 21B:
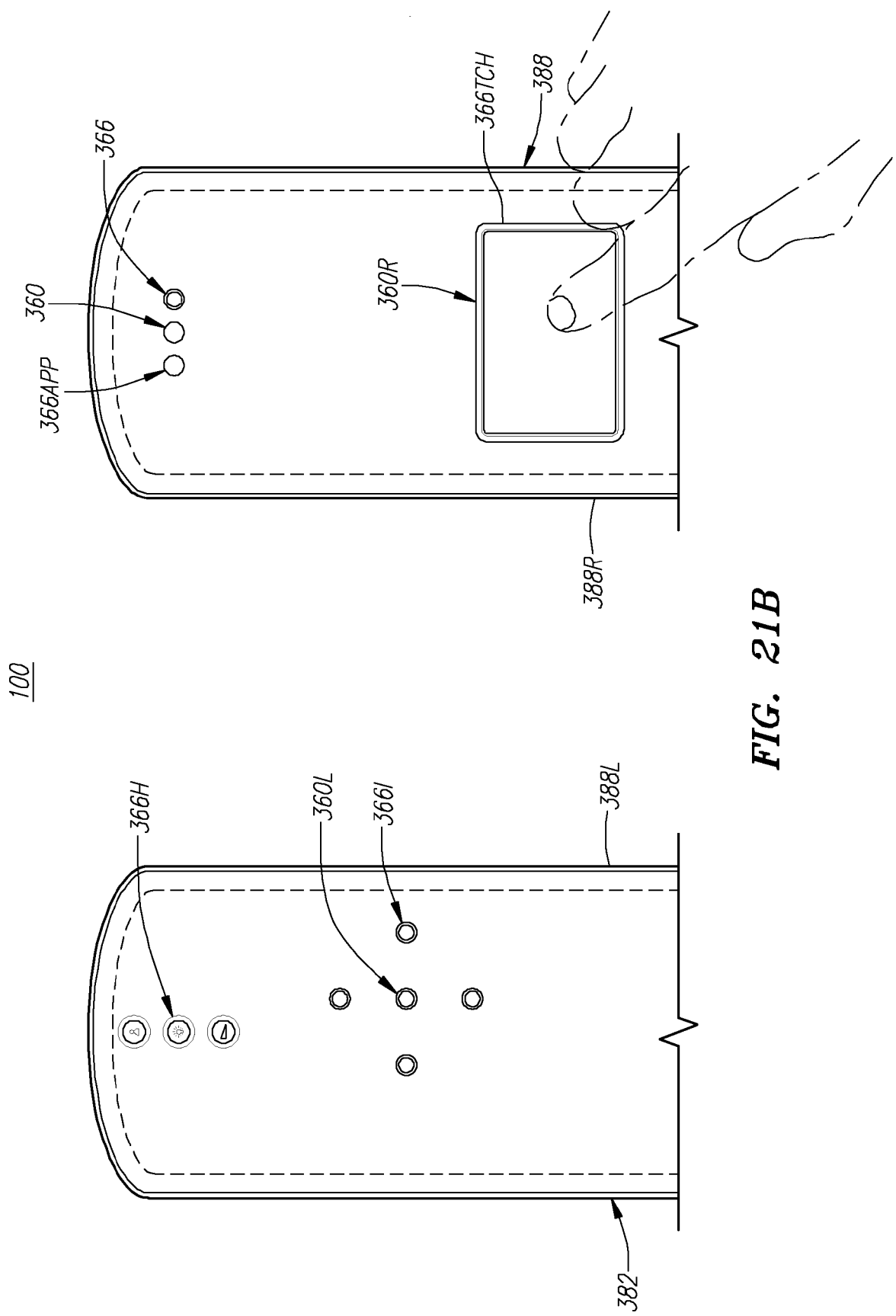

FIGS. 21A-B illustrate an alternative embodiment of the user chair of FIG. 3, wherein a left user interface system 360L disposed at a left armrest 388L of the user chair 382 is different from a right user interface system 360R disposed at a right armrest 388R of the user chair 382. Turning to FIG. 21A, the user interface system 360 can be provided in the manner set forth above with reference to the user interface system 360 (shown in FIG. 3), wherein the user interface system 360 includes left user interface system 360L and the right user interface system 360R. The left user interface system 360L is shown as including a first plurality of interface elements 366H and a second plurality of interface elements 366I. The first plurality of interface elements 366H can be provided as interface elements 366 for controlling any conventional chair function(s) in the manner set forth above in FIGS. 18A-B and 19A-B; whereas, the second plurality of interface elements 366H can be provided as a gamer D-pad in the manner described above in FIGS. 10A-B. The right user interface systems 360R, in contrast to the left user interface systems 360L, is shown as including a touch pad systems 366TCH and a plurality of other interface elements 366 in the manner described with reference to FIGS. 20A-B.

The interface elements 366 of the respective user interface systems 360L, 360R can be provided as de-emphasized interface elements 366OBS when the user is distal from the user interface system 360 in the manner set forth in more detail above. When the user hand approaches, and becomes proximate to, the user interface system 360, one or more selected interface elements 366 of the respective user interface systems 360L, 360R can become emphasized interface elements 366APP as shown in FIG. 21B. The selected interface elements 366, upon becoming apparent, can become observably emphasized and can be manipulated for interacting with the system resource(s) 110 (shown in FIG. 1) (and/or the associated resource function(s)) available by way of the information system 100 in the manner set forth above.

Turning to FIG. 22A, the user seat 382 advantageously can be adapted for use with a seat-based video interface system, such as a touch display system 200'. Typically having a smaller size (and/or dimension) than a conventional video interface system 362 (shown in FIG. 22B), the touch display system 200' can provide an alternative, and/or additional, interface system for enhancing a user's interaction with the information system 100. The touch display system 200' is shown in FIG. 22A as being coupled with the user seat 382 via a support arm 205. The support arm 205 can be provided in any conventional manner and preferably enables a position of the touch display system 200' to be adjustable.

In one embodiment, the support arm 205 permits the touch display system 200' to be stowed when the touch display system 200' is not in use. Although shown in FIG. 22A as being associated with the left armrest 388L of the user seat 382 for purposes of illustration only, the support arm 205 can be associated with the right armrest 388R or any other suitable region of the user seat 382. The touch display system 200' can be coupled with the user seat 382 in any conventional manner. In one embodiment, the touch display system 200' can be disposed (or embedded) at a selected location, such as an armrest 388, of the user seat 382. If embedded at a selected location of the user seat 382, an outer surface of the touch display system 200' preferably is positioned adjacent to (and/or flushly aligned with) the chair covering of the selected location.

The touch display system 200' can be provided in any conventional manner. As shown in FIG. 22A, the touch display system 200' preferably is provided as a personal (or portable) media device 200. The personal media device 200 can be provided by an operator of the information system 100 and/or a user of the information system 100. As desired, the personal media device 200 can be removably coupled with the support arm 205. A user thereby can dispose a personally-owned personal media device 200 at the support arm 205 upon arrive at the user seat 382 and remove the personal media device 200 upon departing the user seat 382. Alternatively, and/or additionally, an operator-owned personal media device 200 can be fixedly coupled with the support arm 205 to avoid theft and/or removable coupled with the support arm 205 to facilitate repair, maintenance, and/or replacement.

In the manner discussed above with reference to the touch-screen display system discussed with reference to FIG. 20A-B, the touch display system 200' advantageously can be removably coupled with the user seat 382 such that the touch display system 200' supports private interactions with the system resource(s) 110 (shown in FIG. 1) (and/or the associated resource function(s)) available by way of the information system 100. Exemplary private interactions can include entry (or viewing) of personal information, credit card numbers, personal identification numbers (PINs), transaction information, or any other confidential information that the user wishes to enter (or view) in private. The touch display system 200' likewise can be removed from the user seat 382 to take a closer look at smaller viewing content 210.

In one embodiment, the touch display system 200' can comprise the sole video interface system for the user interface system 360. Alternatively, the touch display system 200' can provide a secondary video interface system for the user interface system 360 and can be utilized in conjunction with the video interface system 362 (shown in FIG. 6A). As shown in FIG. 22B, for example, as the video interface system 362 presents viewing content 210 provided by the information system 100, the touch display system 200' can be adapted to present other viewing content 210, such as information entered by a user. In other words, the touch display system 200' advantageously can enable the user to multitask. User information, for example, can be entered via one or more emphasized interface elements 366APP and/or via the touch display system 200'.

In an entertainment environment, for instance, entertainment content, such as a movie or the internet, can be presented via the video interface system 362 and/or an audio interface system 364 (shown in FIGS. 26A-B); while, the touch display system 200' can be utilized to order food and/or beverages. Interaction with the touch display system 200' can be supported in the same manner set forth above with reference to interaction with the user interface system 360. For example, the touch display system 200' can enable the user to interact with the system resource(s) 110 (shown in FIG. 1) (and/or the associated resource function(s)) available by way of the information system 100 with simple conventional gestures made with one hand (or finger) and/or two hands (or fingers) in the manner set forth above with reference to the pointer control interface system 360PNT (shown in FIGS. 12A-D).

FIG. 22B illustrates a video display system 240 of the touch display system 200' as presenting a keyboard 242 for entering the user information. In one embodiment, the keyboard 242 can comprise a touch keyboard, such that typing a letter or other character can be performed by pressing a relevant key of the keyboard 242 as presented by the touch display system 200'. Additionally, and/or alternatively, the individual keys of the keyboard 242 as presented by the touch display system 200' can be mapped to one or more selected interface elements 366 of the user interface system 360. The selected interface elements 366 preferably are disposed at both armrests 388 of the user chair 382. Thereby, the interface elements 366, upon becoming emphasized, can be manipulated to type the letter or other character via the presented keyboard 242. The typed letter or other character optionally can be presented via the touch display system 200'.

As desired, the touch display system 200' likewise can be adapted to present the viewing content 210 provided by the information system 100. If the video interface system 362 is configured to present entertainment content, such as social networking content, Internet content, or movie (or television) content, for example, the touch display system 200' can be utilized to write an electronic mail message and/or to order food. Although shown and described with reference to FIG. 22B as presenting touch keyboard for entering the user information, the touch display system 200' can enable a user to enter user information in any conventional manner, including via one or more menu systems 262 (shown in FIG. 3B) and/or graphical icons.

In an alternative embodiment, the touch display system 200' advantageously can support an idle mode. The video display system 240 of the touch display system 200' thereby dims when the touch display system 200' is not being used. The touch display system 200' can dim the video display system 240 immediately upon sensing that a user had has moved away from the touch display system 200' and/or can permit a predetermined time period to elapse before dimming the video display system 240. In other words, in the manner discussed above with reference to the interface elements 366 of the user interface system 360, viewing content 210 presented by the video display system 240 can be obscured from view (or otherwise de-emphasized) when a user is distal from the touch display system 200' (and/or the user interface system 360) and can become apparent (or otherwise emphasized) when the user (and/or a hand of the user) approaches, and becomes proximate to, the touch display system 200'.

The video display system 240, for example, can become obscured upon sensing that the user hand is withdrawing from (and/or has been withdrawn from) the video display system 240. Alternatively, and/or additionally, the video display system 240 can obscure the video display system 240 after a predetermined time period has elapsed after the user hand has been withdrawn. The predetermined time period can be within any predetermined range of time periods, such as any ten-second range between ten seconds and sixty seconds (or more).

Figure 23A:
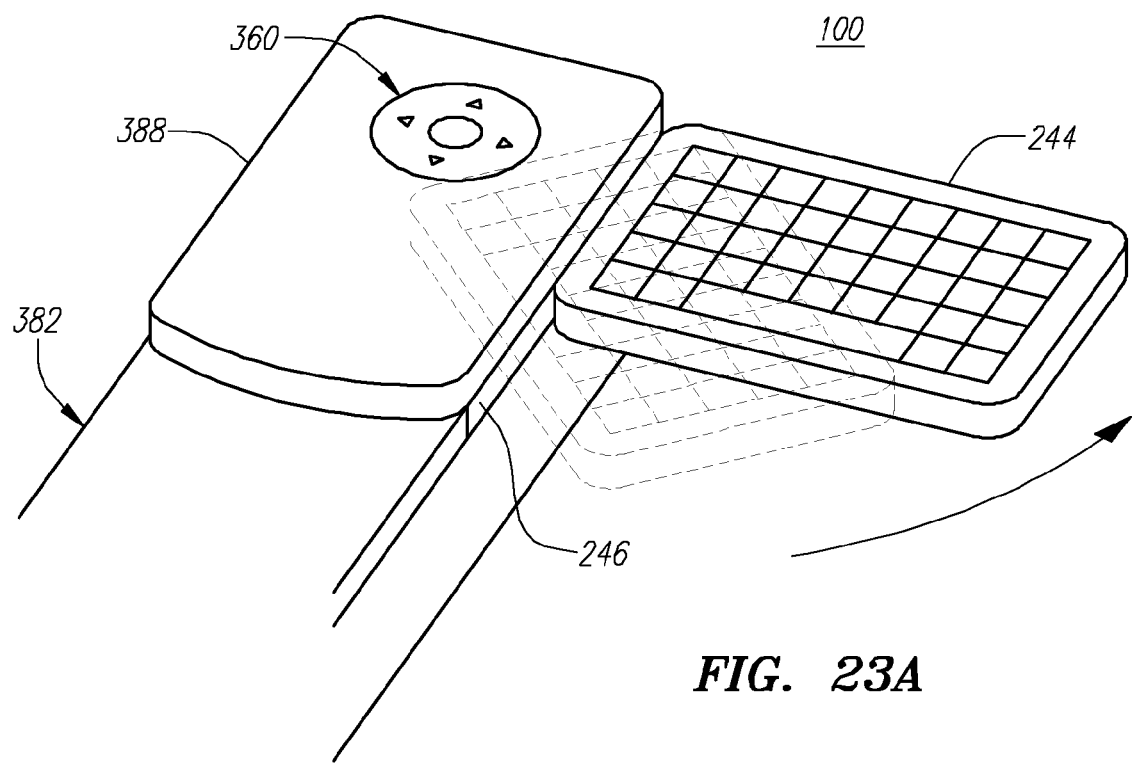
FIGS. 23A-B are exemplary detail drawings illustrating another alternative embodiment of the user chair of FIG. 1, wherein the user interface system can include a retractable keyboard system.
Figure 23B:
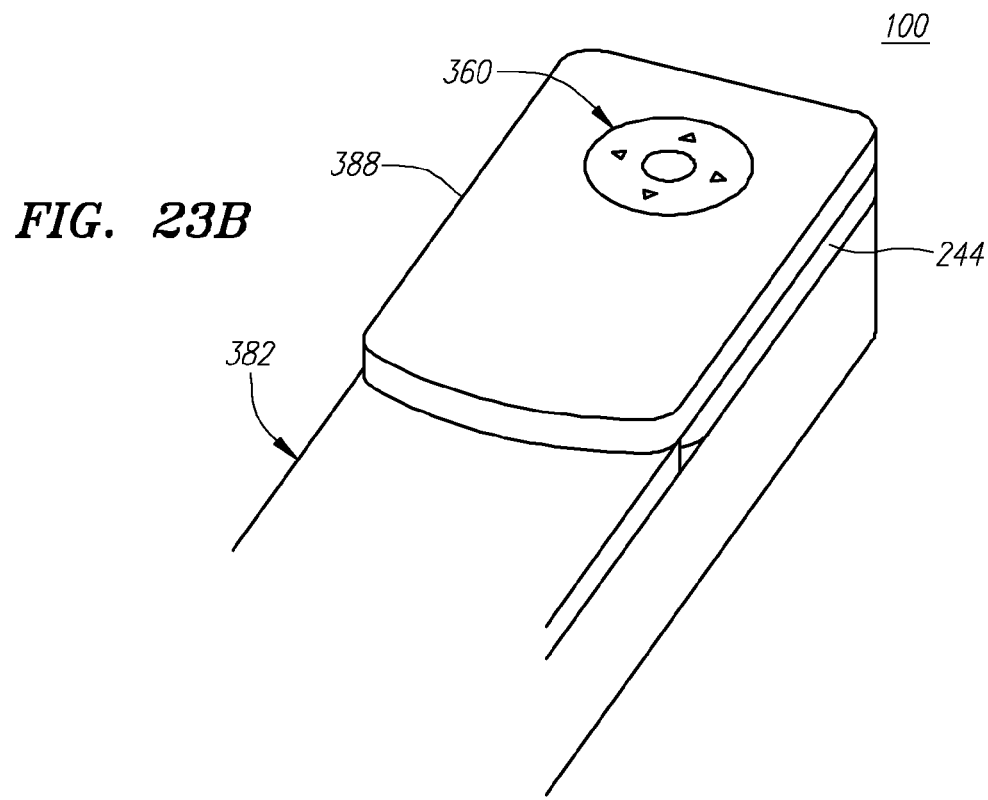

A exemplary retractable keyboard system 244 of the user interface system 360 is shown in FIGS. 23A-B. Preferably comprising a touch keyboard system, the keyboard system 244 can be become (and/or remain) apparent while the user indicates a desire to utilize the keyboard system 244 (and/or the user interface system 360). Advantageously, the keyboard system 244 can be obscured from view (or otherwise de-emphasized) when utilization of the keyboard system 244 is not desired. Turning to FIG. 23A, for example, the keyboard system 244 can be provided at a selected armrest 388 of the user seat. The selected armrest 388 can form a keyboard storage compartment 246 for receiving the keyboard system 244 and can provide a deployment system (not shown). The keyboard system 244 thereby can be deployed from the keyboard storage compartment 246 for use as shown in FIG. 23A and can be retracted into the keyboard storage compartment 246 when use is complete as illustrated in FIG. 23B. The keyboard system 244, when disposed within the keyboard storage compartment 246, preferable is obscured from view.

Figure 24B:
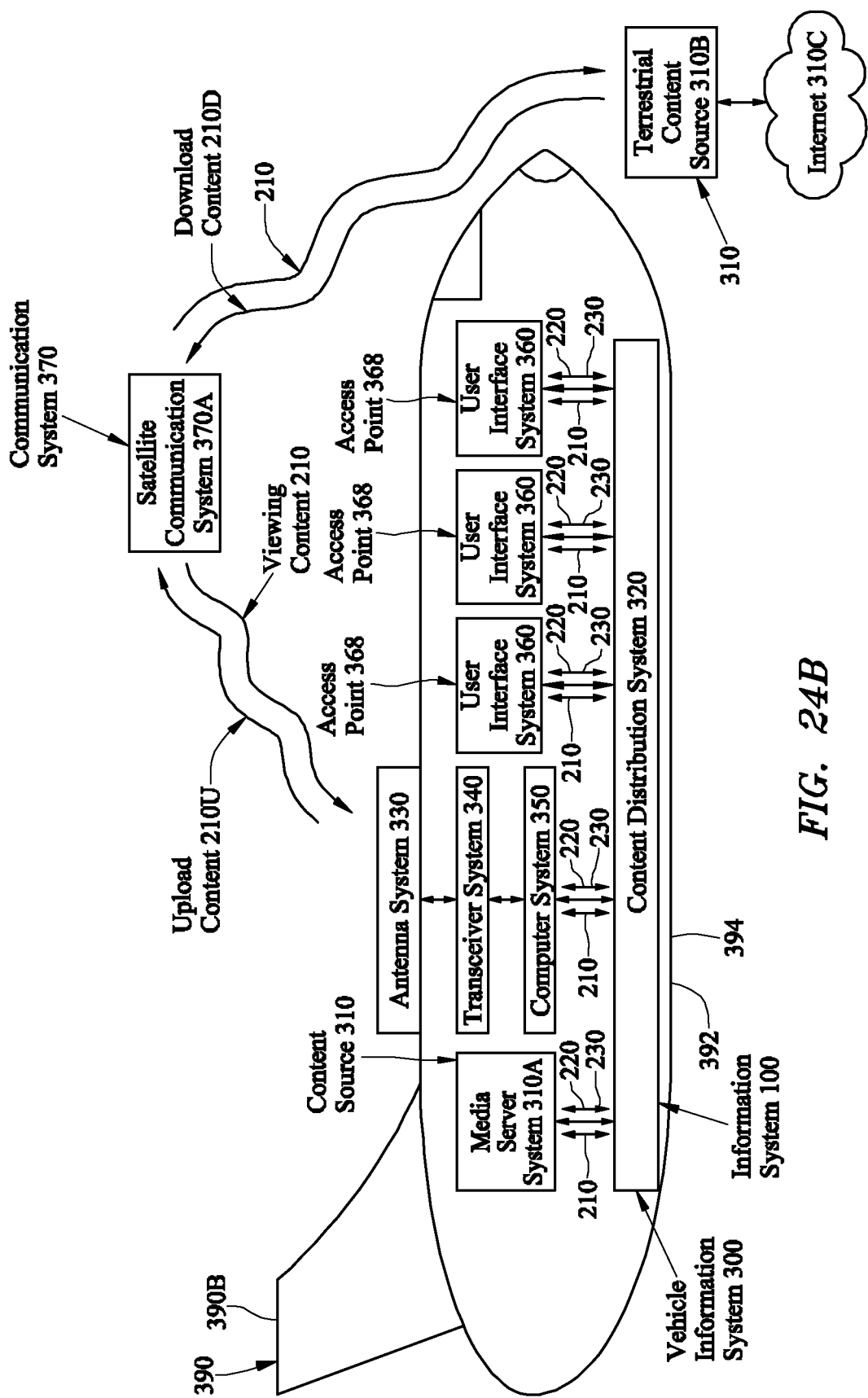
FIG. 24B is an exemplary top-level drawing illustrating an alternative embodiment of the information system of FIG. 1, wherein the information system is installed aboard an aircraft.

Although suitable for use with an information system 100 disposed at a fixed location, such as a building, business, or school, the user chair 382 likewise can advantageously be applied in mobile system applications. Turning to FIGS. 24A-B, for example, the user chair 382 can be configured for installation aboard a wide variety of passenger vehicles 390 and for communicating with vehicle information systems 300 disposed aboard the passenger vehicles 390. Exemplary types of passenger vehicles 390 can include an automobile 390A (shown in FIG. 24A), an aircraft 390B (shown in FIG. 24B), a bus, a recreational vehicle, a passenger boat or ferry, and/or a passenger train, or any other type of passenger vehicle without limitation. If installed on an aircraft 390B as illustrated in FIG. 24B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 24A-B, the vehicle information system 300 comprises at least one conventional content source 310 and one or more user (or passenger) interface systems 360 that communicate via a real-time content distribution system 320. Each content source 310 can be provided in the manner set forth in the co-pending U.S. patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," Ser. No. 12/210,624, filed on Sep. 15, 2008; entitled "PORTABLE USER CONTROL DEVICE AND METHOD FOR VEHICLE INFORMATION SYSTEMS," Ser. No. 12/210,689, filed on Sep. 15, 2008; entitled "SYSTEM AND METHOD FOR RECEIVING BROADCAST CONTENT ON A MOBILE PLATFORM DURING TRAVEL," Ser. No. 12/237,253, filed on Sep. 24, 2008; and entitled "SYSTEM AND METHOD FOR PRESENTING ADVERTISEMENT CONTENT ON A MOBILE PLATFORM DURING TRAVEL," Ser. No. 12/245,521, filed on Oct. 3, 2008, which are assigned to the assignee of the present application and the respective disclosures of which are hereby incorporated herein by reference in their entireties.

The viewing content 210 available via the content source 310 can comprise any conventional type of audio and/or video viewing content, such as stored (or time-delayed) viewing content, live (or real-time) viewing content, and/or interactive viewing content, in the manner set forth in the above-referenced co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. Exemplary viewing content 210 can include text messaging, electronic mail (or email), television programming content, music content, podcast content, photograph album content, audiobook content, movie content, and/or game content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," and/or the co-pending U.S. patent applications, entitled "SYSTEM AND METHOD FOR DISPLAYING A TRAVEL ROUTE OF A PASSENGER VEHICLE,", filed Oct. 2, 2009, which are assigned to the assignee of the present application and the disclosures of which are hereby incorporated herein by reference in their entireties. The exemplary viewing content as shown and described herein are not exhaustive and are provided herein for purposes of illustration only and not for purposes of limitation.

The content sources 310 can include one or more internal content sources, such as server system 310A, that are installed aboard the vehicle 390 and/or remote (or terrestrial) content sources 310B that can be external from the vehicle 390. The server system 310A can be provided as an information system controller for providing overall system control functions for the vehicle information system 300 and/or at least one media (or file) server system, as illustrated in FIGS. 24A-B), for storing preprogrammed content and/or downloaded viewing content 210D, as desired. The server system 310A can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the downloaded viewing content 210D. As desired, the server system 310A likewise can support decoding and/or digital rights management (DRM) functions of the vehicle information system 300.

Being configured to distribute and/or present the viewing content 210 provided by one or more selected content sources 310, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370, such as a satellite communication system 370A. The vehicle information system 300 thereby can receive download viewing content 210D from a selected terrestrial content source 310B and/or transmit upload viewing content 210U, including navigation and other control instructions, to the terrestrial content source 310B. As desired, the terrestrial content source 310B can be configured to communicate with other terrestrial content sources (not shown). The terrestrial content source 310B is shown in FIG. 24B as providing access to the Internet 310C. Although shown and described as comprising the satellite communication system 370A for purposes of illustration, it is understood that the communication system 370 can comprise any conventional type of wireless communication system, such as a cellular communication system (not shown)

and/or an Aircraft Ground Information System (AGIS) communication system (not shown).

To facilitate communications with the terrestrial content sources 310B, the vehicle information system 300 can include an antenna system 330 and a transceiver system 340 for receiving the viewing content from the remote (or terrestrial) content sources 310B as shown in FIGS. 24A-B. The antenna system 330 preferably is disposed outside the vehicle 390, such as an exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media server system 310A and/or to one or more of the user interface systems 360, as desired. Although shown and described as being separate systems for purposes of illustration, the computer system 350 and the media server system 310A can be at least partially integrated.

Figure 25:
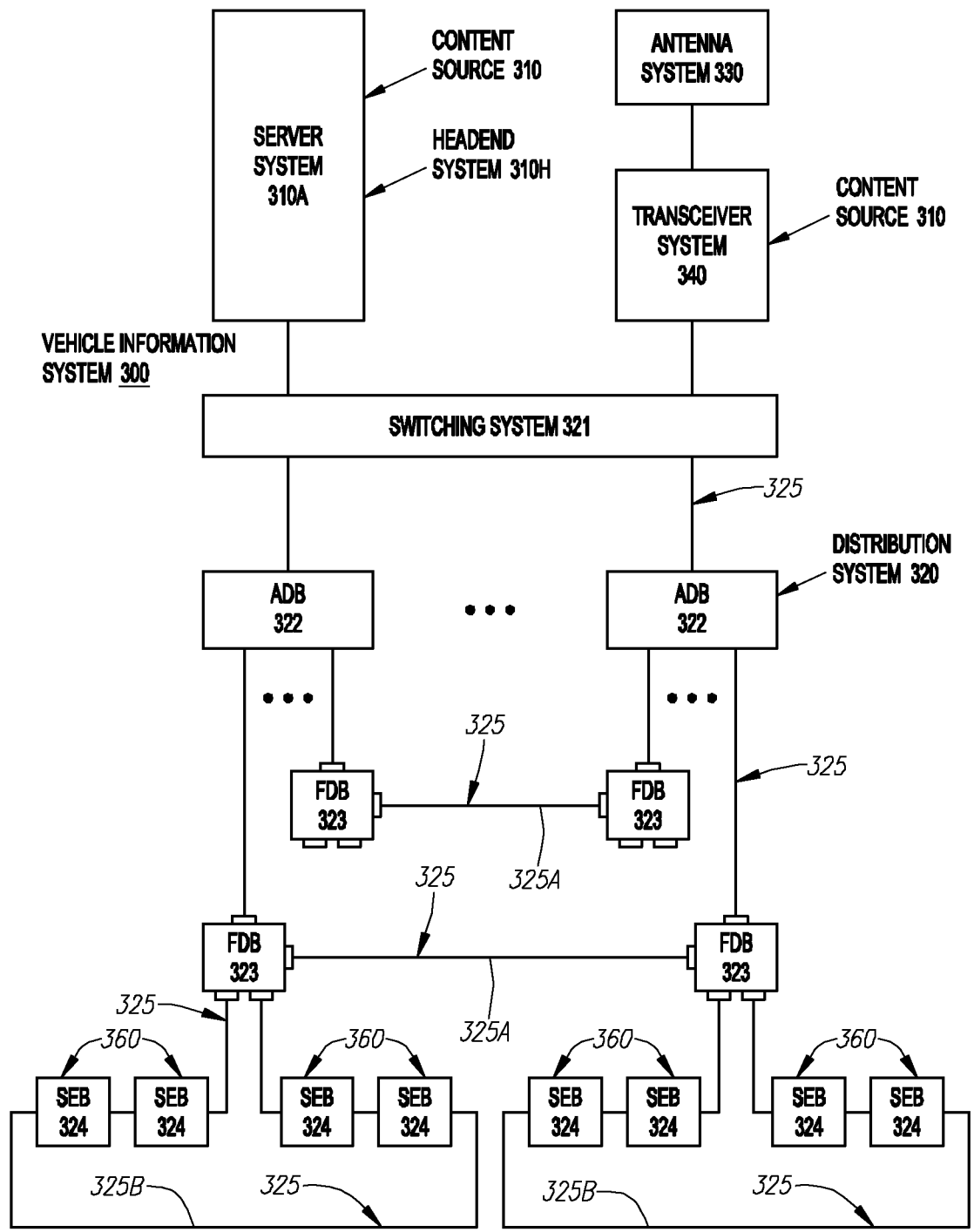
FIG. 25 is an exemplary detail drawing illustrating one embodiment of a distribution system for the information systems of FIGS. 24A-B.

The vehicle information system components, including the content sources 310 and the user interface systems 360, are shown in FIGS. 24A-B as communicating via the content distribution system 320. FIG. 25 illustrates an exemplary content distribution system 320 for the vehicle information system 300. The content distribution system 320 of FIG. 25 couples, and supports communication between a headend system 310H, which includes the content sources 310, and the plurality of user interface systems 360. The distribution system 320 as shown in FIG. 25 is provided in the manner set forth co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties. Alternatively, and/or additionally, the distribution system 320 can be provided in the manner set forth in the co-pending U.S. patent application "OPTICAL COMMUNICATION SYSTEM AND METHOD FOR DISTRIBUTING CONTENT ABOARD A MOBILE PLATFORM DURING TRAVEL," Ser. No. 12/367,406, filed Feb. 6, 2009, which is assigned to the assignee of the present application and the disclosure of which is hereby incorporated herein by reference in its entirety.

As desired, the distribution system 320 likewise can include a network management system (not shown) provided in the manner set forth in co-pending U.S. patent applications, entitled "SYSTEM AND METHOD FOR IMPROVING NETWORK RELIABILITY," Ser. No. 10/773,523, filed on Feb. 6, 2004, and entitled "SYSTEM AND METHOD FOR IMPROVING NETWORK RELIABILITY," Ser. No. 11/086,510, filed on Mar. 21, 2005, which are assigned to the assignee of the present application and the respective disclosures of which are hereby incorporated herein by reference in their entireties.

As illustrated in FIG. 25, the distribution system 320 can be provided as a plurality of line replaceable units (LRUs), including area distribution boxes (ADBs) 322, a plurality of floor disconnect boxes (FDBs) 323, and a plurality of chair electronics boxes (SEBs) (and/or premium chair electronics boxes (PSEBs)) 324 being configured to communicate in real time via a plurality of wired and/or wireless communication connections 325. The line replaceable units of the distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 25. Each floor disconnect box 323 is coupled with, and services, a plurality of daisy-chains of chair electronics boxes 324. The chair electronics boxes 324, in turn, are configured to communicate with the user interface systems 360. Each chair electronics box 324 can support one or more of the user interface systems 360.

As desired, the floor disconnect boxes 323 advantageously can be provided as routing systems and/or interconnected in the manner set forth in the above-referenced co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last chair electronics box 324 in each daisy-chain of chair electronics boxes 324 for a selected floor disconnect box 323 as shown in FIG. 25. Each SEB loopback connection 325B therefore forms a loopback path among the daisy-chained chair electronics boxes 324 coupled with the relevant floor disconnect box 323.

Returning to FIGS. 24A-B, the user interface systems 360 are provided for selecting viewing content 210 and for presenting the selected viewing content 210. As desired, the user interface systems 360 can comprise conventional passenger interfaces and can be provided in the manner set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005, as well as in the manner set forth in the co-pending U.S. patent application, entitled "SYSTEM AND METHOD FOR PRESENTING HIGH-QUALITY VIDEO," Ser. No. 11/379,360, filed on Apr. 19, 2006, the disclosure of which is hereby incorporated herein by reference in its entirety.

FIG. 26A provides a view of a passenger cabin 380 of a passenger vehicle 390, such as the automobile 390A (shown in FIG. 24A) and/or the aircraft 390B (shown in FIG. 24B), aboard which the vehicle information system 300 has been installed. The passenger cabin 380 is illustrated as including a plurality of passenger chairs 382, and each passenger chair 382 is associated with a selected user interface system 360. Each user interface system 360 can include a video interface system 362 and/or an audio interface system 364. Exemplary video interface systems 362 can include overhead cabin display systems 362A with central controls, chair back display systems 362B or armrest display systems (not shown) each with individualized controls, crew display panels, and/or handheld presentation systems. The audio interface systems 364 can be provided in any conventional manner, including an overhead speaker system 364A, the handheld presentation systems, and/or headphones coupled with an audio jack provided, for example, at an armrest 388 of the user chair 382. A speaker system likewise can be associated with the user chair 382, such as a speaker system 364B disposed within a base 384B of the user chair 382 and/or a speaker system 364C disposed within a headrest 384 of the user chair 382. In a preferred embodiment, the audio interface system 364 can include an optional noise-cancellation system for further improving sound quality produced by the audio interface system 364.

The video interface systems 362 and the audio interface systems 364 can be installed at any suitable cabin surface, such as a chair back 386, wall 396, ceiling, and/or bulkhead, or an armrest 388 of a passenger chair 382 in any conventional manner including via a mounting system 363 provided in the manner set forth co-pending U.S. patent applications, entitled "SYSTEM AND METHOD FOR MOUNTING USER INTERFACE DEVICES," Ser. No. 11/828,193, filed on Jul. 25, 2007, and entitled "USER INTERFACE DEVICE AND METHOD FOR PRESENTING VIEWING CONTENT," Ser. No. 11/835,371, filed on Aug. 7, 2007, which are assigned to the assignee of the present application and the respective disclosures of which are hereby incorporated herein by reference in their entireties.

As shown in FIG. 26A, the user interface system 360 likewise can include an interface element 366 for permitting the user (or passenger) to communicate with the vehicle information system 300, such as via an exchange of control signals 220. For example, the interface element 366 can permit the user to enter one or more user instructions 230 for controlling the operation of the vehicle information system 300. Illustrative user instructions 230 can include instructions for initiating communication with the content source 310, instructions for selecting viewing content 210 for presentation, and/or instructions for controlling the presentation of the selected viewing content 210. If a fee is required for accessing the viewing content 210, payment information likewise can be entered via the interface element 366.

The interface element 366 can be provided in any conventional manner and typically includes one or more switches (or pushbuttons), such as a keyboard or a keypad, and/or a pointing device, such as a mouse, trackball, or stylus. As desired, the interface element 366 can be at least partially integrated with, and/or separable from, the associated video interface system 362 and/or audio interface system 364. For example, the video interface system 362 and the interface element 366 can be provided as a touch screen display system. The interface element 366 likewise can include one or more input ports (not shown) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal media device 200 (shown in FIG. 26B) with the vehicle information system 300. Passengers (not shown) who are traveling aboard the vehicle 390 thereby can enjoy personally-selected viewing content during travel. The access point 368 is located proximally to an associated passenger chair 382 and can be provided at any suitable cabin surface, such as a chair back 386, wall 396, ceiling, and/or bulkhead.

Turning to FIG. 26B, the personal media devices 200 and the vehicle information system 300 are shown as communicating via respective access points 368. The personal media device 200 can store the audio and/or video viewing content 210 and can be provided as a handheld device, such as a laptop computer, a palmtop computer, a personal digital assistant (PDA), cellular telephone, and/or a MPEG Audio Layer 3 (MP3) device. Illustrative personal media devices 200 are shown and described in the co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," Ser. No. 12/210,624, filed on Sep. 15, 2008; entitled "MEDIA DEVICE INTERFACE SYSTEM AND METHOD FOR VEHICLE INFORMATION SYSTEMS," Ser. No. 12/210,636, filed Sep. 15, 2008; entitled "MEDIA DEVICE INTERFACE SYSTEM AND METHOD FOR VEHICLE INFORMATION SYSTEMS," Ser. No. 12/210,652, filed Sep. 15, 2008; and entitled "PORTABLE USER CONTROL DEVICE AND METHOD FOR VEHICLE INFORMATION SYSTEMS," Ser. No. 12/210,689, filed on Sep. 15, 2008, which are assigned to the assignee of the present application and the respective disclosures of which are hereby incorporated herein by reference in their entireties.

As shown in FIG. 26B, the personal media devices 200 each include a video display system 240 for visually presenting the viewing content 210 and an audio system 250 for audibly presenting the viewing content 210. Each personal media device 200 can include a user control system 260, which can be provided in any conventional manner and typically includes one or more switches (or pushbuttons), such as a keyboard or a keypad, and/or a pointing device, such as a mouse, trackball, or stylus. The personal media devices 200 thereby can select desired viewing content 210 and control the manner in which the selected viewing content 210 is received and/or presented.

The personal media devices 200 likewise include a communication port (or connector) 270. The communication port 270 enables the personal media devices 200 to communicate with the vehicle information system 300 via the access points 368 of the user interface systems 360. As illustrated with personal media device 200A, the communication port 270 and the access points 368 can supported wireless communications; whereas, support for wired communications between the communication port 270 and the access points 368 via a communication cable assembly 369 is shown with personal media device 200B. When the communication port 270 and the access points 368 are in communication, the vehicle information system 300 supports a simple manner for permitting the associated personal media device 200 to be integrated with the vehicle information system 300 using a user-friendly communication interface.

When the personal media device 200 and the vehicle information system 300 are in communication, the vehicle information system 300 can perform a plurality of integration tasks simultaneously, enabling the personal media device 200 to become fully integrated with the vehicle information system 300 via a selected access point 368. The system components of the vehicle information system 300 and the personal media device 200 thereby become interchangeable. The personal media device 200 likewise can receive control signals (or commands) 220 and/or operating power 220P from the vehicle information system 300. Thereby, the personal media device 200 advantageously can become a seamless part of the vehicle information system 300.

For example, user instructions 230 (shown in FIGS. 24A-B) for controlling the operation of the vehicle information system 300 can be provided via the interface element 366 of the vehicle information system 300 and/or the user control system 260 of the personal media device 200. In other words, the interface element 366 of the vehicle information system 300 and/or the user control system 260 of the personal media device 200 can be used to select viewing content 210 and control the manner in which the selected viewing content 210 is received and/or presented. The selected viewing content 210 can be provided by a relevant content source 310 (shown in FIGS. 24A-B) of the vehicle information system 300 and/or by storage media (not shown) disposed within the personal media device 200. A video portion of the selected viewing content 210 thereby can be presented via the video presentation system 362 of the vehicle information system 300 and/or the video display system 240 of the personal media device 200. The audio presentation system 364 of the vehicle information system 300 and/or the audio system 250 of the personal media device 200 can be used to present an audio portion of the selected viewing content 210. If the video display system 240 of the personal media device 200 is much smaller than the video presentation system 362 of the vehicle information system 300, a passenger may prefer to view the selected viewing content 210 via the larger video presentation system 362.

When no longer in use and/or direct physical contact with the personal media device 200 is not otherwise required, the personal media device 200 can be stored at the user chair 382. For example, the user chair 382 can include a storage compartment 389 for providing storage of the personal media device 200. The storage compartment 389 can be provided in any conventional manner and at any suitable portion of the user chair 382. As illustrated with passenger chair 382B, the personal media device 200 can be placed in a storage pocket 389B formed in the armrest 388 of the user chair 382B. The storage compartment 389 likewise can be provided on the chair back 386 and/or the headrest 384 of the user chair 382. Storage compartment 389A of passenger chair 382A, for example, is shown as being formed on the lower chair back 386 of the user chair 382A. As desired, the storage compartment 389 can comprise an overhead storage compartment, a door storage compartment, a storage compartment provided underneath the user chair 382, or any other type of conventional storage compartment, such as a glove compartment, trunk, or closet, available in the passenger vehicle 390.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An integrated user interface system suitable for interacting with a system resource, comprising:
   a chair region of a user chair; and
   a plurality of interface elements being provided at said chair region, said interface elements being obscured from view and inhibited from interacting with the system resource when a user hand is distal from the user interface system, one or more selected interface elements becoming visible and activated for interacting with the system resource in response to the user hand moving proximate to the user interface system and becoming obscured from view and inhibited from interacting with the system resource in response to the user hand moving to a distal location from the user interface system,
   wherein said selected interface elements become visible by physically moving from a retracted position to an extended position to form raised projections providing the user interface system with a tactile feel, and
   wherein said integrated user interface system is utilized in conjunction with a video interface system for presenting a menu system with control indicia associated with system functions available via the system resource, said selected interface elements being mapped to the control indicia to enable navigation of the menu system via said integrated user interface system.

2. The user interface system of claim 1,
   wherein said selected interface elements become visible by at least one of projecting from said chair region, becoming illuminated, presenting control indicia, and presenting a function icon that represents a preselected control function associated with said selected interface elements; and
   wherein said selected interface elements remain visible while the hand of the user is adjacent to the user interface system and become obscured when the hand of the user withdraws from the user interface system.

3. The user interface system of claim 1, wherein said selected interface elements provide a chair control interface for controlling a chair feature of the user chair, the chair control interface controlling at least one of a headrest position, a footrest position, an armrest position, a chair back recline angle, a lumbar support position, a chair elevation, a chair swivel angle, an in-chair massage system, an audio volume level, a light brightness level, in-chair and an in-chair temperature control system.

4. The user interface system of claim 1,
   wherein said interface elements are disposed in a matrix arrangement; and
   wherein said selected interface elements comprise a portion of said interface elements, said interface elements including a plurality of boundary interface elements that become visible to define a boundary that at least partially surrounds said selected interface elements when the user hand is proximate to the user interface system.

5. The user interface system of claim 1, wherein a plurality of said interface elements form a composite interface element, said composite interface element comprising at least one of a touch pad system, a gaming interface system, a gamer D-pad system, a chair control system, a pointer control system, a rectangular grid system, and a telephone keypad system.

6. The user interface system of claim 5,
   wherein said interface elements are disposed in a matrix arrangement;
   wherein, if at least one of said interface elements forming said composite interface element becomes unavailable, a position of said composite interface element within said matrix arrangement is dynamically adjusted to avoid said unavailable interface element.

7. The user interface system of claim 1, further comprising a touch film interface system disposed at said chair region, a projection system projecting said selected interface elements onto respective areas of said touch film interface system as virtual interface elements, a selected area of said touch film interface system detecting an approach of the hand of the user and actuating an associated virtual interface element prior to actual contact with said chair region.

8. The user interface system of claim 1, wherein a projection system projects said selected interface elements onto respective areas of said touch film interface system as virtual interface elements, an camera system detecting the hand of the user approaching a selected area of said chair region and actuating an associated virtual interface element prior to actual contact with said chair region.

9. The user interface system of claim 1, wherein the chair region covering comprises a pliable chair region covering for enabling formation and manipulation of the projections.

10. A user chair, comprising:
a seat; and
a chair region being coupled with said seat; and
an integrated user interface system being disposed at said chair region and being provided in accordance with claim 1.

11. The user chair of claim 10,
wherein said chair region comprises left and right armrests, said seat being disposed between said left and right armrests; and
wherein said user interface system comprises a first user interface system disposed at said left armrest and a second user interface system disposed at said right armrest, each of said first and second user interface systems being provided in accordance with claim 1.

12. The user chair of claim 11, wherein said first user interface system is provided in the same manner as said second user interface system.

13. A method for manufacturing an integrated user interface system, comprising:
providing a user chair having a chair region; and
disposing a user interface system at said chair region of said user chair, said user interface system being provided in accordance with claim 1.

14. An integrated user interface system suitable for interacting with a system resource, comprising:
a chair region of a user chair; and
a plurality of interface elements being provided at said chair region, said interface elements being obscured from view and inhibited from interacting with the system resource when a user hand is distal from the user interface system, one or more selected interface elements becoming visible and activated for interacting with the system resource in response to the user hand moving proximate to the user interface system and becoming obscured from view and inhibited from interacting with the system resource in response the user hand moving to a distal location from the user interface system,
wherein a plurality of said interface elements are coupled with an actuator assembly configured to selectively physically move each of the interface elements from a retracted position to an extended position; and
wherein said integrated user interface system is utilized in conjunction with a video interface system for presenting a menu system with control indicia associated with system functions available via the system resource, said selected interface elements being mapped to the control indicia to enable navigation of the menu system via said integrated user interface system.

15. An integrated user interface system suitable for interacting with a system resource, comprising:
a chair region of a user chair; and
a plurality of interface elements being provided at said chair region, said interface elements being obscured from view and inhibited from interacting with the system resource when a user hand is distal from the user interface system, one or more selected interface elements becoming visible and activated for interacting with the system resource in response to the user hand moving proximate to the user interface system and becoming obscured from view and inhibited from interacting with the system resource in response the user hand moving to a distal location from the user interface system,
wherein said selected interface elements become visible by physically moving from a retracted position to an extended position to form raised projections providing the user interface system with a tactile feel;
wherein a plurality of said interface elements are configured to form a plurality of different composite interface elements, said composite interface elements being defined by a respective different set of said interface elements being in one of a retracted and fully extended position; and
wherein said integrated user interface system is utilized in conjunction with a video interface system for presenting a menu system with control indicia associated with system functions available via the system resource, said selected interface elements being mapped to the control indicia to enable navigation of the menu system via said integrated user interface system.

\* \* \* \* \*